United States Patent
Gross et al.

(10) Patent No.: US 9,908,811 B2
(45) Date of Patent: *Mar. 6, 2018

(54) FUSION FORMABLE GLASS-BASED ARTICLES INCLUDING A METAL OXIDE CONCENTRATION GRADIENT

(71) Applicant: Corning Incorporated, Corning, NY (US)

(72) Inventors: Timothy Michael Gross, Corning, NY (US); Guangli Hu, Berkeley Heights, NJ (US); Rostislav Vatchev Roussev, Painted Post, NY (US); Charlene Marie Smith, Corning, NY (US); Zhongzhi Tang, Painted Post, NY (US); Steven Alvin Tietje, Lindley, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,735

(22) Filed: Aug. 22, 2017

(65) Prior Publication Data
US 2017/0349483 A1 Dec. 7, 2017

Related U.S. Application Data

(62) Division of application No. 15/376,057, filed on Dec. 12, 2016.
(Continued)

(51) Int. Cl.
*C03C 21/00* (2006.01)
*C03C 23/00* (2006.01)
(Continued)

(52) U.S. Cl.
CPC ............ *C03C 21/002* (2013.01); *C03C 3/093* (2013.01); *C03C 3/097* (2013.01); *C03C 4/18* (2013.01);
(Continued)

(58) Field of Classification Search
None
See application file for complete search history.

(56) References Cited

U.S. PATENT DOCUMENTS 3,357,876 A 12/1967 Rinehart
3,380,818 A 4/1968 Smith
(Continued)

FOREIGN PATENT DOCUMENTS

CN 103058506 A 4/2013
EP 0132751 A1 2/1985
(Continued)

OTHER PUBLICATIONS

Bouyne et al; "Fragmentation of thin chemically tempered glass plates"; Glass Technol., 2002, 43C, 300-2.
(Continued)

*Primary Examiner* — David Sample
(74) *Attorney, Agent, or Firm* — Jeffrey A. Schmidt

(57) ABSTRACT

A glass-based article including a first surface and a second surface opposing the first surface defining a thickness (t) of about 3 millimeters or less (e.g., about 1 millimeter or less), and a stress profile, wherein all points of the stress profile between a thickness range from about 0·t up to 0.3·t and from greater than about 0.7·t to t, comprise a tangent with a slope having an absolute value greater than about 0.1 MPa/micrometer. In some embodiments, the glass-based article includes a non-zero metal oxide concentration that varies along at least a portion of the thickness (e.g., 0·t to about 0.3·t) and a maximum central tension of less than
(Continued)

about 71.5/√(t) (MPa). In some embodiments, the concentration of metal oxide or alkali metal oxide decreases from the first surface to a point between the first surface and the second surface and increases from the point to the second surface. The concentration of the metal oxide may be about 0.05 mol % or greater or about 0.5 mol % or greater throughout the thickness. Methods for forming such glass-based articles are also disclosed.

20 Claims, 38 Drawing Sheets

Related U.S. Application Data

(60) Provisional application No. 62/365,534, filed on Jul. 22, 2016, provisional application No. 62/364,687, filed on Jul. 20, 2016, provisional application No. 62/320,095, filed on Apr. 8, 2016, provisional application No. 62/266,411, filed on Dec. 11, 2015.

(51) Int. Cl.
  *C03C 4/18* (2006.01)
  *C03C 3/093* (2006.01)
  *C03C 3/097* (2006.01)

(52) U.S. Cl.
  CPC ........ *C03C 23/007* (2013.01); *C03C 2204/00* (2013.01)

(56) References Cited

U.S. PATENT DOCUMENTS

| | | | |
|---|---|---|---|
| 3,404,015 | A | 10/1968 | Dumbaugh |
| 3,433,611 | A | 3/1969 | Saunders et al. |
| 3,464,880 | A | 9/1969 | Rinehart |
| 3,490,984 | A | 1/1970 | Petticrew et al. |
| 3,625,718 | A | 12/1971 | Petticrew |
| 3,639,198 | A | 2/1972 | Plumat et al. |
| 3,656,923 | A | 4/1972 | Garfinkel et al. |
| 3,660,060 | A | 5/1972 | Spanoudis |
| 3,798,013 | A | 3/1974 | Inoue et al. |
| 3,811,855 | A | 5/1974 | Carlson et al. |
| 3,879,183 | A | 4/1975 | Carlson |
| 3,907,577 | A | 9/1975 | Kiefer et al. |
| 3,959,000 | A | 5/1976 | Nakagawa et al. |
| 4,042,405 | A | 8/1977 | Krohn et al. |
| 4,053,679 | A | 10/1977 | Rinehart |
| 4,055,703 | A | 10/1977 | Rinehart |
| 4,156,755 | A | 5/1979 | Rinehart |
| 4,468,534 | A | 8/1984 | Boddicker |
| 4,471,024 | A | 9/1984 | Pargamin et al. |
| 4,702,042 | A | 10/1987 | Herrington et al. |
| 4,757,162 | A | 7/1988 | Dumora et al. |
| 5,273,827 | A | 12/1993 | Francis |
| 5,763,343 | A | 6/1998 | Brix et al. |
| 5,895,768 | A | 4/1999 | Speit |
| 5,972,460 | A | 10/1999 | Tachiwana |
| 6,333,286 | B1 | 12/2001 | Kurachi et al. |
| 6,413,892 | B1 | 7/2002 | Koyama et al. |
| 6,516,634 | B1 | 2/2003 | Green et al. |
| 6,537,938 | B1 | 3/2003 | Miyazaki |
| 6,689,704 | B2 | 2/2004 | Ota et al. |
| 6,846,760 | B2 | 1/2005 | Siebers et al. |
| 7,007,512 | B2 | 3/2006 | Kamada et al. |
| 7,091,141 | B2 | 8/2006 | Horsfall et al. |
| 7,176,528 | B2 | 2/2007 | Couillard et al. |
| 7,476,633 | B2 | 1/2009 | Comte et al. |
| 7,619,283 | B2 | 11/2009 | Gadkaree |
| 7,687,419 | B2 | 3/2010 | Kawai |
| 7,838,136 | B2 | 11/2010 | Nakashima et al. |
| 8,099,982 | B2 | 1/2012 | Takagi et al. |
| 8,232,218 | B2 | 7/2012 | Dejneka et al. |
| 8,312,739 | B2 | 11/2012 | Lee et al. |
| 8,327,666 | B2 | 12/2012 | Harvey et al. |
| 8,347,651 | B2 | 1/2013 | Abramov et al. |
| 8,561,429 | B2 | 10/2013 | Allan et al. |
| 8,580,411 | B2 | 11/2013 | Endo et al. |
| 8,691,711 | B2 | 4/2014 | Nakashima et al. |
| 8,713,972 | B2 | 5/2014 | Lakota et al. |
| 8,854,623 | B2 | 10/2014 | Fontaine et al. |
| 8,932,510 | B2 | 1/2015 | Li et al. |
| 8,943,855 | B2 | 2/2015 | Gomez et al. |
| 8,975,374 | B2 | 3/2015 | Kimura |
| 9,003,835 | B2 | 4/2015 | Lock |
| 9,007,878 | B2 | 4/2015 | Matsumoto et al. |
| 9,139,469 | B2 | 9/2015 | Comte et al. |
| 9,140,543 | B1 | 9/2015 | Allan et al. |
| 9,193,625 | B2 | 11/2015 | Bookbinder et al. |
| 9,593,042 | B2 | 3/2017 | Hu et al. |
| 2005/0090377 | A1 | 4/2005 | Shelestak et al. |
| 2005/0099618 | A1 | 5/2005 | DiFoggio et al. |
| 2005/0221044 | A1 | 10/2005 | Gaume et al. |
| 2005/0250639 | A1 | 11/2005 | Siebers et al. |
| 2006/0279217 | A1 | 12/2006 | Peuchert et al. |
| 2007/0060465 | A1* | 3/2007 | Varshneya ........ B32B 17/10761 501/68 |
| 2008/0128953 | A1 | 6/2008 | Nagai et al. |
| 2009/0197088 | A1 | 8/2009 | Murata |
| 2010/0029460 | A1 | 2/2010 | Shojiya et al. |
| 2010/0087307 | A1 | 4/2010 | Murata et al. |
| 2011/0014475 | A1 | 1/2011 | Murata |
| 2011/0067447 | A1 | 3/2011 | Zadesky et al. |
| 2011/0092353 | A1 | 4/2011 | Amin et al. |
| 2011/0294648 | A1* | 12/2011 | Chapman ................ C03C 3/097 501/63 |
| 2012/0015150 | A1 | 1/2012 | Suzuki |
| 2012/0052271 | A1 | 3/2012 | Gomez et al. |
| 2012/0083401 | A1 | 4/2012 | Koyama et al. |
| 2012/0135226 | A1 | 5/2012 | Bookbinder et al. |
| 2012/0171497 | A1 | 7/2012 | Koyama et al. |
| 2012/0216569 | A1 | 8/2012 | Allan et al. |
| 2012/0236526 | A1 | 9/2012 | Weber |
| 2012/0264585 | A1 | 10/2012 | Ohara et al. |
| 2012/0297829 | A1 | 11/2012 | Endo et al. |
| 2012/0321898 | A1 | 12/2012 | Meinhardt et al. |
| 2013/0004758 | A1* | 1/2013 | Dejneka ................ C03C 3/087 428/220 |
| 2013/0007458 | A1 | 1/2013 | Wakita et al. |
| 2013/0017380 | A1 | 1/2013 | Murata et al. |
| 2013/0122260 | A1 | 5/2013 | Liang |
| 2013/0122284 | A1 | 5/2013 | Gross |
| 2013/0183512 | A1* | 7/2013 | Gy ........................ C03C 21/002 428/220 |
| 2013/0186139 | A1 | 7/2013 | Tanii |
| 2013/0189486 | A1 | 7/2013 | Wang et al. |
| 2013/0203583 | A1 | 8/2013 | Zhang et al. |
| 2013/0224492 | A1 | 8/2013 | Bookbinder et al. |
| 2013/0274085 | A1 | 10/2013 | Beall et al. |
| 2013/0288001 | A1 | 10/2013 | Murata et al. |
| 2013/0288010 | A1 | 10/2013 | Akarapu et al. |
| 2013/0323444 | A1 | 12/2013 | Ehemann et al. |
| 2014/0087193 | A1* | 3/2014 | Cites ................ B32B 17/10036 428/410 |
| 2014/0092377 | A1 | 4/2014 | Liu et al. |
| 2014/0106141 | A1 | 4/2014 | Bellman et al. |
| 2014/0141226 | A1 | 5/2014 | Bookbinder et al. |
| 2014/0147576 | A1 | 5/2014 | Lewis et al. |
| 2014/0154661 | A1 | 6/2014 | Bookbinder et al. |
| 2014/0170380 | A1 | 6/2014 | Murata et al. |
| 2014/0220327 | A1 | 8/2014 | Adib et al. |
| 2014/0227524 | A1* | 8/2014 | Ellison ................ C03C 21/002 428/410 |
| 2014/0308526 | A1 | 10/2014 | Chapman et al. |
| 2014/0356605 | A1 | 12/2014 | Adib et al. |
| 2014/0364298 | A1 | 12/2014 | Ohara et al. |
| 2014/0370264 | A1 | 12/2014 | Ohara et al. |
| 2014/0370302 | A1 | 12/2014 | Amin et al. |
| 2015/0004390 | A1 | 1/2015 | Kawamoto et al. |
| 2015/0027169 | A1 | 1/2015 | Fredholm |
| 2015/0030834 | A1 | 1/2015 | Morey et al. |
| 2015/0030838 | A1 | 1/2015 | Sellier et al. |

(56) References Cited

U.S. PATENT DOCUMENTS

| | | |
|---|---|---|
| 2015/0037586 A1 | 2/2015 | Gross |
| 2015/0044473 A1 | 2/2015 | Murata et al. |
| 2015/0064472 A1 | 3/2015 | Gross et al. |
| 2015/0064474 A1 | 3/2015 | Dejneka et al. |
| 2015/0074974 A1 | 3/2015 | Pesansky et al. |
| 2015/0093581 A1 | 4/2015 | Murata et al. |
| 2015/0111030 A1 | 4/2015 | Miyasaka et al. |
| 2015/0140325 A1 | 5/2015 | Gross et al. |
| 2015/0147574 A1 | 5/2015 | Allan et al. |
| 2015/0147576 A1 | 5/2015 | Bookbinder et al. |
| 2015/0152003 A1 | 6/2015 | Kawamoto et al. |
| 2015/0157533 A1 | 6/2015 | DeMartino et al. |
| 2015/0175469 A1 | 6/2015 | Tabe |
| 2015/0239775 A1* | 8/2015 | Amin ............... C03C 21/002 428/220 |
| 2015/0251947 A1 | 9/2015 | Lestrigant et al. |
| 2015/0274585 A1 | 10/2015 | Rogers et al. |
| 2015/0329418 A1 | 11/2015 | Murata et al. |
| 2015/0368148 A1* | 12/2015 | Duffy ............... C03C 21/002 428/220 |
| 2015/0368153 A1* | 12/2015 | Pesansky ............ C03C 21/002 428/220 |
| 2016/0102014 A1* | 4/2016 | Hu ..................... C03C 3/093 428/220 |
| 2016/0122239 A1* | 5/2016 | Amin ............... C03C 21/002 428/220 |
| 2016/0122240 A1* | 5/2016 | Oram ............... C03C 21/002 428/220 |
| 2017/0022093 A1* | 1/2017 | DeMartino ............ C03C 3/097 |
| 2017/0158556 A1* | 6/2017 | Dejneka ............. C03C 21/002 |
| 2017/0197870 A1* | 7/2017 | Finkeldey ......... B32B 17/10045 |
| 2017/0291849 A1* | 10/2017 | Dejneka ............. C03C 21/002 |
| 2017/0305786 A1* | 10/2017 | Roussev ............. C03C 21/002 |

FOREIGN PATENT DOCUMENTS

| | | |
|---|---|---|
| EP | 0163873 B1 | 8/1989 |
| EP | 1314704 A1 | 5/2003 |
| EP | 2415724 A1 | 2/2012 |
| EP | 2594536 A1 | 5/2013 |
| EP | 2666756 A1 | 11/2013 |
| EP | 2762459 A1 | 8/2014 |
| GB | 1026770 A | 4/1966 |
| JP | 2004099370 A | 4/2004 |
| JP | 2005139031 A | 6/2005 |
| JP | 2005206406 A | 8/2005 |
| JP | 2005289683 A | 10/2005 |
| JP | 2005289685 A | 10/2005 |
| JP | 2008007384 A | 1/2008 |
| JP | 2008094713 A | 4/2008 |
| JP | 2009107878 A | 5/2009 |
| JP | 2014073953 A | 4/2014 |
| KR | 1302664 B1 | 9/2013 |
| WO | 2011041484 A1 | 4/2011 |
| WO | 2011069338 A1 | 6/2011 |
| WO | 2011097314 A2 | 8/2011 |
| WO | 2011103799 A1 | 9/2011 |
| WO | 2011104035 A2 | 9/2011 |
| WO | 2011149740 A1 | 12/2011 |
| WO | 2011149811 A1 | 12/2011 |
| WO | 2012126394 A1 | 9/2012 |
| WO | 2013082246 A1 | 6/2013 |
| WO | 2013130665 A2 | 9/2013 |
| WO | 2013130721 A1 | 9/2013 |
| WO | 2013184205 A1 | 12/2013 |
| WO | 2014175144 A1 | 10/2014 |
| WO | 2014180679 A1 | 11/2014 |
| WO | 2015057552 A2 | 4/2015 |
| WO | 2015057555 A1 | 4/2015 |
| WO | 2015175595 A1 | 11/2015 |
| WO | 2016014937 A1 | 1/2016 |
| WO | 2016028554 A1 | 2/2016 |

OTHER PUBLICATIONS

Corning leads $62M Investment in 'smart' glass maker view, Jun. 19, 2013; http://optics.org/news/4/6/27.

Donald "Review Methods for Improving the Mechanical Properties of Oxide Glasses"; Journal of Materials Science 24 (1989) 4177-4208.

Glover et al; "The interactive whiteboard: a literature survey"; Technology, Pedagogy and Education (14) 2: 155-170.

'Kitaigorodskii I.I.' 'Sentyurin G.G.' 'Egorova L.S', In: Sb.Nauchn. Rabot Belor.Politekhn.Inst.,Khimiya, Tekhnologiya i Istoriya Stekla i Keramiki, 1960, No. 86, p. 38. (The Synthesis of Thermo-stable glasses) Abstract Only.

Poumellec et al; "Surface topography change induced by poling in Ge doped silica glass films"; 2003 OSA/BGPP 2003 MD 38.

Rusan et al; "A New Method for Recording Phase Optical Structures in Glasses"; Glass Physics and Chemistry, 2010, vol. 36, No. 4, pp. 513-516.

'Zheng et al; "Effect of Y2O3 addition on viscosity and crystallizationof the lithium aluminosilicate glasses"; Thermochimica Acta 456 (2007) 69-74.

'Zheng et al; "Structure and Properties of the Lithium Aluminosilicate Glasses with Yttria Addition"; vol. 22, No. 2 Wuhan University of Technology—(Abstract).

Brunkov et al; "Submicron-Resolved Relief Formation in Poled Glasses and Glass-Metal Nanocomposites"; Technical Physics Letters, 2008, vol. 34, No. 12 pp. 1030-1033.

Takagi et al; "Electrostatic Imprint Process for Glass"; Applied Physics Express 1 (20008) 024003.

International Search Report and Written Opinion PCT/US2016/065932 dated Apr. 5, 2017.

Gulati, "Frangibility of tempered soda-lime glass sheet" Glass Processing Days, Sep. 13-15, 1997. pp. 72-76.

Tang et al. "Methods for measurement and statistical analysis of the frangibility of strengthened glass" Frontiers in Materials, 2015 vol 2, article 50. 8 pgs.

* cited by examiner

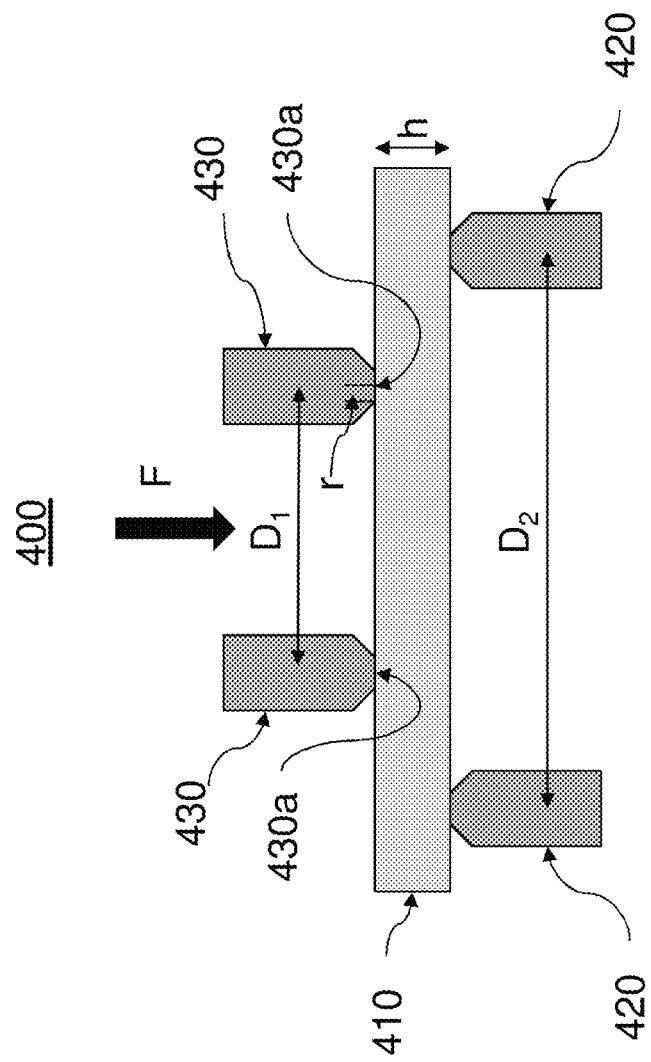

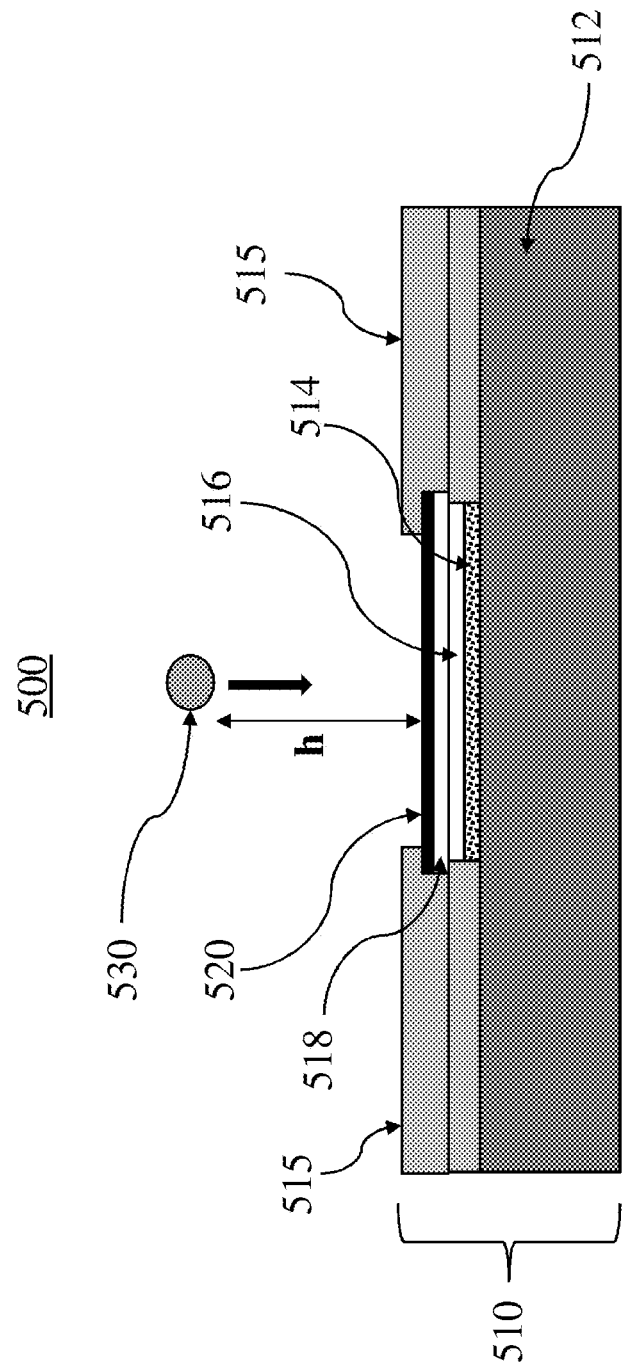

FUSION FORMABLE GLASS-BASED ARTICLES INCLUDING A METAL OXIDE CONCENTRATION GRADIENT

CROSS-REFERENCE TO RELATED APPLICATIONS

This application is a divisional application and claims the benefit of priority under 35 U.S.C. § 120 of U.S. application Ser. No. 15/376,057 filed on Dec. 12, 2016, which in turn, claims the benefit of priority under 35 U.S.C. § 119 of Provisional Application Ser. No. 62/365,534 filed on Jul. 22, 2016, U.S. Provisional Application Ser. No. 62/364,687 filed on Jul. 20, 2016, U.S. Provisional Application Ser. No. 62/320,095 filed on Apr. 8, 2016 and U.S. Provisional Application Ser. No. 62/266,411 filed on Dec. 11, 2015, the contents of each of which are relied upon and incorporated herein by reference in their entireties.

BACKGROUND

This disclosure relates to fusion-formable, glass-based articles exhibiting improved damage resistance, including improved fracture resistance, and more particularly to fusion-formable, glass and glass ceramic articles exhibiting a non-zero metal oxide concentration gradient or concentration that varies along a substantial portion of the thickness.

Glass-based articles often experience severe impacts that can introduce large flaws into a surface of such articles. Such flaws can extend to depths of up to about 200 micrometers (microns, or μm) from the surface. Traditionally, thermally tempered glass has been used to prevent failures caused by the introduction of such flaws into the glass because thermally tempered glass often exhibits large compressive stress (CS) layers (e.g., approximately 21% of the total thickness of the glass), which can prevent the flaws from propagating further into the glass and thus, can prevent failure. An example of a stress profile generated by thermal tempering is shown in FIG. 1. In FIG. 1, the thermally treated glass article 100 includes a first surface 101, a thickness $t_1$, and a surface CS 110. The thermally treated glass article 100 exhibits a CS that decreases from the first surface 101 to a depth of compression 130, as defined herein, at which depth the stress changes from compressive to tensile stress and reaches a maximum central tension (CT) 120.

Thermal tempering is currently limited to thick glass-based articles (i.e., glass-based articles having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as display (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliance, or any application that requires superior fracture resistance but thin and light-weight articles.

Although chemical strengthening is not limited by the thickness of the glass-based article in the same manner as thermally tempering, known chemically strengthened glass-based articles do not exhibit the stress profile of thermally tempered glass-based articles. An example of a stress profile generated by chemical strengthening (e.g., by an ion exchange process), is shown in FIG. 2. In FIG. 2, the chemically strengthened glass-based article 200 includes a first surface 201, a thickness $t_2$ and a surface CS 210. The glass-based article 200 exhibits a CS that decreases from the first surface 201 to a DOC 230, as defined herein, at which depth the stress changes from compressive to tensile stress and reaches a maximum CT 220. As shown in FIG. 2, such profiles exhibit a substantially flat CT region or CT region with a constant or near constant tensile stress along at least a portion of the CT region. Often, known chemically strengthened glass-based articles exhibit a lower maximum CT value, as compared to the maximum central value shown in FIG. 1.

Accordingly, there is a need for thin glass-based articles that exhibit improved fracture resistance.

SUMMARY

A first aspect of this disclosure pertains to a glass-based article including a first surface and a second surface opposing the first surface defining a thickness (t) in millimeters (mm), a concentration of a metal oxide that is both non-zero and varies along a thickness range from about 0·t to about 0.3·t; and a central tension (CT) region comprising a maximum CT of less than about $71.5/\sqrt{(t)}$ (MPa). In one or more embodiments, the when the glass-based article is fractured, the glass-based article fractures into at most 2 fragments/inch$^2$ as measured by the "Frangibility Test", as described Z. Tang, et al. *Automated Apparatus for Measuring the Frangibility and Fragmentation of Strengthened Glass*. Experimental Mechanics (2014) 54:903-912. The number of fragments is divided by the area of the sample being tested (in square inches), and the sample size used was a 5 cm by 5 cm (2 inch by 2 inch) square.

In one or more embodiments, the concentration of the metal oxide is non-zero and varies along the entire thickness. In one or more embodiments, the metal oxide generates a stress along the thickness range. The monovalent ion of the metal oxide may have the largest ionic diameter of all of the monovalent ions of the metal oxides in the glass-based substrate. The concentration of the metal oxide may decrease from the first surface to a point between the first surface and the second surface and increases from the point to the second surface. For example, the concentration of the metal oxide at the first surface may be about 1.5 (or more) times greater than the concentration of the metal oxides at a depth equal to about 0.5·t. In some instances, the concentration of the metal oxide is about 0.05 mol % or greater throughout the thickness (e.g., in the range from about 1 mol % to about 15 mol %). In some instances, the concentration of the metal oxide may decrease from the first surface to a value at a point between the first surface and the second surface and increase from the value to the second surface. The metal oxide may include any one or more of $Li_2O$, $Na_2O$, $K_2O$, $Rb_2O$, and $Cs_2O$. In one or more embodiments, the metal oxide concentration gradient may be present in the CT region of the glass-based article.

In one or more embodiments, the glass-based article includes a stress profile extending along the thickness, wherein all points of the stress profile between a thickness range from about 0·t up to 0.3·t and from greater than about 0.7·t to t, comprise a tangent having a slope with an absolute value of greater than about 0.1 MPa/micrometer (i.e., a tangent having a slope with a value that is less than about −0.1 MPa/micrometer or greater than about 0.1 MPa/micrometer). In some embodiments, the tangent may be described and used interchangeably with "local gradient", which is defined as the change in stress magnitude as a function of depth, as the depth increment approaches zero. In some embodiments, the stress profile comprises a maximum CS, a DOC and a maximum CT of less than about $71.5/\sqrt(t)$ (MPa), wherein the ratio of maximum CT to absolute value of maximum CS is in the range from about 0.01 to about 0.2 and wherein the DOC is about 0.1·t or greater.

In one or more embodiments, the glass-based articles described herein exhibit certain fracture behavior. For example, in one or more embodiments, when the glass-based article is fractured by a single event (i.e., a single impact such as being dropped or being impacted once with an implement), the glass-based article fractures into at most 2 fragments/inch$^2$, wherein the sample size used was a 5 cm by 5 cm (2 inch by 2 inch) square.

The glass-based article of one or more embodiments may include a surface compressive stress (CS) of about 300 MPa or greater, or about 400 MPa or greater. In some embodiments, the glass-based article includes a surface CS of about 200 MPa or greater and a chemical depth of layer of about 0.4·t or greater. In one or more embodiments, the CS may extend from the first surface to a DOC, wherein the DOC is about 0.1·t or greater. The glass-based article of some embodiments exhibits a ratio of maximum CT to absolute value of surface CS (which may include the maximum CS) in the range from about 0.01 to about 0.2. Optionally, the surface CS is greater than the maximum CT.

In one or more embodiments, the glass-based article includes a first metal oxide concentration and a second metal oxide concentration, wherein the first metal oxide concentration is in the range from about 0 mol % to about 15 mol % from a first thickness range from about 0·t to about 0.5·t, and wherein the second metal oxide concentration is in the range from about 0 mol % to about 10 mol % from a second thickness range from about 0 micrometers to about 25 micrometers. Optionally, the glass-based article includes a third metal oxide.

In one or more embodiments, the glass-based article includes a concentration of a metal oxide that is both non-zero and varies along a thickness range from about 0·t to about 0.3·t (or from about 0·t to about 0.4·t or from about 0·t to about 0.45.0, a surface compressive stress of greater than about 200 MPa or greater; and a CT region having a maximum CT of less than about $71.5/\sqrt(t)$ (MPa), wherein "71.5" is in units of MPa·(mm)^~0.5, and "t" is in millimeters (mm).

The glass-based article may have a thickness t of about 3 millimeters or less or about 1 millimeter or less. The glass-based article may have an amorphous structure, a crystalline structure or a combination of both. The glass-based article may exhibit a transmittance of about 88% or greater over a wavelength in the range from about 380 nm to about 780 nm. Moreover, in some embodiments, the glass-based article may exhibit a CIELAB color space coordinates, under a CIE illuminant F02, of L* values of about 88 and greater, a* values in the range from about −3 to about +3, and b* values in the range from about −6 to about +6.

In one or more embodiments, the glass-based article includes a Young's modulus of less than 80 GPa. The Young's modulus value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." The glass-based article includes a liquidus viscosity of about 100 kilopoise (kP) or greater.

The glass-based article may include a composition having any one or more of: a composition comprising a combined amount of $Al_2O_3$ and $Na_2O$ of greater than about 15 mol %, a composition comprising greater than about 4 mol % $Na_2O$, a composition substantially free of $B_2O_3$, ZnO, or both $B_2O_3$ and ZnO, and a composition comprising a non-zero amount of $P_2O_5$.

The glass-based article may include a monovalent ion (e.g., sodium ion or potassium ion) diffusivity of about 450 µm$^2$/hour or greater at about 460° C. In one or more embodiments, this monovalent ion diffusivity is exhibited in combination with and a DOC greater than about 0.15·t, and wherein the surface CS is 1.5 times the maximum CT or greater.

In some embodiments, the glass-based article comprises a fracture toughness (KO of about 0.7 MPa·m$^{1/2}$ or greater.

In one or more embodiments, the glass-based article exhibits a stored tensile energy of about greater than 0 J/m2 to less than 40 J/m$^2$.

In one or more embodiments, the glass-based article includes a stress profile including a CS region and a CT region, wherein the CT region is approximated by the equation Stress(x)=MaxT−(((CT$_n$·(n+1))/0.5n)·|(x/t)−0.5|n), wherein MaxT is a maximum tension value, CT$_n$ is less than or equal to MaxT and is a positive value in units of MPa, x is position along the thickness (t) in micrometers, and n is in the range from 1.5 to 5 (or from 1.5 to 2). In some embodiments, the CT region comprises a maximum CT value in the range from about 50 MPa to about 250 MPa and the maximum CT value is at a depth in the range from about 0.4t to about 0.6t. In some instances, from a thickness in the range from about 0t to about 0.1t, the stress profile comprises a slope whose magnitude (in absolute value) is in the range from about 20 MPa/micron to about 200 MPa/micron. In one or more embodiments, the stress profile is approximated by a combination of a plurality of error functions as measured from 0.5t to the surface.

A second aspect of this disclosure pertains to the use of a glass composition in a strengthened glass-based article, comprising (in mol %): $SiO_2$ in an amount in the range from about 60 to about 75, $Al_2O_3$ in an amount in the range from about 12 to about 20, $B_2O_3$ in an amount in the range from about 0 to about 5, $Li_2O$ in an amount in the range from about 2 to about 8, $Na_2O$ in an amount greater than 4, $P_2O_5$ in a non-zero amount, MgO in an amount in the range from about 0 to about 5, ZnO in an amount in the range from about 0 to about 3, CaO in an amount in the range from about 0 to about 5, wherein the glass composition is ion-exchangeable and is amorphous, wherein the total amount of $Al_2O_3$ and $Na_2O$ is greater than about 15 mol %, wherein the glass composition is substantially free of nucleating agents, and wherein the glass composition comprises a liquidus viscosity of about 100 kP or greater. In one or more embodiments, the glass composition is substantially free of $B_2O_3$, ZnO, or both $B_2O_3$ and ZnO.

A third aspect of this disclosure pertains to a glass substrate comprising a composition including, in mol %, $SiO_2$ in an amount in the range from about 60 to about 75, $Al_2O_3$ in an amount in the range from about 12 to about 20, $B_2O_3$ in an amount in the range from about 0 to about 5, $Li_2O$ in an amount in the range from about 2 to about 8, $Na_2O$ in an amount greater than about 4, MgO in an amount in the range from about 0 to about 5, ZnO in an amount in the range from about 0 to about 3, CaO in an amount in the range from about 0 to about 5, and $P_2O_5$ in a non-zero amount; wherein the glass substrate is ion-exchangeable and is amorphous, wherein total amount of $Al_2O_3$ and $Na_2O$ in the composition is greater than about 15 mol %, wherein the glass composition is substantially free of nucleating agents and comprises a liquidus viscosity of about 100 kP or greater.

In some embodiments, the glass substrate is amorphous and is strengthened, wherein the Na$_2$O concentration varies, wherein the composition is substantially free of nucleating agents, total amount of Al$_2$O$_3$ and Na$_2$O in the composition is greater than about 15 mol %, wherein the glass composition is substantially free of nucleating agents, and comprises a liquidus viscosity of about 100 kP or greater. In some embodiments the glass substrate includes a non-zero amount of P$_2$O$_5$.

A fourth aspect of this disclosure pertains to a device comprising: a housing having front, back, and side surfaces; electrical components that are at least partially inside the housing; a display at or adjacent to the front surface of the housing; and a cover substrate disposed over the display, wherein the cover substrate comprises a glass-based article according the embodiments described herein.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a is a schematic cross-sectional view of a ring-on-ring apparatus;

FIG. 7 is a schematic cross-sectional view of an embodiment of the apparatus that is used to perform the inverted ball on sandpaper (IBoS) test described in the present disclosure;

DETAILED DESCRIPTION

Figure 1:
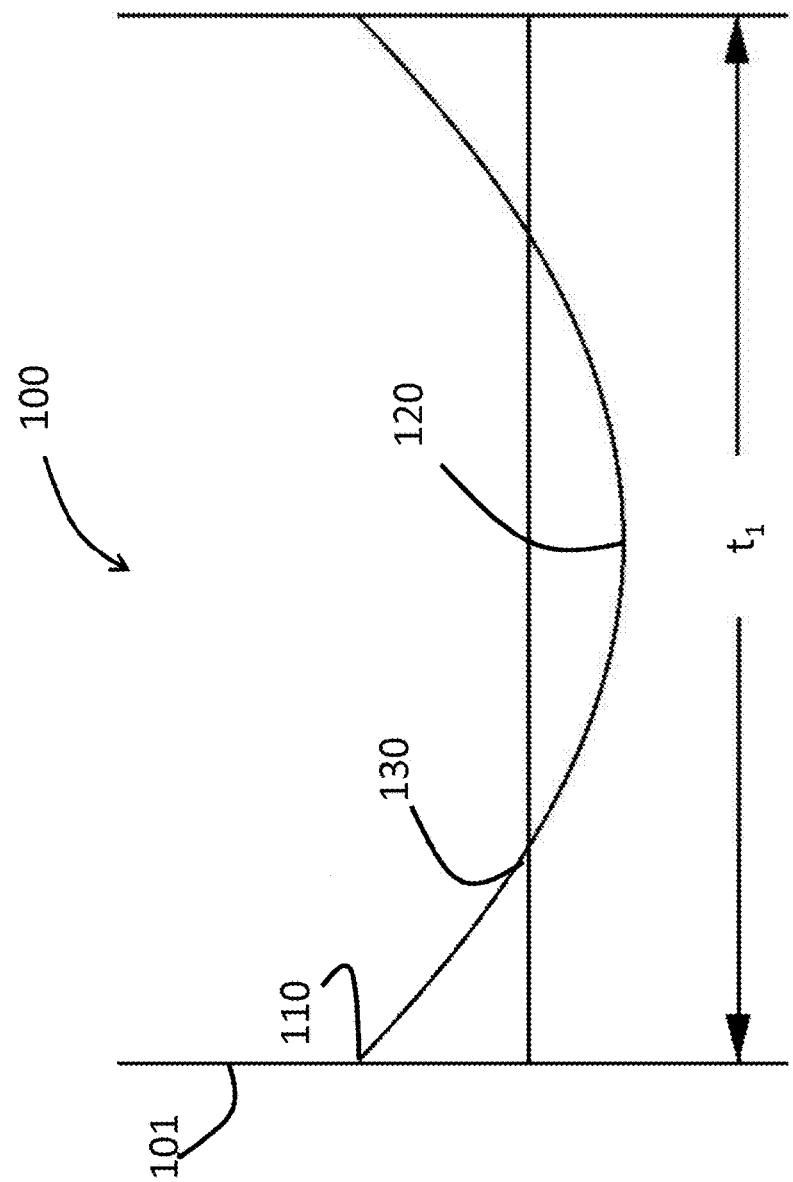
FIG. 1 is a cross-sectional view across a thickness of a known, thermally tempered glass article.

Reference will now be made in detail to various embodiments, examples of which are illustrated in the accompanying examples and drawings.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise specified, all temperatures are expressed in terms of degrees Celsius (° C.). As used herein the term "softening point" refers to the temperature at which the viscosity of a glass is approximately $10^{7.6}$ poise (P), the term "anneal point" refers to the temperature at which the viscosity of a glass is approximately $10^{7.6}$ poise, the term "200 poise temperature ($T^{200P}$)" refers to the temperature at which the viscosity of a glass is approximately 200 poise, the term "$10^{11}$ poise temperature" refers to the temperature at which the viscosity of a glass is approximately $10^{11}$ poise, the term "35 kP temperature ($T^{35kP}$)" refers to the temperature at which the viscosity of a glass is approximately 35 kilopoise (kP), and the term "160 kP temperature ($T^{160kP}$)" refers to the temperature at which the viscosity of a glass is approximately 160 kP.

Figure 2:
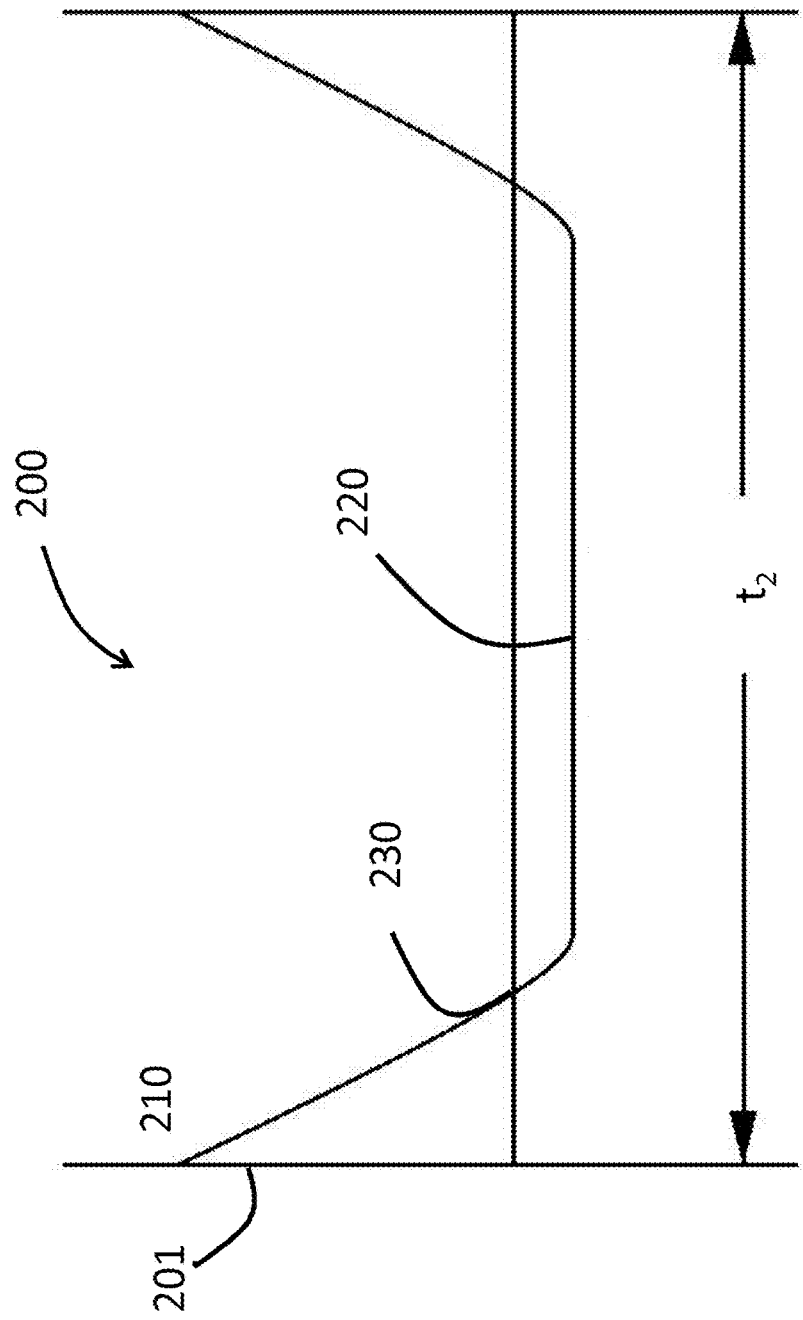
FIG. 2 is a cross-sectional view across a thickness of a known, chemically strengthened glass article.
Figure 3:
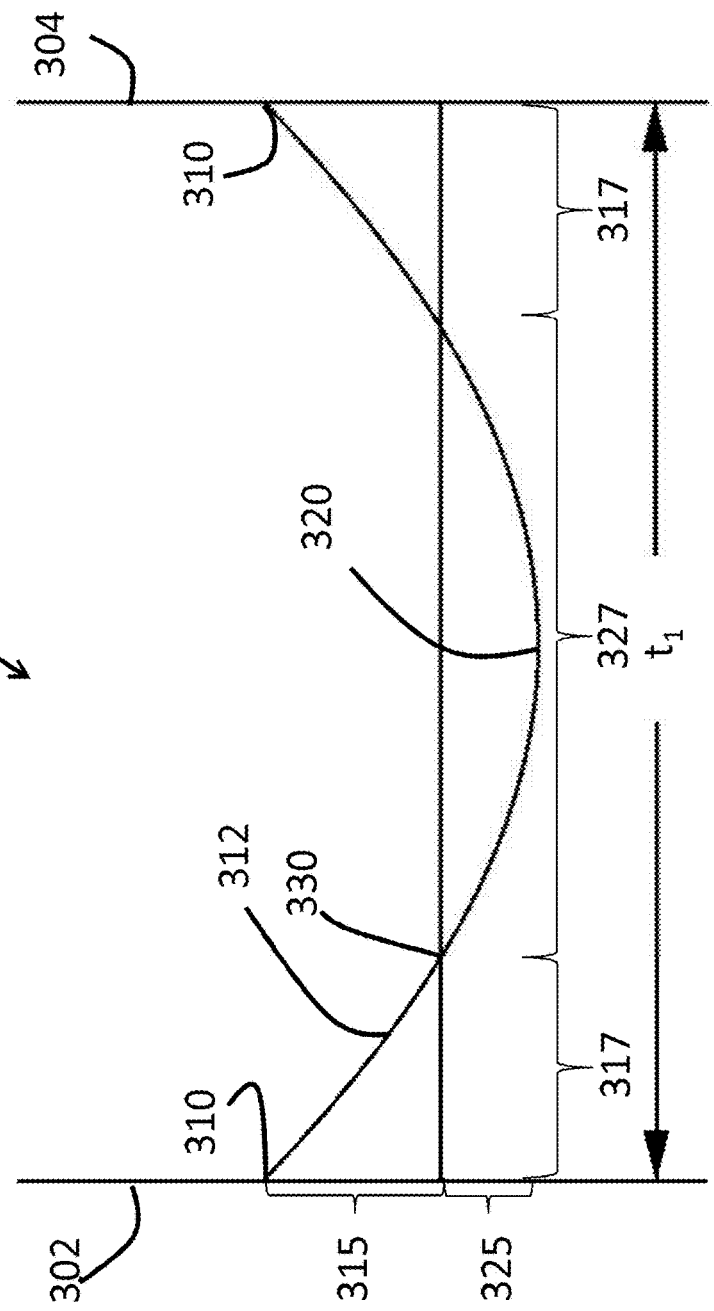
FIG. 3 is a cross-sectional view across a thickness of a chemically strengthened glass-based article according to one or more embodiments of this disclosure.

Referring to the drawings in general and to FIGS. 1-3 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, DOC refers to the depth at which the stress within the glass-based article changes compressive to tensile stress. At the DOC, the stress crosses from a positive (compressive) stress to a negative (tensile) stress (e.g., 130 in FIG. 1) and thus exhibits a stress value of zero.

As used herein, the terms "chemical depth", "chemical depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge-Optical Emission Spectroscopy (GD-OES)). In particular, to assess the depth of $Na_2O$ diffusion or Na+ ion concentration may be determined using EPMA and a surface stress meter (described in more detail below).

According to the convention normally used in the art, compression is expressed as a negative (<0) stress and tension is expressed as a positive (>0) stress, unless specifically noted otherwise. Throughout this description, however, when speaking in terms of compressive stress CS, such is given without regard to positive or negative values—i.e., as recited herein, CS=|CS|.

Described herein are thin, chemically strengthened glass-based articles that include glasses, such as silicate glasses including alkali-containing glass, and glass-ceramics that may be used as a cover glass for mobile electronic devices and touch-enabled displays. The glass-based articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In particular, the glass-based articles described herein are thin and exhibit stress profiles that are typically only achievable through tempering thick glass articles (e.g., having a thickness of about 2 mm or 3 mm or greater). The glass-based articles exhibit unique stress profiles along the thickness thereof. In some cases, the glass-based articles described herein exhibit a greater surface CS than tempered glass articles. In one or more embodiments, the glass-based articles have a compressive stress layer that extends deeper into the glass-based article (in which the CS decreases and increases more gradually than known chemically strengthened glass-based articles) such the glass-based article exhibits substantially improved fracture resistance, even when the glass-based article or a device including the same is dropped on a hard surface (e.g., granite) or a hard and rough surface (e.g., asphalt). The glass-based articles of one or more embodiments exhibit a greater maximum CT value than some known chemically strengthened glass substrates.

CS and depth of penetration of potassium ions ("Potassium DOL") are measured using those means known in the art. Potassium DOL is distinguished from DOC because it represents the depth of potassium penetration as a result of an ion exchange process. Potassium DOL is typically less than the DOC for the articles described herein. CS and Potassium DOL are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to a modified version of Procedure C described in ASTM standard C770-98 (2013), entitled "Standard Test Method for Measurement of Glass Stress-Optical Coefficient," the contents of which are incorporated herein by reference in their entirety. The modification includes using a glass disc as the specimen with a thickness of 5 to 10 mm and a diameter of 12.7 mm, wherein the disc is isotropic and homogeneous and core drilled with both faces polished and parallel. The modification also includes calculating the maximum force, Fmax to be applied. The force should be sufficient to produce 20 MPa or more compression stress. Fmax is calculated as follows:

$$F\max = 7.854 * D * h$$

Where:
Fmax=Force in Newtons
D=the diameter of the disc
h=the thickness of the light path
For each force applied, the stress is computed as follows:

$$\sigma_{MPa} = 8F/(\pi * D * h)$$

Where:
F=Force in Newtons
D=the diameter of the disc
h=the thickness of the light path DOC and maximum CT values are measured using a scattered light polariscope (SCALP). Refracted near-field (RNF) method or SCALP may be used to measure the stress profile. When the RNF method is utilized, the maximum CT value provided by SCALP is utilized. In particular, the stress profile measured by the RNF method is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass-based article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The RNF profile is then smoothed, and used for the CT region. As noted above, the FSM technique is used for the surface CS and slope of the stress profile in the CS region near the surface.

As stated above, the glass-based articles described herein are chemically strengthened by ion exchange and exhibit stress profiles that are distinguished from those exhibited by known strengthened glass articles. In this disclosure glass-based substrates are generally unstrengthened and glass-based articles generally refer to glass-based substrates that have been strengthened (by, for example, ion exchange). In this process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass-based substrate generate a stress in the resulting glass-based article.

Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass thickness, bath temperature and glass (or monovalent ion) diffusivity. However, temperatures and immersion times different from those described above may also be used.

In one or more embodiments, the glass-based substrates may be immersed in a molten salt bath of 100% $NaNO_3$ having a temperature from about 370° C. to about 480° C. In some embodiments, the glass-based substrate may be immersed in a molten mixed salt bath including from about 5% to about 90% $KNO_3$ and from about 10% to about 95% $NaNO_3$. In some embodiments, the glass-based substrate may be immersed in a molten mixed salt bath including $Na_2SO_4$ and $NaNO_3$ and have a wider temperature range (e.g., up to about 500° C.). In one or more embodiments, the glass-based article may be immersed in a second bath, after immersion in a first bath. Immersion in a second bath may include immersion in a molten salt bath including 100% $KNO_3$ for 15 minutes to 8 hours.

In one or more embodiments, the glass-based substrate may be immersed in a molten, mixed salt bath including NaNO$_3$ and KNO$_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass-based article. This spike can be achieved by single bath or multiple baths, with the bath(s) having a single composition or mixed composition, due to the unique properties of the glass compositions used in the glass-based articles described herein.

As illustrated in FIG. 3, the glass-based article 300 of one or more embodiments includes a first surface 302 and a second surface 304 opposing the first surface, defining a thickness t. In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeter, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

The glass-based article includes a stress profile that extends from the first surface 302 to the second surface 304 (or along the entire length of the thickness t). In the embodiment shown in FIG. 3, the stress profile 312 as measured by SCALP or RNF as described herein is illustrated. The y-axis represents the stress value and the x-axis represents the thickness or depth within the glass-based article.

As illustrated in FIG. 3, the stress profile 312 includes a CS layer 315 (with a surface CS 310), a CT layer 325 (with a maximum CT 320) and a DOC 330 at which the stress profile 312 turns from compressive to tensile. The CS layer has an associated depth or length 317 extending from a surface 302, 304 to the DOC 330. The CT layer 325 also has an associated depth or length 327 (CT region or layer).

The surface CS 310 may be about 150 MPa or greater or about 200 MPa or greater (e.g., about 250 MPa or greater, about 300 MPa or greater, about 400 MPa or greater, about 450 MPa or greater, about 500 MPa or greater, or about 550 MPa or greater). The surface CS 310 may be up to about 900 MPa, up to about 1000 MPa, up to about 1100 MPa, or up to about 1200 MPa. The surface CS values herein may also comprise the maximum CS. In some embodiments, the surface CS is less than the maximum CS.

The maximum CT 320 may be less than about 71.5/$\sqrt{(t)}$, where t is thickness is mm. In one or more embodiments, the maximum CT 320 may be greater than about 45/$\sqrt{(t)}$. In one or more embodiments, the maximum CT may be about 80 MPa or less, about 75 MPa or less, or about 70 MPa or less (e.g., about 60 MPa or less, about 55 MPa or less, 50 MPa or less, or about 40 MPa or less). In one or more embodiments, the lower limit of the maximum CT may be 25 MPa, 40 MPa or 50 MPa. In some embodiments, the maximum CT 320 may be in the range from about 25 MPa to about 80 MPa (e.g., from about 25 MPa to about 75 MPa, from about 25 MPa to about 70 MPa, from about 25 MPa to about 65 MPa, from about 40 MPa to about 80 MPa, from about 40 MPa to about 75 MPa, from about 40 MPa to about 70 MPa, from about 40 MPa to about 65 MPa, from about 45 MPa to about 80 MPa, from about 50 MPa to about 80 MPa, or from about 60 MPa to about 80 MPa).

The maximum CT 320 may be positioned at a range from about 0.3·t to about 0.7·t, from about 0.4·t to about 0.6·t or from about 0.45·t to about 0.55·t. It should be noted that any one or more of surface CS 310 and maximum CT 320 may be dependent on the thickness of the glass-based article. For example, glass-based articles having at thickness of about 0.8 mm may have a maximum CT of about 75 MPa or less. When the thickness of the glass-based article decreases, the maximum CT may increase. In other words, the maximum CT increases with decreasing thickness (or as the glass-based article becomes thinner).

In some embodiments, the ratio of the maximum CT 320 to the absolute value of surface CS 310 is in the range from about 0.01 to about 0.2 (e.g., in the range from about 0.01 to about 0.18, from about 0.01 to about 0.16, from about 0.01 to about 0.15, from about 0.01 to about 0.14, from about 0.01 to about 0.1, from about 0.02 to about 0.2, from about 0.04 to about 0.2, from about 0.05 to about 0.2, from about 0.06 to about 0.2, from about 0.08 to about 0.2, from about 0.1 to about 0.2, or from about 0.12 to about 0.2). In some embodiments, surface CS may be 1.5 times (or 2 times or 2.5 times) the maximum CT or greater. In some embodiments, the surface CS may be up to about 48 times the maximum CT, up to 40 times the maximum CT, up to 20 times the maximum CT, 10 up to times the maximum CT, or up to 8 times the maximum CT. The surface CS may be in the range from about 5 times up to about 50 times the maximum CT.

In one or more embodiments, the stress profile 312 comprises a maximum CS, which is typically the surface CS 310 and can be found at one or both of the first surface 302 and the second surface 304. In one or more embodiments, the CS layer or region 315 extends along a portion of the thickness 317 to the DOC 330 and a maximum CT 320. In one or more embodiments, the DOC 330 may be about 0.1·t or greater. For example, the DOC 330 may be about 0.12·t or greater, about 0.14·t or greater, about 0.15·t or greater, about 0.16·t or greater, 0.17·t or greater, 0.18·t or greater, 0.19·t or greater, 0.20·t or greater, about 0.21·t or greater, or up to about 0.25·t. In some embodiments, the DOC 330 is less than the chemical depth. The chemical depth may be about 0.4·t or greater, 0.5·t or greater, about 0.55·t or greater, or about 0.6·t or greater.

In one or more embodiments, the glass-based article comprises a potassium DOL in the range from about 6 micrometers to about 20 micrometers. In some embodiments, the potassium DOL may be expressed as a function of the thickness t of the glass-based article. In one or more embodiments, potassium DOL may be in the range from about 0.005t to about 0.05t. In some embodiments, the potassium DOL may be in the range from about 0.005t to about 0.05t, from about 0.005t to about 0.045t, from about 0.005t to about 0.04t, from about 0.005t to about 0.035t, from about 0.005t to about 0.03t, from about 0.005t to about 0.025t, from about 0.005t to about 0.02t, from about 0.005t to about 0.015t, from about 0.005t to about 0.01t, from about 0.006t to about 0.05t, from about 0.008t to about 0.05t, from about 0.01t to about 0.05t, from about 0.015t to about 0.05t, from about 0.02t to about 0.05t, from about 0.025t to about 0.05t, from about 0.03t to about 0.05t, or from about 0.01t to about 0.02t.

In one or more embodiments, the compressive stress value at the potassium DOL depth may be in the range from about 50 MPa to about 300 MPa. In some embodiments, the compressive stress value at the potassium DOL depth may be in the range from about 50 MPa to about 280 MPa, from about 50 MPa to about 260 MPa, from about 50 MPa to about 250 MPa, from about 50 MPa to about 240 MPa, from about 50 MPa to about 220 MPa, from about 50 MPa to about 200 MPa, from about 60 MPa to about 300 MPa, from about 70 MPa to about 300 MPa, from about 75 MPa to about 300 MPa, from about 80 MPa to about 300 MPa, from about 90 MPa to about 300 MPa, from about 100 MPa to about 300 MPa, from about 1100 MPa to about 300 MPa, from about 120 MPa to about 300 MPa, from about 130 MPa to about 300 MPa, or from about 150 MPa to about 300 MPa.

In one or more embodiments, the stress profile 312 may be described as parabolic-like in shape. In some embodiments, the stress profile along the region or depth of the glass-based article exhibiting tensile stress exhibits a parabolic-like shape. In one or more specific embodiments, the stress profile 312 is free of a flat stress (either compressive or tensile) portion or a portion that exhibits a substantially constant stress (either compressive or tensile). In some embodiments, the CT region exhibits a stress profile that is substantially free of a flat stress or free of a substantially constant stress. In one or more embodiments, all points of the stress profile 312 between a thickness range from about 0·t up to about 0.2·t and greater than 0.8·t to t (or from about 0·t to about 0.3·t and greater than 0.7.0 comprise a tangent having a slope that is less than about −0.1 MPa/micrometer or greater than about 0.1 MPa/micrometer. In some embodiments, the slope of the tangent may be less than about −0.2 MPa/micrometer or greater than about 0.2 MPa/micrometer. In some more specific embodiments, the slope of the tangent may be less than about −0.3 MPa/micrometer or greater than about 0.3 MPa/micrometer. In even more specific embodiments, the slope of the tangent may be less than about −0.5 MPa/micrometer or greater than about 0.5 MPa/micrometer. In other words, the stress profile of one or more embodiments along these thickness ranges (i.e., 0·t up to about 0.2·t and greater than 0.8t, or from about 0t to about 0.3·t and 0.7·t or greater) exclude points having a tangent with zero slope, or slope approximating zero, or flat slope. Without being bound by theory, known error function or quasi-linear stress profiles have points along these thickness ranges (i.e., from about 0·t up to about 0.2·t and greater than 0.8·t, or from about 0·t to about 0.3·t and 0.7·t or greater) that have a tangent with a slope zero or of a value that is close to zero, i.e., that is in the range from greater than about −0.1 MPa/micrometer to less than about 0.1 MPa/micrometer (indicating a flat or zero slope stress profile along such thickness ranges, as shown in FIG. 2, 220). The glass-based articles of one or more embodiments of this disclosure do not exhibit such a stress profile having a flat or zero slope stress profile along these thickness ranges, as shown in FIG. 3.

In one or more embodiments, the glass-based article exhibits a stress profile in a thickness range from about 0.1·t to 0.3·t and from about 0.7·t to 0.9·t that comprises a maximum-slope tangent and a minimum-slope tangent. In some instances, the difference between the maximum-slope tangent and the minimum-slope tangent is about 3.5 MPa/micrometer or less, about 3 MPa/micrometer or less, about 2.5 MPa/micrometer or less, or about 2 MPa/micrometer or less.

In one or more embodiments, the glass-based article includes a stress profile 312 that is substantially free of any flat segments that extend in a depth direction or along at least a portion of the thickness t of the glass-based article. In other words, the stress profile 312 is substantially continuously increasing or decreasing along the thickness t. In some embodiments, the stress profile is substantially free of any flat segments in a depth direction having a length of about 10 micrometers or more, about 50 micrometers or more, or about 100 micrometers or more, or about 200 micrometers or more. As used herein, the term "flat" refers to a slope having a magnitude of less than about 0.5 MPa/micrometer, or less than about 0.2 MPa/micrometer along the flat segment. In some embodiments, one or more portions of the stress profile that are substantially free of any flat segments in a depth direction are present at depths within the glass-based article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free of flat segments. As used herein "linear" includes line segments having flat slope as well as line segments not having flat slopes; for example of the latter, see FIG. 11 within a depth of about 12 microns from the surface.

In some embodiments, the stress profile may include linear segments at depths from about 0t up to about 0.1t and may be substantially free of flat segments at depths of about 0.1t to about 0.4t. In some embodiments, the stress profile for a thickness in the range from about 0t to about 0.1t may have a slope whose magnitude (in absolute value) is in the range from about 20 MPa/micron to about 200 MPa/micron. As will be described herein, such embodiments may be formed using a single ion-exchange process by which the bath includes two or more alkali salts or is a mixed alkali salt bath or multiple (e.g., 2 or more) ion exchange processes.

In one or more embodiments, the glass-based article may be described in terms of the shape of the stress profile along the CT region (327 in FIG. 3). For example, in some embodiments, the stress profile along the CT region (where stress is in tension) may be approximated by Equation (1):

$$\text{Stress}(x) = \text{Max}T - (((CT_n - (n+1))/0.5^n) \cdot |(x/t) - 0.5|^n) \quad (1)$$

Figure 4:
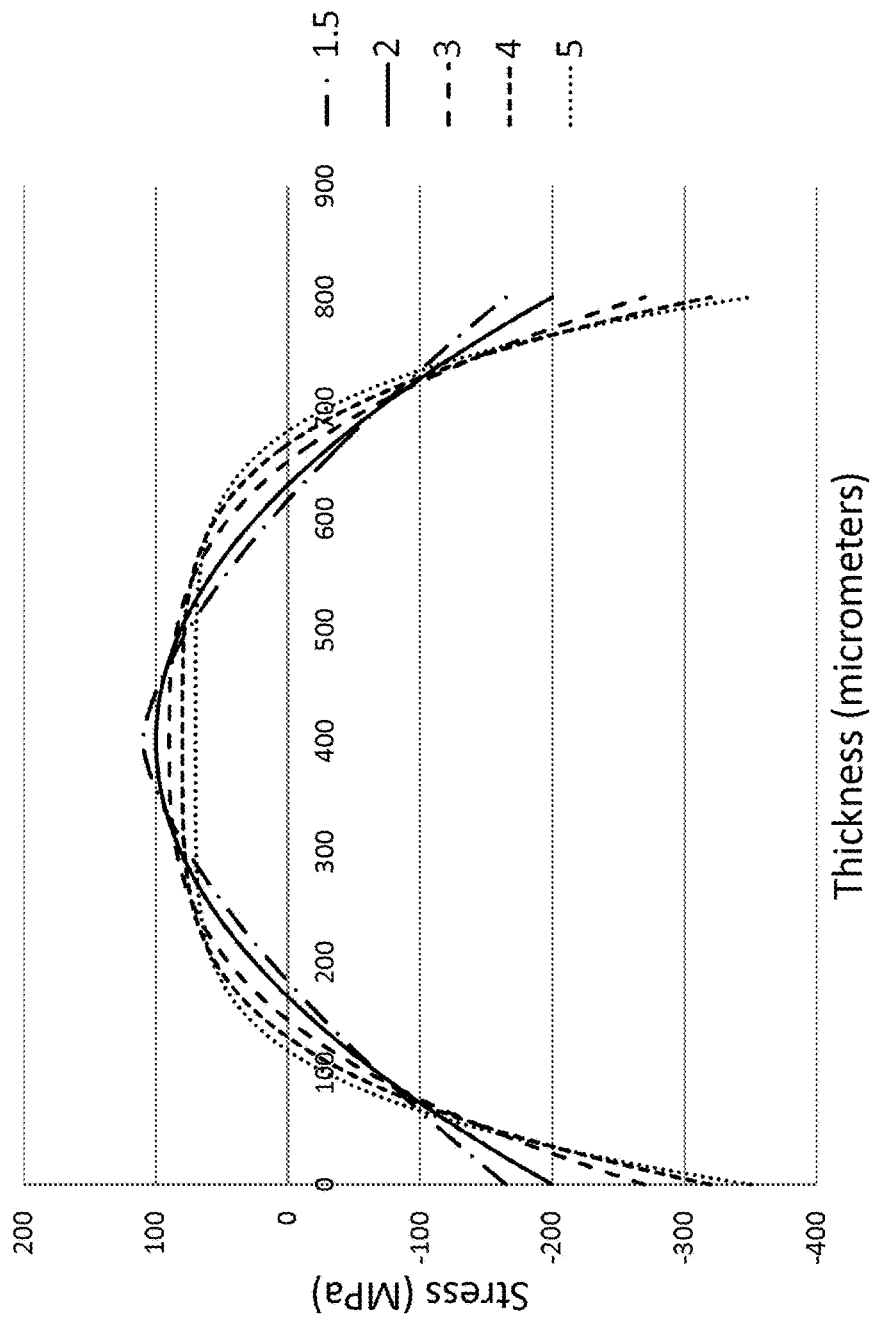
FIG. 4 is a graph illustrating various stress profiles according to one or more embodiments of this disclosure.

In Equation (1), the stress (x) is the stress value at position x. Here the stress is positive (tension). In Equation (1), MaxT is the maximum tension value and $CT_n$ is the tension value at n and is less than or equal to MaxT. Both MaxT and $CT_n$ are positive values in MPa. The value x is position along the thickness (t) in micrometers, with a range from 0 to t; x=0 is one surface (302, in FIG. 3), x=0.5t is the center of the glass-based article (at which position stress(x)=MaxT), and x=t is the opposite surface (304, in FIG. 3). MaxT used in Equation (1) is equivalent to the maximum CT, which may be less than about $71.5/\sqrt{(t)}$. In some embodiments, the MaxT used in Equation (1) may be in the range from about 50 MPa to about 80 MPa (e.g., from about 60 MPa to about 80 MPa, from about 70 MPa to about 80 MPa, from about 50 MPa to about 75 MPa, from about 50 MPa to about 70 MPa, or from about 50 MPa to about 65 MPa), and n is a fitting parameter from 1.5 to 5 (e.g., 2 to 4, 2 to 3 or 1.8 to 2.2) or from about 1.5 to about 2. In one or more embodiments, n=2 can provide a parabolic stress profile, exponents that deviate from n=2 provide stress profiles with near parabolic stress profiles. FIG. 4 is a graph illustrating various stress profiles according to one or more embodiments of this disclosure, based on changes in the fitting parameter n.

In one or more embodiments, CTn may be less than MaxT where there is a compressive stress spike on one or both major surfaces of the glass-based article. In one or more embodiments, CTn is equal to MaxT when there is no compressive stress spike on one or both major surfaces of the glass-based article.

In some embodiments, the stress profile may be modified by heat treatment. In such embodiments, the heat treatment may occur before any ion-exchange processes, between ion-exchange processes, or after all ion-exchange processes. In some embodiments, the heat treatment may reduce the absolute value of the magnitude of the slope of the stress profile at or near the surface. In some embodiments, where a steeper or greater slope is desired at the surface, an ion-exchange process after the heat treatment may be utilized to provide a "spike" or to increase the slope of the stress profile at or near the surface.

In one or more embodiments, the stress profile 312 is generated due to a non-zero concentration of a metal oxide(s) that varies along a portion of the thickness. As mentioned above, the variation in metal oxide concentration may be referred to herein as a metal oxide concentration gradient. In some embodiments, the concentration of a metal oxide is non-zero and varies, both along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t or from about 0·t to about 0.48·t. The metal oxide may be described as generating a stress in the glass-based article. The variation in concentration may be continuous along the above-referenced thickness ranges. Variation in concentration may include a change in metal oxide concentration of about 0.2 mol % along a thickness segment of about 100 micrometers. This change may be measured by known methods in the art including microprobe, as shown in Example 1. The metal oxide that is non-zero in concentration and varies along a portion of the thickness may be described as generating a stress in the glass-based article.

The variation in concentration may be continuous along the above-referenced thickness ranges. In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na– and K– containing bath is used in the ion exchange process, the concentration of $K+$ ions in the glass-based article is greater than the concentration of $Na+$ ions at shallower depths, while the concentration of $Na+$ is greater than the concentration of $K+$ ions at deeper depths. This is due, in part, due to the size of the monovalent ions that are exchanged into the glass for smaller monovalent ions. In such glass-based articles, the area at or near the surface comprises a greater CS due to the greater amount of larger ions (i.e., $K+$ ions) at or near the surface. This greater CS may be exhibited by a stress profile having a steeper slope at or near the surface (i.e., a spike in the stress profile at the surface).

The concentration gradient or variation of one or more metal oxides is created by chemically strengthening a glass-based substrate, as previously described herein, in which a plurality of first metal ions in the glass-based substrate is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius of the first alkali metal ion. The second metal ion is present in the glass-based substrate as an oxide thereof (e.g., $Na_2O$, $K_2O$, $Rb_2O$, $Cs_2O$ or a combination thereof).

In one or more embodiments, the metal oxide concentration gradient extends through a substantial portion of the thickness t or the entire thickness t of the glass-based article, including the CT layer 327. In one or more embodiments, the concentration of the metal oxide is about 0.5 mol % or greater in the CT layer 327. In some embodiments, the concentration of the metal oxide may be about 0.5 mol % or greater (e.g., about 1 mol % or greater) along the entire thickness of the glass-based article, and is greatest at the first surface 302 and/or the second surface 304 and decreases substantially constantly to a point between the first surface 302 and the second surface 304. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT layer 327. The total concentration of the particular metal oxide in the glass-based article may be in the range from about 1 mol % to about 20 mol %.

In one or more embodiments, the glass-based article includes a first metal oxide concentration and a second metal oxide concentration, such that the first metal oxide concentration is in the range from about 0 mol % to about 15 mol % along a first thickness range from about 0t to about 0.5t, and the second metal oxide concentration is in the range from about 0 mol % to about 10 mol % from a second thickness range from about 0 micrometers to about 25 micrometers (or from about 0 micrometers to about 12 micrometers); however, the concentration of one or both the first metal oxide and the second metal oxide is non-zero along a substantial portion or the entire thickness of the glass-based article. The glass-based article may include an optional third metal oxide concentration. The first metal oxide may include $Na_2O$ while the second metal oxide may include $K_2O$.

The concentration of the metal oxide may be determined from a baseline amount of the metal oxide in the glass-based article prior to being modified to include the concentration gradient of such metal oxide.

In one or more embodiments, the glass-based articles may be described in terms of how they fracture and the fragments that result from such fracture, as measured by the "Frangibility Test", as described Z. Tang, et al. *Automated Apparatus for Measuring the Frangibility and Fragmentation of Strengthened Glass.* Experimental Mechanics (2014) 54:903-912. In one or more embodiments, when fractured, the glass-based articles fracture into 2 or less fragments per square inch (or per 6.4516 square centimeters) of the glass-based article (prior to fracture), wherein the sample size used was a 5 cm by 5 cm (2 inch by 2 inch) square.

In one or more embodiments, after chemically strengthening the glass-based article, the resulting stress profile 312 of the glass-based article provides improved fracture resistance. For example, in some embodiments, upon fracture, the glass-based article comprises fragments having an average longest cross-sectional dimension of less than or equal to about 2·t (e.g., 1.8·t, 1.6·t, 1.5·t, 1.4·t, 1.2·t or 1·t or less) as measured by the "Frangibility Test", as described Z. Tang, et al. *Automated Apparatus for Measuring the Frangibility and Fragmentation of Strengthened Glass*. Experimental Mechanics (2014) 54:903-912. The number of fragments is divided by the area of the sample being tested (in square inches), wherein the sample size used was a 5 cm by 5 cm (2 inch by 2 inch) square.

In one or more embodiments, the glass-based articles may exhibit a fracture toughness ($K_{1C}$) of about 0.7 MPa·m$^{1/2}$ or greater. In some cases, the fracture toughness may be about 0.8 MPa·m$^{1/2}$ or greater, or about 0.9 MPa·m$^{1/2}$ or greater. In some embodiments the fracture toughness may be in the range from about 0.7 MPa·m$^{1/2}$ to about 1 MPa·m$^{1/2}$.

In some embodiments, the substrate may also be characterized as having a hardness from about 500 HVN to about 800 HVN (kgf/mm$^2$), as measured by Vicker's hardness test at a load of 200 g. In some embodiments, the glass-based article may include a Vicker's hardness is in the range from about 600 HVN to about 800 HVN.

The glass-based articles described herein may exhibit a stored tensile energy in the range from greater than 0 J/m$^2$ to about 40 J/m$^2$. In some instances, the stored tensile energy may be in the range from about 5 J/m$^2$ to about 40 J/m$^2$, from about 10 J/m$^2$ to about 40 J/m$^2$, from about 15 J/m$^2$ to about 40 J/m$^2$, from about 20 J/m$^2$ to about 40 J/m$^2$, from about 1 J/m$^2$ to about 35 J/m$^2$, from about 1 J/m$^2$ to about 30 J/m$^2$, from about 1 J/m$^2$ to about 25 J/m$^2$, from about 1 J/m$^2$ to about 20 J/m$^2$, from about 1 J/m$^2$ to about 15 J/m$^2$, from about 1 J/m$^2$ to about 10 J/m$^2$, from about 10 J/m$^2$ to about 30 J/m$^2$, from about 10 J/m$^2$ to about 25 J/m$^2$, from about 15 J/m$^2$ to about 30 J/m$^2$, from about 15 J/m$^2$ to about 25 J/m$^2$, from about 18 J/m$^2$ to about 22 J/m$^2$, from about 25 J/m$^2$ to about 40 J/m$^2$, or from about 25 J/m$^2$ to about 30 J/m$^2$. The thermally and chemically strengthened glass-based articles of one or more embodiments may exhibit a stored tensile energy of about 6 J/m$^2$ or greater, about 10 J/m$^2$ or greater, about 15 J/m$^2$ or greater, or about 20 J/m$^2$ or greater.

Stored tensile energy is calculated using the following Equation (2):

$$\text{stored tensile energy } (J/m^2) = [(1-v)/E] \int (\sigma^2)(dt) \quad (2)$$

where v is Poisson's ratio, E is the Young's modulus (in MPa), σ is stress (in MPa) and the integration is computed across the thickness (in microns) of the tensile region only.

The glass-based articles described herein generally have Young's modulus or Young's modulus of less than about 80 GPa (e.g., about 75 GPa or less, about 70 GPa or less, about 65 GPa or less, or about 60 GPa or less). The lower limit of the Young's modulus may be greater than about 65 GPa. The Young's modulus, which is intrinsic to the composition of the glass-based article, can provide the desired high stiffness, which is an extrinsic property, to the ultimate glass-based article that is produced therefrom.

In some embodiments, the glass-based article comprises a high liquidus viscosity that enables the formation of the glass-based articles via down-draw techniques (e.g., fusion draw, slot draw, and other like methods), which can provide high precision surface smoothness. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature). The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96(2012), titled "Standard Practice for Measuring Viscosity of Glass Above the Softening Point". In general, the glass-based articles (or the compositions used to form such articles) described herein a liquidus viscosity of about 100 kilopoise (kP) or greater. In scenarios where a higher liquidus viscosity is desired for down-draw processability, the glass-based articles (or the compositions used to form such articles) exhibit a liquidus viscosity of about 200 kP or more (e.g., about 600 kP or greater).

In one or more embodiments, the glass-based articles exhibit a Knoop Lateral Cracking Scratch Threshold in the range from about 4 N to about 7 N, from about 4.5 N to about 7 N, from about 5 N to about 7 N, from about 4 N to about 6.5 N, from about 4 N to about 6 N, or from about 5 N to about 6 N. As used herein, Knoop Scratch Lateral Cracking Threshold is the onset of lateral cracking (in 3 or more of 5 indentation events). In Knoop Lateral Cracking Scratch Threshold testing, samples of the glass substrates and articles were first scratched with a Knoop indenter under a dynamic or ramped load to identify the lateral crack onset load range for the sample population. Once the applicable load range is identified, a series of increasing constant load scratches (3 minimum or more per load) are performed to identify the Knoop scratch threshold. The Knoop scratch threshold range can be determined by comparing the test specimen to one of the following 3 failure modes: 1) sustained lateral surface cracks that are more than two times the width of the groove, 2) damage is contained within the groove, but there are lateral surface cracks that are less than two times the width of groove and there is damage visible by naked eye, or 3) the presence of large subsurface lateral cracks which are greater than two times the width of groove and/or there is a median crack at the vertex of the scratch.

In one or more embodiments, the glass-based articles exhibit a Vicker's Indentation Fracture Threshold in the range from about 10 kgf or greater, about 12 kgf or greater, or about 15 kgf or greater. As used herein, Vicker's Indentation Fracture Threshold is the onset of median/radial cracking (in 3 or more of 5 indentation events) extending from at least one corner of the indentation site. In Vicker's Indentation Fracture Threshold testing, samples of the glass substrates and articles were repeatedly indented with a diamond tip (at 136° angle) at increasing loads. Each indentation has the potential to produce 4 radial cracks, one from each corner of the indent. By counting the average number of radial cracks at each indentation load, the cracking threshold is the load at which there is an average of 2 cracks per indent (or the 50% cracking threshold).

Figure 5A:
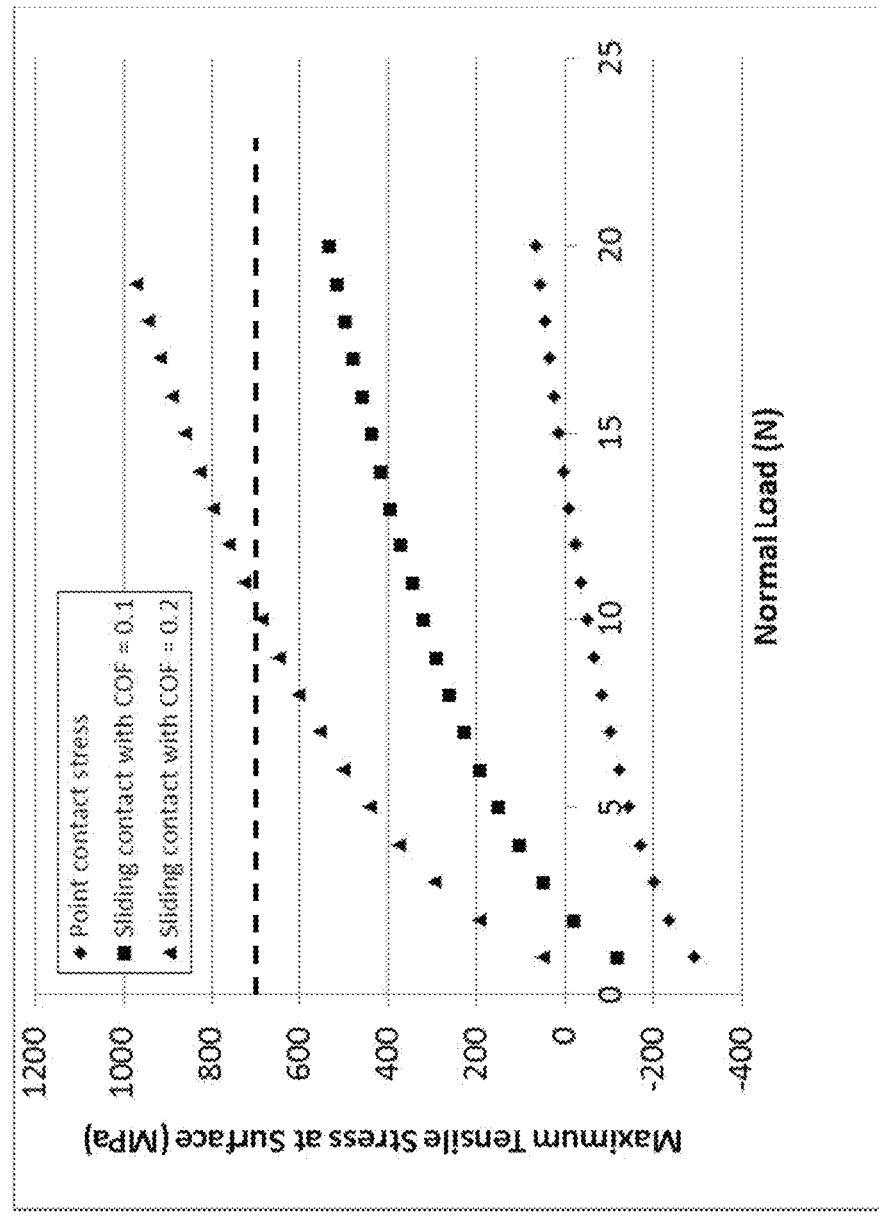
FIGS. 5A-5B are graphs showing the maximum tensile stress (MPa) as a function of normal load (N) applied to a surface of a glass-based article according to one or more embodiments.
Figure 5B:
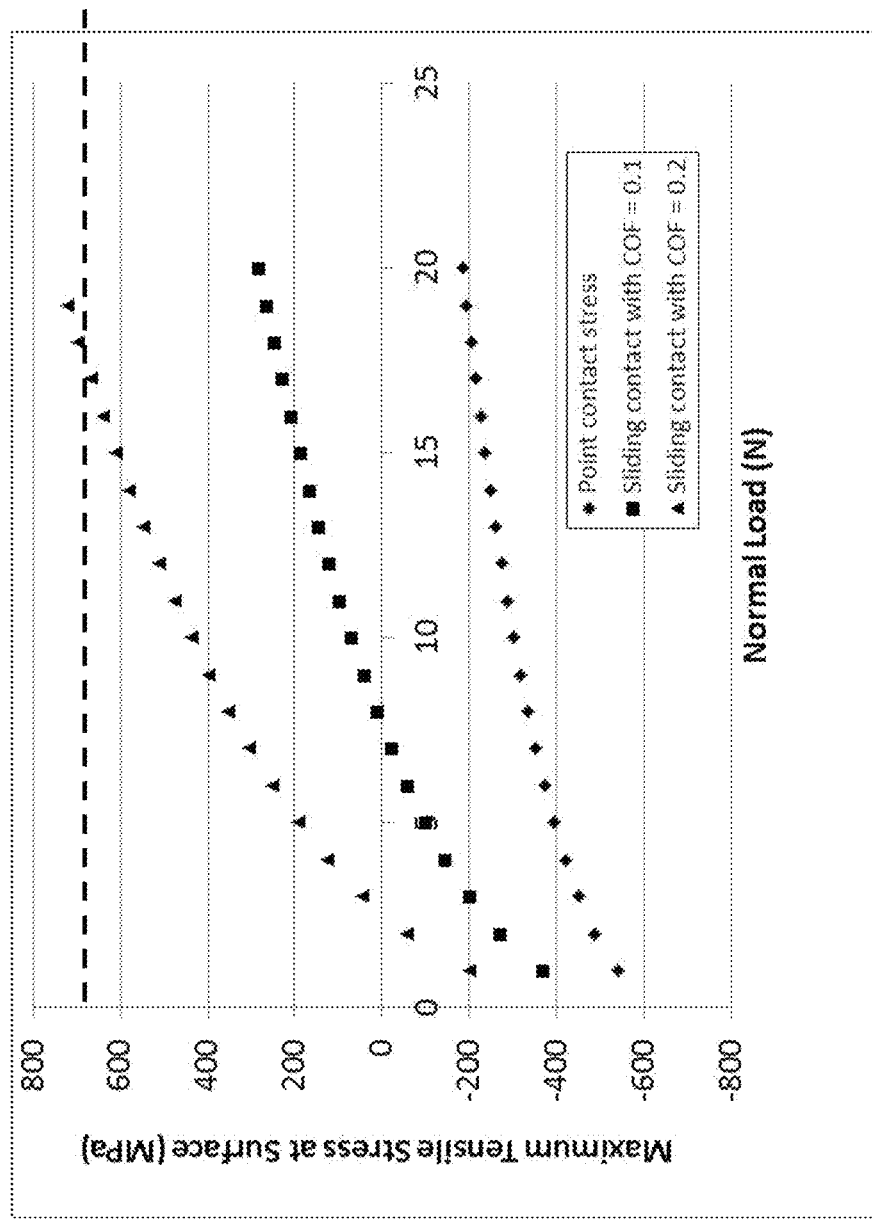

In one or more embodiments, the scratch resistance of the glass-based articles described herein may be measured by sliding a 500-micrometer glass ball having the same composition as the glass-based substrates described herein. For example, the composition of the ball may include about 64 mol % $SiO_2$, 15.67 mol % $Al_2O_3$, 6.4 mol % $Li_2O$, 10.8 mol % Na$_2$O, 1.2 mol % ZnO, 0.04 mol % SnO$_2$, and 2.5 mol % P$_2$O$_5$. FIGS. 5A-B show the maximum tensile stress applied to the surface (in MPa) from the glass ball as it is applied to the surface of a glass-based article of one or more embodiments. In FIGS. 5A-5B, the contact stress (diamond data points) and sliding contact force assuming a coefficient of friction of 0.1 (square data points) and coefficient of friction of 0.2 (triangle data points), are shown as a function of normal load (N) applied. In FIG. 5A, the glass-based article had a surface CS of about 500 MPa. In FIG. 5B, the glass-based article had a surface CS of about 750 MPa.

In one or more embodiments, the glass-based articles exhibit improved surface strength when subjected to abraded ring-on-ring (AROR) testing. The strength of a material is the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based article is abraded as described in ASTM C158-02, Annex 2, to normalize and/or control the surface defect condition of the sample using the apparatus shown in Figure A2.1 of ASTM C158-02. The abrasive material is typically sandblasted onto the surface 110 of the glass-based article at a load of 15 psi using an air pressure of 304 kPa (44 psi); although in the Examples below, the abrasive material was sandblasted onto the surface 110 at other loads (e.g., 25 psi or 45 psi). After air flow is established, 5 cm$^3$ of abrasive material is dumped into a funnel and the sample is sandblasted for 5 seconds after introduction of the abrasive material.

For the AROR test, a glass-based article having at least one abraded surface 410 as shown in FIG. 6 is placed between two concentric rings of differing size to determine equibiaxial flexural strength (i.e., the maximum stress that a material is capable of sustaining when subjected to flexure between two concentric rings), as also shown in FIG. 6. In the AROR configuration 400, the abraded glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from about 0.2 to about 0.5. In some embodiments, D1/D2 is about 0.5. Loading and support rings 130, 120 should be aligned concentrically to within 0.5% of support ring diameter D2. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, h/2≤r≤3h/2, where h is the thickness of glass-based article 410. Loading and support rings 430, 420 are typically made of hardened steel with hardness HRc>40. AROR fixtures are commercially available.

The intended failure mechanism for the AROR test is to observe fracture of the glass-based article 410 originating from the surface 430a within the loading ring 430. Failures that occur outside of this region—i.e., between the loading rings 430 and support rings 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass-based article depends on the presence of surface flaws. However, the likelihood of a flaw of a given size being present cannot be precisely predicted, as the strength of glass is statistical in nature. A probability distribution can therefore generally be used as a statistical representation of the data obtained.

In some embodiments, the glass-based articles described herein have a surface or equibiaxial flexural strength of 20 kgf or more, and up to about 30 kgf as determined by AROR testing using a load of 25 psi or even 45 psi to abrade the surface. In other embodiments, the surface strength is 25 kgf or more, and in still other embodiments, 30 kgf or more.

Figure 8:
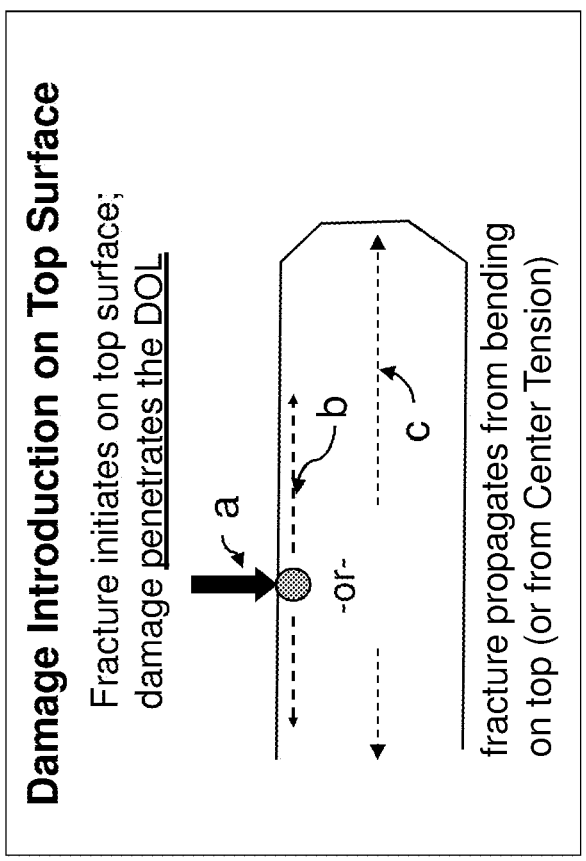
FIG. 8 is a schematic cross-sectional representation of the dominant mechanism for failure due to damage introduction plus bending that typically occurs in glass-based articles that are used in mobile or hand held electronic devices.

In some embodiments, the glass-based articles described herein may be described in terms of performance in an inverted ball on sandpaper (IBoS) test. The IBoS test is a dynamic component level test that mimics the dominant mechanism for failure due to damage introduction plus bending that typically occurs in glass-based articles that are used in mobile or hand held electronic devices, as schematically shown in FIG. 7. In the field, damage introduction (a in FIG. 8) occurs on the top surface of the glass-based article. Fracture initiates on the top surface of the glass-based article and damage either penetrates the glass-based article (b in FIG. 8) or the fracture propagates from bending on the top surface or from the interior portions of the glass-based article (c in FIG. 8). The IBoS test is designed to simultaneously introduce damage to the surface of the glass and apply bending under dynamic load. In some instances, the glass-based article exhibits improved drop performance when it includes a compressive stress than if the same glass-based article does not include a compressive stress.

An IBoS test apparatus is schematically shown in FIG. 6. Apparatus 500 includes a test stand 510 and a ball 530. Ball 530 is a rigid or solid ball such as, for example, a stainless steel ball, or the like. In one embodiment, ball 530 is a 4.2 gram stainless steel ball having diameter of 10 mm. The ball 530 is dropped directly onto the glass-based article sample 518 from a predetermined height h. Test stand 510 includes a solid base 512 comprising a hard, rigid material such as granite or the like. A sheet 514 having an abrasive material disposed on a surface is placed on the upper surface of the solid base 512 such that surface with the abrasive material faces upward. In some embodiments, sheet 514 is sandpaper having a 30 grit surface and, in other embodiments, a 180 grit surface. The glass-based article sample 518 is held in place above sheet 514 by sample holder 515 such that an air gap 516 exists between glass-based article sample 518 and sheet 514. The air gap 516 between sheet 514 and glass-based article sample 518 allows the glass-based article sample 518 to bend upon impact by ball 530 and onto the abrasive surface of sheet 514. In one embodiment, the glass-based article sample 218 is clamped across all corners to keep bending contained only to the point of ball impact and to ensure repeatability. In some embodiments, sample holder 514 and test stand 510 are adapted to accommodate sample thicknesses of up to about 2 mm. The air gap 516 is in a range from about 50 µm to about 100 µm. Air gap 516 is adapted to adjust for difference of material stiffness (Young's modulus, Emod), but also includes the Young's modulus and thickness of the sample. An adhesive tape 520 may be used to cover the upper surface of the glass-based article sample to collect fragments in the event of fracture of the glass-based article sample 518 upon impact of ball 530.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 9:
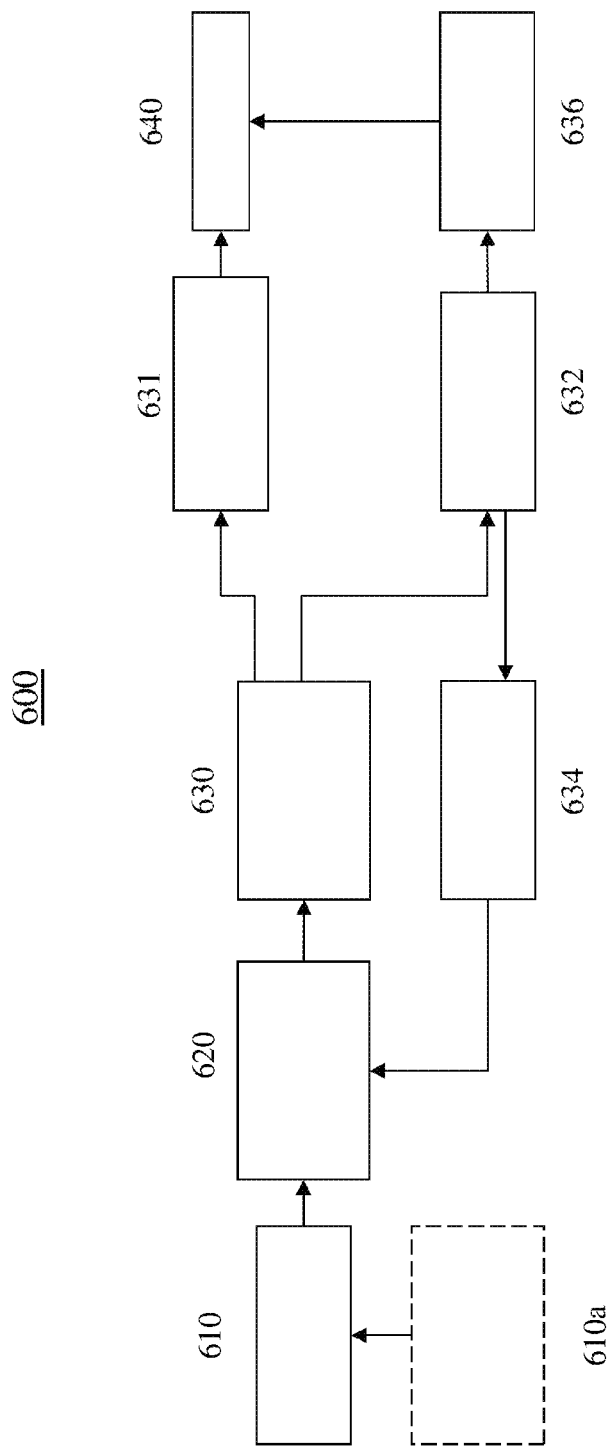
FIG. 9 is a flow chart for a method of conducting the IBoS test in the apparatus described herein.

In one aspect, a method 600 of conducting the IBoS test using the apparatus 500 described hereinabove is shown in FIG. 9. In Step 610, a glass-based article sample (218 in FIG. 6) is placed in the test stand 510, described previously and secured in sample holder 515 such that an air gap 516 is formed between the glass-based article sample 518 and sheet 514 with an abrasive surface. Method 600 presumes that the sheet 514 with an abrasive surface has already been placed in test stand 510. In some embodiments, however, the method may include placing sheet 514 in test stand 510 such that the surface with abrasive material faces upward. In some embodiments (Step 610a), an adhesive tape 520 is applied to the upper surface of the glass-based article sample 518 prior to securing the glass-based article sample 518 in the sample holder 510.

In Step 520, a solid ball 530 of predetermined mass and size is dropped from a predetermined height h onto the upper surface of the glass-based article sample 518, such that the ball 530 impacts the upper surface (or adhesive tape 520 affixed to the upper surface) at approximately the center (i.e., within 1 mm, or within 3 mm, or within 5 mm, or within 10 mm of the center) of the upper surface. Following impact in Step 520, the extent of damage to the glass-based article sample 518 is determined (Step 630). As previously described hereinabove, herein, the term "fracture" means that a crack propagates across the entire thickness and/or entire surface of a substrate when the substrate is dropped or impacted by an object.

In method 600, the sheet 518 with the abrasive surface may be replaced after each drop to avoid "aging" effects that have been observed in repeated use of other types (e.g., concrete or asphalt) of drop test surfaces.

Various predetermined drop heights h and increments are typically used in method 600. The test may, for example, utilize a minimum drop height to start (e.g., about 10-20 cm). The height may then be increased for successive drops by either a set increment or variable increments. The test described in method 600 is stopped once the glass-based article sample 518 breaks or fractures (Step 631). Alternatively, if the drop height h reaches the maximum drop height (e.g., about 100 cm) without fracture, the drop test of method 300 may also be stopped, or Step 520 may be repeated at the maximum height until fracture occurs.

In some embodiments, IBoS test of method 600 is performed only once on each glass-based article sample 518 at each predetermined height h. In other embodiments, however, each sample may be subjected to multiple tests at each height.

If fracture of the glass-based article sample 518 has occurred (Step 631 in FIG. 9), the IBoS test according to method 600 is ended (Step 640). If no fracture resulting from the ball drop at the predetermined drop height is observed (Step 632), the drop height is increased by a predetermined increment (Step 634)—such as, for example 5, 10, or 20 cm—and Steps 620 and 630 are repeated until either sample fracture is observed (631) or the maximum test height is reached (636) without sample fracture. When either Step 631 or 636 is reached, the test according to method 600 is ended.

When subjected to the inverted ball on sandpaper (IBoS) test described above, embodiments of the glass-based article described herein have about a 60% or more survival rate when the ball is dropped onto the surface of the glass from a height of 100 cm. For example, a glass-based article is described as having a 60% survival rate when dropped from a given height when three of five identical (or nearly identical) samples (i.e., having approximately the same composition and, when strengthened, approximately the same compressive stress and depth of compression or compressive stress layer, as described herein) survive the IBoS drop test without fracture when dropped from the prescribed height (here 100 cm). In other embodiments, the survival rate in the 100 cm IBoS test of the glass-based articles that are strengthened is about 70% or more, in other embodiments, about 80% or more, and, in still other embodiments, about 90% or more. In other embodiments, the survival rate of the strengthened glass-based articles dropped from a height of 100 cm in the IBoS test is about 60% or more, in other embodiments, about 70% or more, in still other embodiments, about 80% or more, and, in other embodiments, about 90% or more. In one or more embodiments, the survival rate of the strengthened glass-based articles dropped from a height of 150 cm in the IBoS test is about 60% or more, in other embodiments, about 70% or more, in still other embodiments, about 80% or more, and, in other embodiments, about 90% or more.

To determine the survivability rate of the glass-based articles when dropped from a predetermined height using the IBoS test method and apparatus described hereinabove, at least five identical (or nearly identical) samples (i.e., having approximately the same composition and, if strengthened, approximately the same compressive stress and depth of compression or layer) of the glass-based articles are tested, although larger numbers (e.g., 10, 20, 30, etc.) of samples may be subjected to testing to raise the confidence level of the test results. Each sample is dropped a single time from the predetermined height (e.g., 100 cm or 150 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The glass-based articles described herein may be transparent. In one or more the glass-based article may have a thickness of about 1 millimeter or less and exhibit a transmittance of about 88% or greater over a wavelength in the range from about 380 nm to about 780 nm.

The glass-based article may also exhibit a substantially white color. For example, the glass-based article may exhibit CIELAB color space coordinates, under a CIE illuminant F02, of L* values of about 88 and greater, a* values in the range from about −3 to about +3, and b* values in the range from about −6 to about +6.

Choice of substrates not particularly limited. In some examples, the glass-based article may be described as having a high cation diffusivity for ion exchange. In one or more embodiments, the glass or glass-ceramic has fast ion-exchange capability, i.e., where diffusivity is greater than 500 $\mu m^2$/hr or may be characterized as greater than 450 $\mu m^2$/hour at 460° C. In one or more embodiments, the glass or glass-ceramic exhibits a sodium ion diffusivity that is about 450 $\mu m^2$/hour or greater at 460° C. or is about 500 $\mu m^2$/hour or greater at 460° C. In one or more embodiments, the glass or glass-ceramic exhibits a potassium ion diffusivity that is about 450 $\mu m^2$/hour or greater at 460° C. or is about 500 $\mu m^2$/hour or greater at 460° C.

The glass-based article may include an amorphous substrate, a crystalline substrate or a combination thereof (e.g., a glass-ceramic substrate). In one or more embodiments, the glass-based article substrate (prior to being chemically strengthened as described herein) may include a glass composition, in mole percent (mole %), including: $SiO_2$ in the range from about 40 to about 80, $Al_2O_3$ in the range from about 10 to about 30, $B_2O_3$ in the range from about 0 to about 10, $R_2O$ in the range from about 0 to about 20, and RO in the range from about 0 to about 15. As used herein, $R_2O$ refers to the total amount of alkali metal oxides such as $Li_2O$, $Na_2O$, $K_2O$, $Rb_2O$, and $Cs_2O$. As used herein RO refers to the total amount of alkaline earth metal oxides such as MgO, CaO, SrO, BaO, ZnO and the like. In some instances, the composition may include either one or both of $ZrO_2$ in the range from about 0 mol % to about 5 mol % and $P_2O_5$ in the range from about 0 to about 15 mol %. $TiO_2$ can be present from about 0 mol % to about 2 mol %.

In some embodiments, the glass composition may include $SiO_2$ in an amount, in mol %, in the range from about 45 to about 80, from about 45 to about 75, from about 45 to about 70, from about 45 to about 65, from about 45 to about 60, from about 45 to about 65, from about 45 to about 65, from about 50 to about 70, from about 55 to about 70, from about 60 to about 70, from about 70 to about 75, from about 70 to about 72, from about 50 to about 65, or from about 60 to about 65.

In some embodiments, the glass composition may include $Al_2O_3$ in an amount, in mol %, in the range from about 5 to about 28, from about 5 to about 26, from about 5 to about 25, from about 5 to about 24, from about 5 to about 22, from about 5 to about 20, from about 6 to about 30, from about 8 to about 30, from about 10 to about 30, from about 12 to about 30, from about 14 to about 30, 15 to about 30, or from about 12 to about 18.

In one or more embodiments, the glass composition may include $B_2O_3$ in an amount, in mol %, in the range from about 0 to about 8, from about 0 to about 6, from about 0 to about 4, from about 0.1 to about 8, from about 0.1 to about 6, from about 0.1 to about 4, from about 1 to about 10, from about 2 to about 10, from about 4 to about 10, from about 2 to about 8, from about 0.1 to about 5, or from about 1 to about 3. In some instances, the glass composition may be substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In some embodiments, the glass composition may include one or more alkali earth metal oxides, such as MgO, CaO and ZnO. In some embodiments, the total amount of the one or more alkali earth metal oxides may be a non-zero amount up to about 15 mol %. In one or more specific embodiments, the total amount of any of the alkali earth metal oxides may be a non-zero amount up to about 14 mol %, up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkali earth metal oxides may be in the range from about 0.01 to 10, from about 0.01 to 8, from about 0.01 to 6, from about 0.01 to 5, from about 0.05 to 10, from about 0.05 to 2, or from about 0.05 to 1. The amount of MgO may be in the range from about 0 mol % to about 5 mol % (e.g., from about 0.001 to about 1, from about 0.01 to about 2, or from about 2 mol % to about 4 mol %). The amount of ZnO may be in the range from about 0 to about 2 mol % (e.g., from about 1 mol % to about 2 mol %). The amount of CaO may be from about 0 mol % to about 2 mol %. In one or more embodiments, the glass composition may include MgO and may be substantially free of CaO and ZnO. In one variant, the glass composition may include any one of CaO or ZnO and may be substantially free of the others of MgO, CaO and ZnO. In one or more specific embodiments, the glass composition may include only two of the alkali earth metal oxides of MgO, CaO and ZnO and may be substantially free of the third of the earth metal oxides.

The total amount, in mol %, of alkali metal oxides $R_2O$ in the glass composition may be in the range from about 5 to about 20, from about 5 to about 18, from about 5 to about 16, from about 5 to about 15, from about 5 to about 14, from about 5 to about 12, from about 5 to about 10, from about 5 to about 8, from about 5 to about 20, from about 6 to about 20, from about 7 to about 20, from about 8 to about 20, from about 9 to about 20, from about 10 to about 20, from about 11 to about 20, from about 12 to about 18, or from about 14 to about 18.

In one or more embodiments, the glass composition includes $Na_2O$ in an amount in the range from about 0 mol % to about 18 mol %, from about 0 mol % to about 16 mol % or from about 0 mol % to about 14 mol %, from about 0 mol % to about 12 mol %, from about 2 mol % to about 18 mol %, from about 4 mol % to about 18 mol %, from about 6 mol % to about 18 mol %, from about 8 mol % to about 18 mol %, from about 8 mol % to about 14 mol %, from about 8 mol % to about 12 mol %, or from about 10 mol % to about 12 mol %. In some embodiments, the composition may include about 4 mol % or more $Na_2O$.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the glass composition may include K$_2$O in an amount less than about 5 mol %, less than about 4 mol %, less than about 3 mol %, less than about 2 mol %, or less than about 1 mol %. In one or more alternative embodiments, the glass composition may be substantially free, as defined herein, of K$_2$O.

In one or more embodiments, the glass composition may include Li$_2$O in an amount about 0 mol % to about 18 mol %, from about 0 mol % to about 15 mol % or from about 0 mol % to about 10 mol %, from about 0 mol % to about 8 mol %, from about 0 mol % to about 6 mol %, from about 0 mol % to about 4 mol % or from about 0 mol % to about 2 mol %. In some embodiments, the glass composition may include Li$_2$O in an amount about 2 mol % to about 10 mol %, from about 4 mol % to about 10 mol %, from about 6 mol % to about 10 mol, or from about 5 mol % to about 8 mol %. In one or more alternative embodiments, the glass composition may be substantially free, as defined herein, of Li$_2$O.

In one or more embodiments, the glass composition may include Fe$_2$O$_3$. In such embodiments, Fe$_2$O$_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of Fe$_2$O$_3$.

In one or more embodiments, the glass composition may include ZrO$_2$. In such embodiments, ZrO$_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of ZrO$_2$.

In one or more embodiments, the glass composition may include P$_2$O$_5$ in a range from about 0 mol % to about 10 mol %, from about 0 mol % to about 8 mol %, from about 0 mol % to about 6 mol %, from about 0 mol % to about 4 mol %, from about 0.1 mol % to about 10 mol %, from about 0.1 mol % to about 8 mol %, from about 2 mol % to about 8 mol %, from about 2 mol % to about 6 mol % or from about 2 mol % to about 4 mol %. In some instances, the glass composition may be substantially free of P$_2$O$_5$.

In one or more embodiments, the glass composition may include TiO$_2$. In such embodiments, TiO$_2$ may be present in an amount less than about 6 mol %, less than about 4 mol %, less than about 2 mol %, or less than about 1 mol %. In one or more alternative embodiments, the glass composition may be substantially free, as defined herein, of TiO$_2$. In some embodiments, TiO$_2$ is present in an amount in the range from about 0.1 mol % to about 6 mol %, or from about 0.1 mol % to about 4 mol %.

In some embodiments, the glass composition may include various compositional relationships. For example, the glass composition may include a ratio of the amount of Li$_2$O (in mol %) to the total amount of R$_2$O (in mol %) in the range from about 0 to about 1, from about 0 to about 0.5, from about 0 to about 0.4, from about 0.1 to about 0.5, or from about 0.2 to about 0.4.

In some embodiments, the glass composition may include a difference between the total amount of R$_2$O (in mol %) to the amount of Al$_2$O$_3$ (in mol %) (R$_2$O—Al$_2$O$_3$) in the range from about 0 to about 5 (e.g., from about 0 to about 4, from about 0 to about 3, from about 0.1 to about 4, from about 0.1 to about 3, from about 0.1 to about 2 or from about 1 to about 2).

In some embodiments, the glass composition may include a difference between the total amount of R$_x$O (in mol %) to the amount of Al$_2$O$_3$ (in mol %) (R$_x$O—Al$_2$O$_3$) in the range from about 0 to about 5 (e.g., from about 0 to about 4, from about 0 to about 3, from about 0.1 to about 4, from about 0.1 to about 3, from about 1 to about 3, or from about 2 to about 3). As used herein, RxO includes R$_2$O and RO, as defined herein.

In some embodiments, the glass composition may include a ratio of the total amount of R$_2$O (in mol %) to the amount of Al$_2$O$_3$ (in mol %) (R$_2$O/Al$_2$O$_3$) in the range from about 0 to about 5 (e.g., from about 0 to about 4, from about 0 to about 3, from about 1 to about 4, from about 1 to about 3, or from about 1 to about 2).

In one or more embodiments, the glass composition includes a combined amount of Al$_2$O$_3$ and Na$_2$O greater than about 15 mol % (e.g., greater than 18 mol %, greater than about 20 mol %, or greater than about 23 mol %). The combined amount of Al$_2$O$_3$ and Na$_2$O may be up to and including about 30 mol %, about 32 mol % or about 35 mol %.

The glass composition of one or more embodiments may exhibit a ratio of the amount of MgO (in mol %) to the total amount of RO (in mol %) in the range from about 0 to about 2.

In some embodiments, glass composition may be substantially free of nucleating agents. Examples of typical nucleating agents are TiO$_2$, ZrO$_2$ and the like. Nucleating agents may be described in terms of function in that nucleating agents are constituents in the glass can initiate the formation of crystallites in the glass.

In some embodiments, the compositions used for the glass substrate may be batched with from about 0 mol % to about 2 mol % of at least one fining agent selected from a group that includes Na$_2$SO$_4$, NaCl, NaF, NaBr, K$_2$SO$_4$, KCl, KF, KBr, and SnO$_2$. The glass composition according to one or more embodiments may further include SnO$_2$ in the range from about 0 to about 2, from about 0 to about 1, from about 0.1 to about 2, from about 0.1 to about 1, or from about 1 to about 2. The glass compositions disclosed herein may be substantially free of As$_2$O$_3$ and/or Sb$_2$O$_3$.

In one or more embodiments, the composition may specifically include from about 62 mol % to 75 mol % SiO$_2$; from about 10.5 mol % to about 17 mol % Al$_2$O$_3$; from about 5 mol % to about 13 mol % Li$_2$O; from about 0 mol % to about 4 mol % ZnO; from about 0 mol % to about 8 mol % MgO; from about 2 mol % to about 5 mol % TiO$_2$; from about 0 mol % to about 4 mol % B$_2$O$_3$; from about 0 mol % to about 5 mol % Na$_2$O; from about 0 mol % to about 4 mol % K$_2$O; from about 0 mol % to about 2 mol % ZrO$_2$; from about 0 mol % to about 7 mol % P$_2$O$_5$; from about 0 mol % to about 0.3 mol % Fe$_2$O$_3$; from about 0 mol % to about 2 mol % MnOx; and from about 0.05 mol % to about 0.2 mol % SnO$_2$.

In one or more embodiments, the composition may include from about 67 mol % to about 74 mol % SiO$_2$; from about 11 mol % to about 15 mol % Al$_2$O$_3$; from about 5.5 mol % to about 9 mol % Li$_2$O; from about 0.5 mol % to about 2 mol % ZnO; from about 2 mol % to about 4.5 mol % MgO; from about 3 mol % to about 4.5 mol % TiO$_2$; from about 0 mol % to about 2.2 mol % B$_2$O$_3$; from about 0 mol % to about 1 mol % Na$_2$O; from about 0 mol % to about 1 mol % K$_2$O; from about 0 mol % to about 1 mol % ZrO$_2$;

from about 0 mol % to about 4 mol % $P_2O_5$; from about 0 mol % to about 0.1 mol % $Fe_2O_3$; from about 0 mol % to about 1.5 mol % MnOx; and from about 0.08 mol % to about 0.16 mol % $SnO_2$.

In one or more embodiments, the composition may include from about 70 mol % to 75 mol % $SiO_2$; from about 10 mol % to about 15 mol % $Al_2O_3$; from about 5 mol % to about 13 mol % $Li_2O$; from about 0 mol % to about 4 mol % ZnO; from about 0.1 mol % to about 8 mol % MgO; from about 0 mol % to about 5 mol % $TiO_2$; from about 0.1 mol % to about 4 mol % $B_2O_3$; from about 0.1 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % MnOx; and from about 0.05 mol % to about 0.2 mol % $SnO_2$.

In one or more embodiments, the composition may include from about 52 mol % to about 65 mol % $SiO_2$; from about 14 mol % to about 18 mol % $Al_2O_3$; from about 5.5 mol % to about 7 mol % $Li_2O$; from about 1 mol % to about 2 mol % ZnO; from about 0.01 mol % to about 2 mol % MgO; from about 4 mol % to about 12 mol % $Na_2O$; from about 0.1 mol % to about 4 mol % $P_2O_5$; and from about 0.01 mol % to about 0.16 mol % $SnO_2$. In some embodiments, the composition may be substantially free of any one or more of $B_2O_3$, $TiO_2$, $K_2O$ and $ZrO_2$.

In one or more embodiments, the composition may include 0.5 mol % or more $P_2O_5$, $Na_2O$ and, optionally, $Li_2O$, where $Li_2O$(mol %)/$Na_2O$(mol %)<1. In addition, these compositions may be substantially free of $B_2O_3$ and $K_2O$. In some embodiments, the composition may include ZnO, MgO, and $SnO_2$.

In some embodiments, the composition may comprise: from about 58 mol % to about 65 mol % $SiO_2$; from about 11 mol % to about 19 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the composition may comprise from about 63 mol % to about 65 mol % $SiO_2$; from 11 mol % to about 17 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In some embodiments, the composition may include the following compositional relationships $R_2O$(mol %)/$Al_2O_3$ (mol %)<2, where $R_2O$=$Li_2O$+$Na_2O$. In some embodiments, 65 mol %<$SiO_2$ (mol %)+$P_2O_5$ (mol %)<67 mol %. In certain embodiments, $R_2O$(mol %)+R'O(mol %)−$Al_2O_3$ (mol %)+$P_2O_5$ (mol %)>−3 mol %, where $R_2O$=$Li_2O$+$Na_2O$ and R'O is the total amount of divalent metal oxides present in the composition.

Other exemplary compositions of glass-based articles prior to being chemically strengthened, as described herein, are shown in Table 1A. Table 1B lists selected physical properties determined for the examples listed in Table 1A. The physical properties listed in Table 1B include: density; low temperature and high temperature CTE; strain, anneal and softening points; $10^{11}$ Poise, 35 kP, 200 kP, liquidus, and zircon breakdown temperatures; zircon breakdown and liquidus viscosities; Poisson's ratio; Young's modulus; refractive index, and stress optical coefficient. In some embodiments, the glass-based articles and glass substrates described herein have a high temperature CTE of less than or equal to 30 ppm/° C. and/or a Young's modulus of 70 GPa or more and, in some embodiments, a Young's modulus of up to 80 GPa.

TABLE 1A

Exemplary compositions prior to chemical strengthening.

| Composition (mol %) | Ex. 1 | Ex. 2 | Ex. 3 | Ex. 4 | Ex. 5 | Ex. 6 | Ex. 7 |
|---|---|---|---|---|---|---|---|
| $SiO_2$ | 63.77 | 64.03 | 63.67 | 63.91 | 64.16 | 63.21 | 63.50 |
| $Al_2O_3$ | 12.44 | 12.44 | 11.83 | 11.94 | 11.94 | 11.57 | 11.73 |
| $P_2O_5$ | 2.43 | 2.29 | 2.36 | 2.38 | 1.92 | 1.93 | 1.93 |
| $Li_2O$ | 0.00 | 0.00 | 0.00 | 0.00 | 0.00 | 0.00 | 0.00 |
| $Na_2O$ | 16.80 | 16.81 | 16.88 | 16.78 | 16.80 | 17.63 | 16.85 |
| ZnO | 0.00 | 4.37 | 0.00 | 4.93 | 0.00 | 5.59 | 5.93 |
| MgO | 4.52 | 0.02 | 5.21 | 0.02 | 5.13 | 0.02 | 0.01 |
| $SnO_2$ | 0.05 | 0.05 | 0.05 | 0.05 | 0.05 | 0.05 | 0.05 |
| $R_2O/Al_2O_3$ | 1.35 | 1.35 | 1.43 | 1.41 | 1.41 | 1.52 | 1.44 |
| $Li_2O/Na_2O$ | 0.00 | 0.00 | 0.00 | 0.00 | 0.00 | 0.00 | 0.00 |
| ($R_2O$ + RO) − $Al_2O_3$ − $P_2O_5$ | 6.45 | 6.46 | 7.89 | 7.40 | 8.07 | 9.74 | 9.14 |

| Composition (mol %) | Ex. 8 | Ex. 9 | Ex. 10 | Ex. 11 | Ex. 12 | Ex. 13 | Ex. 14 |
|---|---|---|---|---|---|---|---|
| $SiO_2$ | 63.37 | 63.43 | 63.56 | 63.58 | 63.66 | 63.62 | 63.67 |
| $Al_2O_3$ | 11.72 | 12.49 | 12.63 | 12.59 | 12.91 | 12.85 | 12.89 |
| $P_2O_5$ | 2.00 | 2.32 | 2.46 | 2.46 | 2.43 | 2.45 | 2.47 |
| $Li_2O$ | 0.00 | 0.00 | 1.42 | 2.87 | 0.00 | 1.42 | 2.92 |
| $Na_2O$ | 16.84 | 17.16 | 15.45 | 14.04 | 16.89 | 15.48 | 13.92 |
| ZnO | 6.00 | 4.54 | 4.43 | 4.41 | 4.04 | 4.12 | 4.06 |
| MgO | 0.02 | 0.02 | 0.02 | 0.02 | 0.02 | 0.02 | 0.02 |
| $SnO_2$ | 0.05 | 0.04 | 0.05 | 0.05 | 0.05 | 0.05 | 0.05 |
| $R_2O/Al_2O_3$ | 1.44 | 1.37 | 1.34 | 1.34 | 1.31 | 1.31 | 1.31 |

TABLE 1A-continued

Exemplary compositions prior to chemical strengthening.

| | | | | | | | |
|---|---|---|---|---|---|---|---|
| $Li_2O/Na_2O$ | 0.00 | 0.00 | 0.09 | 0.20 | 0.00 | 0.09 | 0.21 |
| $(R_2O + RO) - Al_2O_3 - P_2O_5$ | 9.14 | 6.90 | 6.22 | 6.29 | 5.62 | 5.72 | 5.57 |

| Composition (mol %) | Ex. 15 | Ex. 16 | Ex. 17 | Ex. 18 | Ex. 19 | Ex. 20 | Ex. 21 |
|---|---|---|---|---|---|---|---|
| $SiO_2$ | 63.55 | 63.80 | 63.76 | 63.88 | 63.74 | 64.03 | 63.68 |
| $Al_2O_3$ | 12.92 | 12.90 | 12.95 | 13.48 | 13.37 | 13.26 | 13.19 |
| $P_2O_5$ | 2.35 | 2.34 | 2.37 | 2.31 | 2.34 | 2.29 | 2.46 |
| $Li_2O$ | 0.00 | 1.47 | 2.94 | 0.00 | 1.48 | 2.94 | 0.00 |
| $Na_2O$ | 17.97 | 16.36 | 14.85 | 17.20 | 15.96 | 14.37 | 16.84 |
| ZnO | 0.00 | 0.00 | 0.00 | 0.00 | 0.00 | 0.00 | 3.77 |
| MgO | 3.17 | 3.08 | 3.09 | 3.08 | 3.08 | 3.06 | 0.02 |
| $SnO_2$ | 0.05 | 0.04 | 0.05 | 0.05 | 0.04 | 0.04 | 0.05 |
| $R_2O/Al_2O_3$ | 1.39 | 1.38 | 1.37 | 1.28 | 1.30 | 1.31 | 1.28 |
| $Li_2O/Na_2O$ | 0.00 | 0.09 | 0.20 | 0.00 | 0.09 | 0.20 | 0.00 |
| $(R_2O + RO) - Al_2O_3 - P_2O_5$ | 5.87 | 5.67 | 5.56 | 4.48 | 4.81 | 4.83 | 4.98 |

| Composition (mol %) | Ex. 22 | Ex. 23 | Ex. 24 | Ex. 25 | Ex. 26 | Ex. 27 | Ex. 28 |
|---|---|---|---|---|---|---|---|
| $SiO_2$ | 63.66 | 63.76 | 63.67 | 63.73 | 63.73 | 63.64 | 63.76 |
| $Al_2O_3$ | 14.15 | 15.31 | 13.87 | 14.82 | 12.93 | 16.62 | 16.59 |
| $P_2O_5$ | 2.47 | 2.44 | 2.47 | 2.43 | 2.48 | 2.47 | 2.47 |
| $Li_2O$ | 1.49 | 2.98 | 1.50 | 2.96 | 0.00 | 2.52 | 4.91 |
| $Na_2O$ | 15.31 | 13.79 | 15.36 | 13.93 | 16.83 | 14.68 | 12.20 |
| ZnO | 2.85 | 1.64 | 0.00 | 0.00 | 2.98 | 0.00 | 0.00 |
| MgO | 0.03 | 0.03 | 3.09 | 2.08 | 1.00 | 0.03 | 0.03 |
| $SnO_2$ | 0.05 | 0.04 | 0.05 | 0.05 | 0.05 | 0.05 | 0.05 |
| $R_2O/Al_2O_3$ | 1.19 | 1.10 | 1.22 | 1.14 | 1.30 | 1.03 | 1.03 |
| $Li_2O/Na_2O$ | 0.10 | 0.22 | 0.10 | 0.21 | 0.00 | 0.17 | 0.40 |
| $(R_2O + RO) - Al_2O_3 - P_2O_5$ | 3.05 | 0.70 | 3.61 | 1.72 | 5.40 | −1.86 | −1.92 |

| Composition (mol %) | Ex. 29 | Ex. 30 | Ex. 31 | Ex. 32 | Ex. 33 | Ex. 34 | Ex. 35 |
|---|---|---|---|---|---|---|---|
| $SiO_2$ | 63.89 | 63.92 | 63.77 | 63.73 | 63.70 | 63.65 | 63.87 |
| $Al_2O_3$ | 16.55 | 15.29 | 15.27 | 15.30 | 15.27 | 15.22 | 15.29 |
| $P_2O_5$ | 2.47 | 2.24 | 2.31 | 2.39 | 2.40 | 2.48 | 2.37 |
| $Li_2O$ | 7.27 | 3.46 | 2.98 | 4.02 | 4.46 | 4.96 | 5.39 |
| $Na_2O$ | 9.74 | 13.46 | 13.99 | 12.91 | 12.51 | 11.99 | 11.44 |
| ZnO | 0.00 | 1.56 | 1.61 | 1.57 | 1.58 | 1.63 | 1.57 |
| MgO | 0.03 | 0.02 | 0.02 | 0.03 | 0.03 | 0.02 | 0.02 |
| $SnO_2$ | 0.04 | 0.04 | 0.04 | 0.05 | 0.04 | 0.05 | 0.04 |
| $R_2O/Al_2O_3$ | 1.03 | 1.11 | 1.11 | 1.11 | 1.11 | 1.11 | 1.10 |
| $Li_2O/Na_2O$ | 0.75 | 0.26 | 0.21 | 0.31 | 0.36 | 0.41 | 0.47 |
| $(R_2O + RO) - Al_2O_3 - P_2O_5$ | −1.98 | 0.97 | 1.01 | 0.84 | 0.90 | 0.91 | 0.76 |

| Composition (mol %) | Ex. 36 | Ex. 37 | Ex. 38 | Ex. 39 | Ex. 40 | Ex. 41 | Ex. 42 |
|---|---|---|---|---|---|---|---|
| $SiO_2$ | 63.69 | 63.75 | 63.70 | 63.62 | 63.74 | 63.77 | 63.77 |
| $Al_2O_3$ | 15.26 | 15.30 | 15.27 | 15.23 | 15.27 | 15.27 | 15.33 |
| $P_2O_5$ | 2.45 | 2.42 | 2.45 | 2.46 | 2.47 | 2.46 | 2.44 |
| $Li_2O$ | 2.96 | 2.98 | 3.94 | 3.98 | 4.93 | 4.93 | 2.91 |
| $Na_2O$ | 13.50 | 13.46 | 12.54 | 12.57 | 11.49 | 11.50 | 13.94 |
| ZnO | 2.06 | 2.01 | 2.03 | 2.06 | 2.03 | 2.00 | 0.00 |
| MgO | 0.02 | 0.03 | 0.02 | 0.03 | 0.03 | 0.03 | 1.57 |
| $SnO_2$ | 0.05 | 0.04 | 0.04 | 0.05 | 0.04 | 0.05 | 0.04 |
| $R_2O/Al_2O_3$ | 1.08 | 1.08 | 1.08 | 1.09 | 1.08 | 1.08 | 1.10 |
| $Li_2O/Na_2O$ | 0.22 | 0.22 | 0.31 | 0.32 | 0.43 | 0.43 | 0.21 |
| $(R_2O + RO) - Al_2O_3 - P_2O_5$ | 0.83 | 0.77 | 0.80 | 0.95 | 0.73 | 0.73 | 0.66 |

| Composition (mol %) | Ex. 43 | Ex. 44 | Ex. 45 | Ex. 46 | Ex. 47 | Ex. 48 | Ex. 49 |
|---|---|---|---|---|---|---|---|
| $SiO_2$ | 63.69 | 63.81 | 63.65 | 63.71 | 63.62 | 63.65 | 63.62 |
| $Al_2O_3$ | 15.25 | 15.26 | 15.33 | 15.32 | 15.24 | 15.68 | 15.67 |
| $P_2O_5$ | 2.43 | 2.41 | 2.46 | 2.44 | 2.47 | 2.44 | 2.48 |
| $Li_2O$ | 4.00 | 4.89 | 2.96 | 4.01 | 4.91 | 6.07 | 6.06 |
| $Na_2O$ | 13.01 | 12.03 | 13.29 | 12.25 | 11.42 | 10.93 | 10.53 |
| ZnO | 0.00 | 0.00 | 2.24 | 2.20 | 2.27 | 1.17 | 1.57 |
| MgO | 1.57 | 1.56 | 0.03 | 0.03 | 0.02 | 0.02 | 0.02 |

TABLE 1A-continued

Exemplary compositions prior to chemical strengthening.

| | | | | | | | |
|---|---|---|---|---|---|---|---|
| SnO$_2$ | 0.05 | 0.04 | 0.05 | 0.04 | 0.05 | 0.04 | 0.05 |
| R$_2$O/Al$_2$O$_3$ | 1.12 | 1.11 | 1.06 | 1.06 | 1.07 | 1.08 | 1.06 |
| Li$_2$O/Na$_2$O | 0.31 | 0.41 | 0.22 | 0.33 | 0.43 | 0.56 | 0.58 |
| (R$_2$O + RO) − Al$_2$O$_3$ − P$_2$O$_5$ | 0.90 | 0.81 | 0.73 | 0.73 | 0.91 | 0.08 | 0.04 |

| Composition (mol %) | Ex. 50 | Ex. 51 | Ex. 52 | Ex. 53 | Ex. 54 | Ex. 55 | Ex. 56 |
|---|---|---|---|---|---|---|---|
| SiO$_2$ | 63.60 | 63.89 | 63.84 | 63.90 | 63.88 | 64.74 | 60.17 |
| Al$_2$O$_3$ | 15.65 | 16.09 | 16.47 | 16.87 | 16.97 | 15.25 | 18.58 |
| P$_2$O$_5$ | 2.46 | 2.42 | 2.43 | 2.43 | 2.42 | 0.98 | 1.90 |
| Li$_2$O | 6.13 | 6.80 | 7.84 | 8.75 | 9.78 | 5.28 | 5.16 |
| Na$_2$O | 10.29 | 9.97 | 8.96 | 7.99 | 6.88 | 12.09 | 12.58 |
| ZnO | 1.81 | 0.78 | 0.39 | 0.00 | 0.00 | 1.61 | 1.55 |
| MgO | 0.02 | 0.02 | 0.02 | 0.02 | 0.02 | 0.02 | 0.02 |
| SnO$_2$ | 0.04 | 0.04 | 0.04 | 0.04 | 0.04 | 0.03 | 0.03 |
| R$_2$O/Al$_2$O$_3$ | 1.05 | 1.04 | 1.02 | 0.99 | 0.98 | 1.14 | 0.96 |
| Li$_2$O/Na$_2$O | 0.60 | 0.68 | 0.87 | 1.10 | 1.42 | 0.44 | 0.41 |
| (R$_2$O + RO) − Al$_2$O$_3$ − P$_2$O$_5$ | 0.14 | −0.94 | −1.68 | −2.54 | −2.70 | 2.78 | −1.16 |

| Composition (mol %) | Ex. 57 | Ex. 58 | Ex. 59 | Ex. 60 | Ex. 61 | Ex. 62 | Ex. 63 | Ex. 64 |
|---|---|---|---|---|---|---|---|---|
| SiO$_2$ | 58.32 | 63.3 | 63.3 | 63.3 | 63.3 | 63.3 | 63.3 | 63.46 |
| Al$_2$O$_3$ | 18.95 | 15.25 | 15.65 | 16.2 | 15.1 | 15.425 | 15.7 | 15.71 |
| P$_2$O$_5$ | 2.42 | 2.5 | 2.5 | 2.5 | 2.5 | 2.5 | 2.5 | 2.45 |
| Li$_2$O | 4.96 | 6 | 7 | 7.5 | 6 | 7 | 7.5 | 6.37 |
| Na$_2$O | 13.74 | 10.7 | 9.7 | 9.45 | 10.55 | 9.475 | 8.95 | 10.69 |
| ZnO | 1.56 | 1.2 | 0.8 | 0 | 2.5 | 2.25 | 2 | 1.15 |
| MgO | 0.02 | 1 | 1 | 1 | 0 | 0 | 0 | 0.06 |
| SnO$_2$ | 0.03 | 0.05 | 0.05 | 0.05 | 0.05 | 0.05 | 0.05 | 0.04 |
| R$_2$O/Al$_2$O$_3$ | 0.99 | 1.10 | 1.07 | 1.05 | 1.10 | 1.07 | 1.05 | 1.09 |
| Li$_2$O/Na$_2$O | 0.36 | 0.56 | 0.72 | 0.79 | 0.57 | 0.74 | 0.84 | 0.6 |
| (R$_2$O + RO) − Al$_2$O$_3$ − P$_2$O$_5$ | −1.09 | 1.15 | 0.35 | −0.75 | 1.45 | 0.80 | 0.25 | −1.1 |

TABLE 1B

Selected physical properties of the glasses listed in Table 1B.

| | Ex. 1 | Ex. 2 | Ex. 3 | Ex. 4 | Ex. 5 | Ex. 6 | Ex. 7 |
|---|---|---|---|---|---|---|---|
| Density (g/cm$^3$) | 2.434 | 2.493 | 2.434 | 2.504 | 2.44 | 2.514 | 2.519 |
| Low temperature CTE 25-300° C. (ppm/° C.) | 8.9 | 8.62 | 8.95 | 8.6 | 8.82 | 8.71 | 8.54 |
| High temperature CTE (ppm/° C.) | 17.67 | 19.1 | 17.16 | 21 | 18.12 | 20 | 20.11 |
| Strain pt. (° C.) | 630 | 591 | 612 | 580 | 605 | 580 | 589 |
| Anneal pt. (° C.) | 683 | 641 | 662 | 628 | 651 | 629 | 639 |
| 10$^{11}$ Poise temperature (° C.) | 770 | 725 | 748 | 710 | 734 | 711 | 721 |
| Softening pt. (° C.) | 937 | 888 | 919 | 873 | 909 | 868 | 874 |
| T$^{35\,kP}$ (° C.) | | | | 1167 | 1180 | 1158 | 1160 |
| T$^{200\,kP}$ (° C.) | | | | 1070 | 1083 | 1061 | 1064 |
| Zircon breakdown temperature (° C.) | | 1205 | | 1220 | 1170 | 1185 | 1205 |
| Zircon breakdown viscosity (P) | | | | 1.56 × 10$^4$ | 4.15 × 10$^4$ | 2.29 × 10$^4$ | 1.74 × 10$^4$ |
| Liquidus temperature (° C.) | | 980 | | 990 | 975 | 990 | 1000 |
| Liquidus viscosity (P) | | | | 1.15 × 10$^6$ | 2.17 × 10$^6$ | 9.39 × 10$^5$ | 7.92 × 10$^5$ |

TABLE 1B-continued

Selected physical properties of the glasses listed in Table 1B.

| | | | | | | | |
|---|---|---|---|---|---|---|---|
| Poisson's ratio | 0.200 | 0.211 | 0.206 | 0.214 | 0.204 | 0.209 | 0.211 |
| Young's modulus (GPa) | 69.2 | 68.8 | 69.4 | 68.5 | 69.6 | 68.3 | 69.0 |
| Refractive index at 589.3 nm | 1.4976 | 1.5025 | 1.4981 | 1.5029 | 1.4992 | 1.5052 | 1.506 |
| Stress optical coefficient (nm/mm/MPa) | 2.963 | 3.158 | 3.013 | 3.198 | 2.97 | 3.185 | 3.234 |

| | Ex. 8 | Ex. 9 | Ex. 10 | Ex. 11 | Ex. 12 | Ex. 13 | Ex. 14 |
|---|---|---|---|---|---|---|---|
| Density (g/cm$^3$) | 2.516 | 2.501 | 2.498 | 2.493 | 2.493 | 2.492 | 2.486 |
| Low temperature CTE 25-300° C. (ppm/° C.) | 8.35 | 8.67 | 8.87 | 8.49 | 8.65 | 8.71 | 8.49 |
| High temperature CTE (ppm/° C.) | 20.11 | 20.6 | 20.94 | | 19.52 | 20.77 | |
| Strain pt. (° C.) | 590 | 589 | 591 | 584 | 600 | 579 | 588 |
| Anneal pt. (° C.) | 641 | 639 | 640 | 628 | 652 | 620 | 630 |
| 10$^{11}$ Poise temperature (° C.) | 726 | 724 | 720 | 704 | 738 | 695 | 704 |
| Softening pt. (° C.) | 888 | 890 | 865 | 857 | 900 | 867 | 860 |
| T$^{35\ kP}$ (° C.) | 1170 | 1176 | 1159 | 1139 | 1197 | 1169 | |
| T$^{200\ kP}$ (° C.) | 1073 | 1080 | 1061 | 1041 | 1099 | 1070 | |
| Zircon breakdown temperature (° C.) | 1195 | 1195 | 1210 | 1225 | 1195 | 1195 | 1220 |
| Zircon breakdown viscosity (P) | 2.33 × 10$^4$ | 2.58 × 10$^4$ | 1.60 × 10$^4$ | 9.94 × 10$^3$ | 3.63 × 10$^4$ | 2.35 × 10$^4$ | |
| Liquidus temperature (° C.) | 1005 | 990 | 990 | 980 | 990 | 980 | 980 |
| Liquidus viscosity (P) | 8.69 × 10$^4$ | 1.48E+06 | 9.02E+05 | 7.10E+05 | 2.19E+06 | 1.33E+06 | |
| Poisson's ratio | 0.211 | 0.205 | 0.208 | 0.209 | 0.209 | 0.210 | 0.217 |
| Young's modulus (GPa) | 69.0 | 68.7 | 71.4 | 73.5 | 68.4 | 71.6 | 74.0 |
| Refractive index at 589.3 nm | 1.506 | 1.5036 | 1.505 | 1.5063 | 1.5026 | 1.5041 | 1.5052 |
| Stress optical coefficient (nm/mm/MPa) | 3.234 | 3.194 | 3.157 | 3.131 | 3.18 | 3.156 | 3.131 |

| | Ex. 15 | Ex. 16 | Ex. 17 | Ex. 18 | Ex. 19 | Ex. 20 | Ex. 21 |
|---|---|---|---|---|---|---|---|
| Density (g/cm$^3$) | 2.433 | 2.429 | 2.426 | 2.431 | 2.428 | 2.433 | 2.486 |
| Low temperature CTE 25-300° C. (ppm/° C.) | 9.15 | 9.16 | 8.83 | 8.97 | 8.97 | 8.79 | 8.45 |
| High temperature CTE (ppm/° C.) | 20 | 20 | 21 | 17.3 | 20 | | |
| Strain pt. (° C.) | 615 | 606 | 599 | 633 | 616 | 611 | 602 |
| Anneal pt. (° C.) | 662 | 659 | 653 | 684 | 670 | 665 | 653 |
| 10$^{11}$ Poise temperature (° C.) | 747 | 745 | 741 | 771 | 758 | 751 | 739 |
| Softening pt. (° C.) | 935 | 903 | 901 | 943 | 918 | 905 | 910 |

TABLE 1B-continued

Selected physical properties of the glasses listed in Table 1B.

| | | | | | | | |
|---|---|---|---|---|---|---|---|
| $T^{35\ kP}$ (° C.) | 1182 | 1166 | 1152 | 1221 | 1185 | 1167 | 1207 |
| $T^{200\ kP}$ (° C.) | 1083 | 1066 | 1051 | 1122 | 1084 | 1066 | 1108 |
| Zircon breakdown temperature (° C.) | | | | | | | |
| Zircon breakdown viscosity (P) | | | | | | | |
| Liquidus temperature (° C.) | | | | | | | |
| Liquidus viscosity (P) | | | | | | | |
| Poisson's ratio | 0.203 | 0.207 | 0.205 | 0.209 | 0.199 | | 0.207 |
| Young's modulus (GPa) | 68.9 | 71.2 | 72.7 | 69.4 | 70.9 | | 68.1 |
| Refractive index at 589.3 nm | 1.4964 | 1.4981 | 1.4991 | 1.4965 | 1.4984 | 1.5006 | 1.5019 |
| Stress optical coefficient (nm/mm/MPa) | 2.994 | 3.022 | 2.982 | 2.979 | 2.99 | 0 | 3.173 |

| | Ex. 22 | Ex. 23 | Ex. 24 | Ex. 25 | Ex. 26 | Ex. 27 | Ex. 28 |
|---|---|---|---|---|---|---|---|
| Density (g/cm³) | 2.468 | 2.448 | 2.434 | 2.428 | 2.47 | 2.419 | 2.414 |
| Low temperature CTE25-300° C. (ppm/° C.) | 8.6 | 8.23 | 8.91 | 8.25 | 8.66 | 8.52 | 8.17 |
| High temperature CTE (ppm/° C.) | 19.52 | | 19.49 | | | | 19.47 |
| Strain pt. (° C.) | 596 | 595 | 638 | 616 | 608 | 640 | 620 |
| Anneal pt. (° C.) | 644 | 649 | 695 | 656 | 654 | 700 | 677 |
| $10^{11}$ Poise temperature (° C.) | 728 | 741 | 785 | 732 | 736 | 798 | 771 |
| Softening pt. (° C.) | 905 | 922 | 941 | 925 | 911 | 978 | 946 |
| $T^{35\ kP}$ (° C.) | 1217 | 1227 | 1209 | 1215 | 1209 | 1283 | 1249 |
| $T^{200\ kP}$ (° C.) | 1115 | 1125 | 1109 | 1115 | 1107 | 1184 | 1150 |
| Zircon breakdown temperature (° C.) | 1185 | 1185 | 1180 | 1185 | | | 1185 |
| Zircon breakdown viscosity (P) | 5.86E+04 | 6.91E+04 | 5.59E+04 | 5.72E+04 | | | 1.05E+05 |
| Liquidus temperature (° C.) | 975 | 980 | 1080 | 1025 | | | 940 |
| Liquidus viscosity (P) | 4.14E+06 | 4.52E+06 | 3.56E+05 | 1.27E+06 | | | 2.92E+07 |
| Poisson's ratio | 0.210 | | 0.204 | 0.210 | 0.212 | | 0.213 |
| Young's modulus (GPa) | 71.4 | | 71.6 | 73.5 | 68.8 | | 76.9 |
| Refractive index at 589.3 nm | 1.502 | 1.5025 | 1.4996 | 1.5008 | 1.5006 | 1.4987 | 1.5014 |
| Stress optical coefficient (nm/mm/MPa) | 3.123 | 3.03 | 3.001 | 3.021 | 3.148 | 3.039 | 3.015 |

| | Ex. 29 | Ex. 30 | Ex. 31 | Ex. 32 | Ex. 33 | Ex. 34 | Ex. 35 |
|---|---|---|---|---|---|---|---|
| Density (g/cm³) | 2.408 | 2.446 | 2.448 | 2.446 | 2.445 | 2.443 | 2.442 |
| Low temperature CTE 25-300° C. (ppm/° C.) | 7.86 | 8.29 | 8.38 | 8.17 | 8.14 | 8.04 | 7.97 |

TABLE 1B-continued

Selected physical properties of the glasses listed in Table 1B.

| | | | | | | | |
|---|---|---|---|---|---|---|---|
| High temperature CTE (ppm/° C.) | 18.57 | | | | | 19.71 | |
| Strain pt. (° C.) | 610 | 591 | 595 | 585 | 580 | 574 | 577 |
| Anneal pt. (° C.) | 665 | 645 | 649 | 638 | 633 | 627 | 629 |
| $10^{11}$ Poise temperature (° C.) | 755 | 736 | 740 | 726 | 722 | 717 | 717 |
| Softening pt. (° C.) | 924 | 915 | 919 | 894 | 894 | 895 | 890 |
| $T^{35\ kP}$ (° C.) | 1216 | 1223 | 1227 | 1216 | 1210 | 1203 | 1196 |
| $T^{200\ kP}$ (° C.) | 1120 | 1122 | 1126 | 1114 | 1108 | 1102 | 1095 |
| Zircon breakdown temperature (° C.) | 1210 | 1175 | 1180 | 1190 | 1195 | 1210 | 1205 |
| Zircon breakdown viscosity (P) | 3.86E+04 | 7.72E+04 | 7.55E+04 | 5.29E+04 | 4.43E+04 | 3.14E+04 | 3.04E+04 |
| Liquidus temperature (° C.) | 1080 | 990 | 975 | 975 | 975 | 975 | 980 |
| Liquidus viscosity (P) | 4.55E+05 | 3.28E+06 | 5.43E+06 | 3.80E+06 | 3.33E+06 | 3.02E+06 | 2.29E+06 |
| Poisson's ratio | 0.211 | 0.206 | 0.202 | 0.21 | 0.204 | 0.204 | 0.203 |
| Young's modulus (GPa) | 75.0 | 73.91 | 73.02 | 74.60 | 74.67 | 75.15 | 75.43 |
| Refractive index at 589.3 nm | 1.5053 | 1.503 | 1.5025 | 1.5035 | 1.5041 | 1.5046 | 1.5053 |
| Stress optical coefficient (nm/mm/MPa) | 3.002 | 3.074 | 3.083 | 3.071 | 3.059 | 3.016 | 3.053 |
| Density (g/cm$^3$) | 2.408 | 2.446 | 2.448 | 2.446 | 2.445 | 2.443 | 2.442 |
| Low temperature CTE 25-300° C. (ppm/° C.) | 7.86 | 8.29 | 8.38 | 8.17 | 8.14 | 8.04 | 7.97 |
| High temperature CTE (ppm/° C.) | 18.57 | | | | | 19.71 | |
| Strain pt. (° C.) | 610 | 591 | 595 | 585 | 580 | 574 | 577 |
| Anneal pt. (° C.) | 665 | 645 | 649 | 638 | 633 | 627 | 629 |
| $10^{11}$ Poise temperature (° C.) | 755 | 736 | 740 | 726 | 722 | 717 | 717 |
| Softening pt. (° C.) | 924 | 915 | 919 | 894 | 894 | 895 | 890 |
| $T^{35\ kP}$ (° C.) | 1216 | 1223 | 1227 | 1216 | 1210 | 1203 | 1196 |
| $T^{200\ kP}$ (° C.) | 1120 | 1122 | 1126 | 1114 | 1108 | 1102 | 1095 |
| Zircon breakdown temperature (° C.) | 1210 | 1175 | 1180 | 1190 | 1195 | 1210 | 1205 |
| Zircon breakdown viscosity (P) | 3.86E+04 | 7.72E+04 | 7.55E+04 | 5.29E+04 | 4.43E+04 | 3.14E+04 | 3.04E+04 |
| Liquidus temperature (° C.) | 1080 | 990 | 975 | 975 | 975 | 975 | 980 |
| Liquidus viscosity (P) | 4.55E+05 | 3.28E+06 | 5.43E+06 | 3.80E+06 | 3.33E+06 | 3.02E+06 | 2.29E+06 |
| Poisson's ratio | 0.211 | 0.206 | 0.202 | 0.21 | 0.204 | 0.204 | 0.203 |
| Young's modulus (GPa) | 75.0 | 73.91 | 73.02 | 74.60 | 74.67 | 75.15 | 75.43 |
| Refractive index at | 1.5053 | 1.503 | 1.5025 | 1.5035 | 1.5041 | 1.5046 | 1.5053 |

TABLE 1B-continued

Selected physical properties of the glasses listed in Table 1B.

| | | | | | | | |
|---|---|---|---|---|---|---|---|
| 589.3 nm Stress optical coefficient (nm/mm/MPa) | 3.002 | 3.074 | 3.083 | 3.071 | 3.059 | 3.016 | 3.053 |

| | Ex. 36 | Ex. 37 | Ex. 38 | Ex. 39 | Ex. 40 | Ex. 41 | Ex. 42 |
|---|---|---|---|---|---|---|---|
| Density (g/cm³) | 2.453 | 2.453 | 2.452 | 2.451 | 2.449 | 2.449 | 2.425 |
| Low temperature CTE 25-300° C. (ppm/° C.) | 8.17 | 8.14 | 7.97 | 8.01 | 7.79 | 7.9 | 8.54 |
| High temperature CTE (ppm/° C.) | | | | | 20.56 | | |
| Strain pt. (° C.) | 595 | 595 | 584 | 587 | 578 | 584 | 617 |
| Anneal pt. (° C.) | 649 | 649 | 638 | 640 | 630 | 637 | 663 |
| $10^{11}$ Poise temperature (° C.) | 740 | 741 | 729 | 730 | 718 | 726 | 746 |
| Softening pt. (° C.) | 918 | 921 | 905 | 907 | 894 | 901 | 929 |
| $T^{35\ kP}$ (° C.) | 1229 | 1232 | 1212 | 1219 | 1200 | 1204 | 1232 |
| $T^{200\ kP}$ (° C.) | 1128 | 1131 | 1111 | 1118 | 1100 | 1103 | 1132 |
| Zircon breakdown temperature (° C.) | 1185 | | | 1200 | | 1210 | |
| Zircon breakdown viscosity (P) | 7.20E+04 | | | 4.26E+04 | | 3.00E+04 | |
| Liquidus temperature (° C.) | 995 | | | 990 | | 965 | |
| Liquidus viscosity (P) | 3.33E+06 | | | 2.51E+06 | | 3.71E+06 | |
| Poisson's ratio | 0.208 | | | 0.206 | | 0.206 | |
| Young's modulus (GPa) | 73.70 | | | 74.67 | | 75.50 | |
| Refractive index at 589.3 nm | 1.5032 | | | 1.5042 | | 1.5054 | 1.5005 |
| Stress optical coefficient (nm/mm/MPa) | 3.093 | | | 3.071 | | 3.072 | 3.033 |

| | Ex. 43 | Ex. 44 | Ex. 45 | Ex. 46 | Ex. 47 | Ex. 48 | Ex. 49 | Ex. 50 |
|---|---|---|---|---|---|---|---|---|
| Density (g/cm³) | 2.424 | 2.422 | 2.455 | 2.454 | 2.454 | 2.434 | 2.439 | 2.443 |
| Low temperature coefficient of thermal expansion 25-300° C. (ppm/° C.) | 8.48 | 8.34 | 8.03 | 7.88 | 7.76 | 7.87 | 7.71 | 7.63 |
| High temperature coefficient of thermal expansion (ppm/° C.) | | | | | | | | |
| Strain pt. temperature (° C.) | 614 | 594 | 595 | 586 | 579 | 580 | 581 | 579 |
| Anneal pt. temperature (° C.) | 659 | 640 | 649 | 639 | 630 | 633 | 633 | 632 |
| $10^{11}$ Poise temperature (° C.) | 739 | 722 | 740 | 729 | 718 | 722 | 721 | 721 |
| Softening pt. temperature (° C.) | 912 | 899 | 918 | 909 | 898 | 892 | 893 | 895 |

TABLE 1B-continued

Selected physical properties of the glasses listed in Table 1B.

| 35 kP temperature (° C.) | 1216 | 1204 | | 1212 | 1200 | 1203 | 1203 | 1203 |
|---|---|---|---|---|---|---|---|---|
| 200 kP temperature (° C.) | 1116 | 1102 | | 1113 | 1099 | 1105 | 1102 | 1103 |
| Zircon breakdown temperature (° C.) | | | | | | | | |
| Zircon breakdown viscosity (P) | | | | | | | | |
| Liquidus temperature (° C.) | | | 985 | | 965 | 1005 | 1010 | 1030 |
| Liquidus viscosity (P) | | | | | 4.E+06 | 1.78E+06 | 1.34E+06 | 8.98E+05 |
| Poisson's ratio | | | | | | 0.211 | 0.21 | 0.213 |
| Young's modulus (GPa) | | | | | | 76.32 | 76.60 | 76.81 |
| Refractive index at 589.3 nm | 1.5014 | 1.5026 | 1.5036 | 1.5047 | 1.5061 | 1.505 | 1.5059 | 1.5064 |
| Stress optical coefficient (nm/mm/MPa) | 2.965 | 2.981 | 3.082 | 3.057 | 3.063 | 3.025 | 3.004 | 3.046 |

| | Ex. 51 | Ex. 52 | Ex. 53 | Ex. 54 | Ex. 55 | Ex. 56 | Ex. 57 |
|---|---|---|---|---|---|---|---|
| Density (g/cm$^3$) | 2.424 | 2.431 | 2.403 | 2.4 | 2.45 | 2.462 | 2.468 |
| Low temperature CTE 25-300° C. (ppm/° C.) | 77.1 | 76.1 | 74.3 | 73.1 | 80.2 | 79.7 | 83.6 |
| High temperature CTE (ppm/° C.) | | | | | | | |
| Strain pt. (° C.) | 588 | 599 | 611 | 612 | 580 | 611 | 597 |
| Anneal pt. (° C.) | 640 | 651 | 665 | 665 | 631 | 663 | 649 |
| 10$^{11}$ Poise temperature (° C.) | 728 | 738 | 753 | 752 | 718 | 750 | 735 |
| Softening pt. (° C.) | 900.4 | 907.5 | 916 | 912.5 | 892.2 | 915.6 | 899.4 |
| T$^{35\ kP}$ (° C.) | 1204 | 1209 | 1209 | 1202 | 1206 | 1205 | 1184 |
| T$^{200\ kP}$ (° C.) | 1106 | 1113 | 1113 | 1106 | 1102 | 1111 | 1093 |
| Zircon breakdown temperature (° C.) | | | | | | | |
| Zircon breakdown viscosity (P) | | | | | | | |
| Liquidus temperature (° C.) | 1060 | 1115 | 1160 | 1205 | | | |
| Liquidus viscosity (P) | 5.11E+05 | 1.90E+05 | 8.18E+04 | 3.32E+04 | | | |
| Poisson's ratio | 0.211 | 0.212 | 0.208 | 0.214 | | | |
| Young's modulus (GPa) | 77.01 | 78.05 | 77.57 | 78.74 | | | |
| Refractive index at | 1.5054 | 1.5055 | 1.5059 | 1.5072 | | | |

TABLE 1B-continued

Selected physical properties of the glasses listed in Table 1B.

| | | | | |
|---|---|---|---|---|
| 589.3 nm Stress optical coefficient (nm/mm/MPa) | 3.011 | 2.98 | 2.982 | 2.964 |

| | | Ex. 64 |
|---|---|---|
| | Density (g/cm³) | 2.428 |
| | CTE 25-300° C. (ppm/° C.) | 7.8 |
| | Strain pt. (° C.) | 571 |
| | Anneal pt. (° C.) | 622 |
| | $10^{11}$ Poise temperature (° C.) | |
| | Softening pt. (° C.) | 881.4 |
| | $T^{35\ kP}$ (° C.) | |
| | $T^{200\ kP}$ (° C.) | 1645 |
| | Zircon breakdown temperature (° C.) | |
| | Zircon breakdown viscosity (P) | |
| | Liquidus temperature (° C.) | 1000 |
| | Liquidus viscosity (P) | 1524280 |
| | Poisson's ratio | 0.211 |
| | Young's modulus (GPa) | 76.3 |
| | Refractive index at 589.3 nm | 1.51 |
| | Stress optical coefficient (nm/mm/MPa) | 3.02 |

Where the glass-based article includes a glass-ceramic, the crystal phases may include β-spodumene, rutile, gahnite or other known crystal phases and combinations thereof.

The glass-based article may be substantially planar, although other embodiments may utilize a curved or otherwise shaped or sculpted substrate. In some instances, the glass-based article may have a 3D or 2.5D shape. The glass-based article may be substantially optically clear, transparent and free from light scattering. The glass-based article may have a refractive index in the range from about 1.45 to about 1.55. As used herein, the refractive index values are with respect to a wavelength of 550 nm.

Additionally or alternatively, the thickness of the glass-based article may be constant along one or more dimension or may vary along one or more of its dimensions for aesthetic and/or functional reasons. For example, the edges of the glass-based article may be thicker as compared to more central regions of the glass-based article. The length, width and thickness dimensions of the glass-based article may also vary according to the article application or use.

The glass-based article may be characterized by the manner in which it is formed. For instance, where the glass-based article may be characterized as float-formable (i.e., formed by a float process), down-drawable and, in particular, fusion-formable or slot-drawable (i.e., formed by a down draw process such as a fusion draw process or a slot draw process).

A float-formable glass-based article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based article that can be lifted from the tin onto rollers. Once off the bath, the glass glass-based article can be cooled further and annealed to reduce internal stress. Where the glass-based article is a glass ceramic, the glass-based article formed from the float process may be subjected to a ceramming process by which one or more crystalline phases are generated.

Down-draw processes produce glass-based articles having a uniform thickness that possess relatively pristine surfaces. Because the average flexural strength of the glass-based article is controlled by the amount and size of surface flaws, a pristine surface that has had minimal contact has a higher initial strength. When this high strength glass-based article is then further strengthened (e.g., chemically), the resultant strength can be higher than that of a glass-based article with a surface that has been lapped and polished. Down-drawn glass-based articles may be drawn to a thickness of less than about 2 mm. In addition, down drawn glass-based articles have a very flat, smooth surface that can be used in its final application without costly grinding and polishing. Where the glass-based article is a glass ceramic, the glass-based article formed from the down draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based article. The fusion draw method offers the advantage that, because the two glass films flowing over the channel fuse together, neither of the outside surfaces of the resulting glass-based article comes in contact with any part of the apparatus. Thus, the surface properties of the fusion drawn glass-based article are not affected by such contact. Where the glass-based article is a glass ceramic, the glass-based article formed from the fusion process may be subjected to a ceramming process by which one or more crystalline phases are generated.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass-based article and into an annealing region.

The glass-based article may be acid polished or otherwise treated to remove or reduce the effect of surface flaws.

Figure 28:
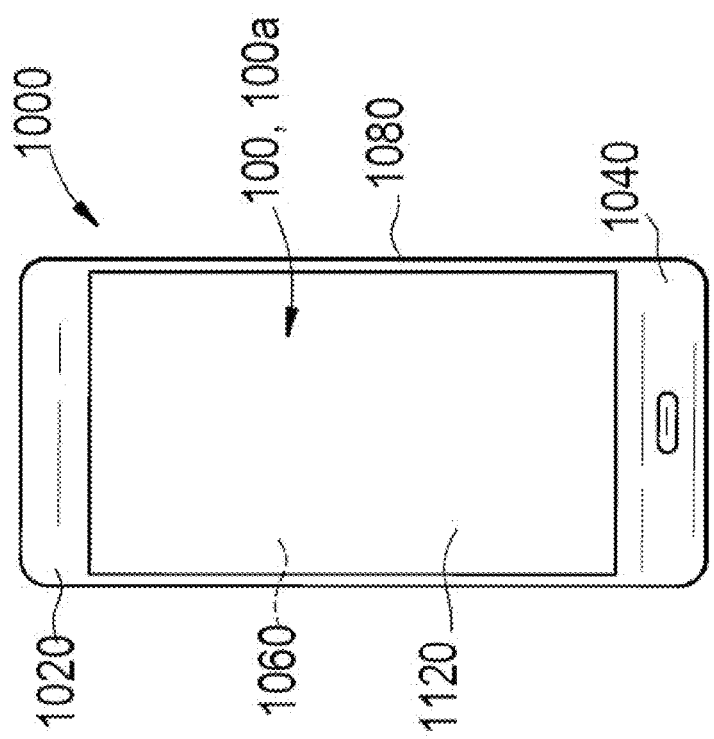
FIG. 28 is a front plan view of an electronic device incorporating one or more embodiments of the glass-based articles described herein.

Another aspect of this disclosure pertains to devices that include the glass-based articles described herein. For example, the devices may include any device including a display or requiring, strengthened thin glass. In one or more embodiments the devices are electronic devices, which can include mobile devices such as mobile phones, laptops, tablets, mp3 players, navigation devices and the like, or stationary devices such as computers, electronic displays, in vehicle information/entertainment systems, billboards, point of sale systems, navigation systems, and the like). In some embodiments, the glass-based articles described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that requires some fracture resistance. As shown in FIG. 28, an electronic device 1000 may include a glass-based article 100 according to one or more embodiments described herein. The device 100 includes a housing 1020 having front 1040, back 1060, and side surfaces 1080; electrical components (not shown) that are at least partially inside or entirely within the housing and including at least a controller, a memory, and a display 1120 at or adjacent to the front surface of the housing. The glass-based article 100 is shown as a cover disposed at or over the front surface of the housing such that it is over the display 1120. In some embodiments, the glass-based article may be used as a back cover.

Another aspect of this disclosure pertains to a method of forming a fracture-resistant glass-based article. The method includes providing a glass-based substrate having a first surface and a second surface defining a thickness of about 1 millimeter or less and generating a stress profile in the glass-based substrate, as described herein to provide the fracture-resistant glass-based article. In one or more embodiments, generating the stress profile comprises ion exchanging a plurality of alkali ions into the glass-based substrate to form a non-zero alkali metal oxide concentration that varies along a substantial portion of the thickness (as described herein) or along the entire thickness. In one example, generating the stress profile includes immersing the glass-based substrate in a molten salt bath including nitrates of Na+, K+, Rb+, Cs+ or a combination thereof, having a temperature of about 350° C. or greater (e.g., about 350° C. to about 500° C.). In one example, the molten bath may include $NaNO_3$, $KNO_3$ or a combination thereof, and may have a temperature of about 485° C. or less. In another example, the bath may include a mixture of $NaNO_3$ and $KNO_3$ and have a temperature of about 460° C. The glass-based substrate may be immersed in the bath for about 2 hours or more, up to about 48 hours (e.g., from about 2 hours to about 10 hours, from about 2 hours to about 8 hours, from about 2 hours to about 6 hours, from about 3 hours to about 10 hours, or from about 3.5 hours to about 10 hours).

In some embodiments, the method may include chemically strengthening or ion exchanging the glass-based substrate in a single bath or in more than one step using successive immersion steps in more than one bath. For example, two or more baths may be used successively. The composition of the one or more baths may include a single metal (e.g., Ag+, Na+, K+, Rb+, or Cs+) or a combination of metals in the same bath. When more than one bath is utilized, the baths may have the same or different composition and/or temperature as one another. The immersion times in each such bath may be the same or may vary to provide the desired stress profile.

In one or more embodiments of the method, a second bath or subsequent baths may be utilized to generate a greater surface CS. In some instances, the method includes immersing the glass-based substrate in the second or subsequent baths to generate a greater surface CS, without significantly influencing the chemical depth of layer and/or the DOC. In such embodiments, the second or subsequent bath may include a single metal (e.g., $KNO_3$ or $NaNO_3$) or a mixture of metals ($KNO_3$ and $NaNO_3$). The temperature of the second or subsequent bath may be tailored to generate the greater surface CS. In some embodiments, the immersion time of the glass-based substrate in the second or subsequent bath may also be tailored to generate a greater surface CS without influencing the chemical depth of layer and/or the DOC. For example, the immersion time in the second or subsequent baths may be less than 10 hours (e.g., about 8 hours or less, about 5 hours or less, about 4 hours or less, about 2 hours or less, about 1 hour or less, about 30 minutes or less, about 15 minutes or less, or about 10 minutes or less).

In one or more alternative embodiments, the method may include one or more heat treatment steps which may be used in combination with the ion-exchanging processes described herein. The heat treatment includes heat treating the glass-based article to obtain a desired stress profile. In some embodiments, heat treating includes annealing, tempering or heating the glass-based substrate to a temperature in the range from about 300° C. to about 600° C. The heat treatment may last for 1 minute up to about 18 hours. In some embodiments, the heat treatment may be used after one or more ion-exchanging processes, or between ion-exchanging processes.

One or more embodiments of glass compositions described herein can be used to make glass-based articles as described herein, including Examples 1-64 above and Examples 1-6 below, as well as the ranges of compositions described herein. In one embodiment, a glass-based article comprises a first surface and a second surface opposing the first surface defining a thickness (t) (mm); a concentration of a metal oxide that is both non-zero and varies along a thickness range from about 0·t to about 0.3·t; and a central tension (CT) region comprising a maximum CT (MPa) of less than about $71.5/\sqrt{(t)}$, wherein the article exhibits a threshold failure impact force greater than 500 Newtons when the article is bent to impart a tensile stress of 100 MPa. In one or more specific embodiments, the glass article exhibits a threshold failure impact force greater than 525, 550, 575, 600, 625, 650, 675, 700, 725, 750, 775, 800, 825 or 800 Newtons when the article is bent to impart a tensile stress of 100 MPa. According to one or more embodiments, the glass-based article having the aforementioned threshold failure impact force properties has a thickness in the range of 0.1 to 3 mm, more particularly, 0.2 to 2 mm, 0.2 to 1.9 mm, 0.2 to 1.8 mm, 0.2 to 1.7 mm, 0.2 to 1.6 mm, 0.2 to 1.5 mm, 0.2 to 1.4 mm, 0.2 to 1.3 mm, 0.2 to 1.2 mm, 0.2 to 1.1 mm, 0.3 to 1 mm, 0.3 to 0.9 mm, 0.3 to 0.8 mm, 0.3 to 0.7 mm, 0.3 to 0.6 mm, 0.3 to 0.5 mm and 0.3 to 0.4 mm. In specific embodiments, the glass-based article having the aforementioned threshold failure impact force properties has a thickness of 0.4 mm, 0.5, mm, 0.6, mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 2 mm, 2.1 mm, 2.2 mm, 2.3 mm, 2.4 mm, 2.5 mm, 2.6 mm, 2.7 mm, 2.8 mm, 2.9 mm or 3 mm. In any of the above-described embodiments, the glass-based article having the aforementioned threshold failure impact force properties and thicknesses has a surface compressive stress of greater than about 200 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a first surface and a second surface opposing the first surface defining a thickness (t) (mm); a concentration of a metal oxide that is both non-zero and varies along a thickness range from about 0·t to about 0.3·t; and a central tension (CT) region comprising a maximum CT (MPa) of less than about $71.5/\sqrt{(t)}$, wherein the article exhibits a retained strength of 125 MPa or more after being impacted by an impact force of 800 N when the article is bent to impart a tensile stress of 100 MPa. In one or more embodiments, the glass based article exhibits a retained strength of 135, 145, 150, 160, 170, 180, 190 or 200 or more MPa after being impacted by an impact force of 800 N when the article is bent to impart a tensile stress of 100 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a first surface and a second surface opposing the first surface defining a thickness (t) of about less than about 3 millimeters; and a stress profile extending along the thickness, wherein all points of the stress profile between a thickness range from about 0·t up to 0.3·t and from greater than 0.7·t, comprise a tangent with a slope having an absolute value that is greater than about 0.1 MPa/micrometer, wherein the stress profile comprises a maximum CS, a DOC and a maximum CT of less than about $71.5/\sqrt{(t)}$ (MPa), wherein the ratio of maximum CT to absolute value of maximum CS is in the range from about 0.01 to about 0.2 and wherein the DOC is about 0.1·t or greater, and wherein the article exhibits a threshold failure impact force greater than 500 Newtons when the article is bent to impart a tensile stress of 100 MPa.

In one or more specific embodiments, the glass article exhibits a threshold failure impact force greater than 525, 550, 575, 600, 625, 650, 675, 700, 725, 750, 775, 800, 825 or 800 Newtons when the article is bent to impart a tensile stress of 100 MPa. According to one or more embodiments, the glass-based article having the aforementioned threshold failure impact force properties has a thickness in the range of 0.1 to 3 mm, more particularly, 0.2 to 2 mm, 0.2 to 1.9 mm, 0.2 to 1.8 mm, 0.2 to 1.7 mm, 0.2 to 1.6 mm, 0.2 to 1.5 mm, 0.2 to 1.4 mm, 0.2 to 1.3 mm, 0.2 to 1.2 mm, 0.2 to 1.1 mm, 0.3 to 1 mm, 0.3 to 0.9 mm, 0.3 to 0.8 mm, 0.3 to 0.7 mm, 0.3 to 0.6 mm, 0.3 to 0.5 mm and 0.3 to 0.4 mm. In specific embodiments, the glass-based article having the aforementioned threshold failure impact force properties has a thickness of 0.4 mm, 0.5, mm, 0.6, mm, 0.7 mm, 0.8 mm, 0.9 mm, 1 mm, 1.1 mm, 1.2 mm, 1.3 mm, 1.4 mm 1.5 mm, 1.6 mm, 1.7 mm, 1.8 mm, 2 mm, 2.1 mm, 2.2 mm, 2.3 mm, 2.4 mm, 2.5 mm, 2.6 mm, 2.7 mm, 2.8 mm, 2.9 mm or 3 mm. In any of the above-described embodiments, the glass-based article having the aforementioned threshold failure impact force properties and thicknesses has a surface compressive stress of greater than about 200 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a first surface and a second surface opposing the first surface defining a thickness (t) of about less than about 3 millimeters; and a stress profile extending along the thickness, wherein all points of the stress profile between a thickness range from about 0·t up to 0.3·t and from greater than 0.7·t, comprise a tangent with a slope having an absolute value that is greater than about 0.1 MPa/micrometer, wherein the stress profile comprises a maximum CS, a DOC and a maximum CT of less than about $71.5/\sqrt{(t)}$ (MPa), wherein the ratio of maximum CT to absolute value of maximum CS is in the range from about 0.01 to about 0.2 and wherein the DOC is about 0.1·t or greater, and wherein the article exhibits a retained strength of 125 MPa or more after being impacted by an impact force of 800 N when the article is bent to impart a tensile stress of 100 MPa. In one or more embodiments, the glass based article exhibits a retained strength of 135, 145, 150, 160, 170, 180, 190 or 200 or more MPa after being impacted by an impact force of 800 N when the article is bent to impart a tensile stress of 100 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a first surface and a second surface opposing the first surface defining a thickness (t) (mm); and a metal oxide that forms a concentration gradient, wherein the concentration of the metal oxide decreases from the first surface to a point between the first surface and the second surface and increases from the point to the second surface, wherein the concentration of the metal oxide at the point is non-zero, and wherein the article exhibits a threshold failure impact force greater than 500 Newtons when the article is bent to impart a tensile stress of 100 MPa.

In one or more specific embodiments, the glass article exhibits a threshold failure impact force greater than 525, 550, 575, 600, 625, 650, 675, 700, 725, 750, 775, 800, 825 or 800 Newtons when the article is bent to impart a tensile stress of 100 MPa. According to one or more embodiments, the glass-based article having the aforementioned threshold failure impact force properties has a thickness in the range of 0.1 to 3 mm, more particularly, 0.2 to 2 mm, 0.2 to 1.9 mm, 0.2 to 1.8 mm, 0.2 to 1.7 mm, 0.2 to 1.6 mm, 0.2 to 1.5 mm, 0.2 to 1.4 mm, 0.2 to 1.3 mm, 0.2 to 1.2 mm, 0.2 to 1.1 mm, 0.3 to 1 mm, 0.3 to 0.9 mm, 0.3 to 0.8 mm, 0.3 to 0.7 mm, 0.3 to 0.6 mm, 0.3 to 0.5 mm and 0.3 to 0.4 mm. In specific embodiments, the glass-based article having the aforementioned threshold failure impact force properties has a thickness of 0.4 mm, 0.5, mm, 0.6, mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 2 mm, 2.1 mm, 2.2 mm, 2.3 mm, 2.4 mm, 2.5 mm, 2.6 mm, 2.7 mm, 2.8 mm, 2.9 mm or 3 mm. In any of the above-described embodiments, the glass-based article having the aforementioned threshold failure impact force properties and thicknesses has a surface compressive stress of greater than about 200 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a first surface and a second surface opposing the first surface defining a thickness (t) (mm); and a metal oxide that forms a concentration gradient, wherein the concentration of the metal oxide decreases from the first surface to a point between the first surface and the second surface and increases from the point to the second surface, wherein the concentration of the metal oxide at the point is non-zero, and wherein the article exhibits a retained strength of 125 MPa or more after being impacted by an impact force of 800 N when the article is bent to impart a tensile stress of 100 MPa. In one or more embodiments, the glass based article exhibits a retained strength of 135, 145, 150, 160, 170, 180, 190 or 200 or more MPa after being impacted by an impact force of 800 N when the article is bent to impart a tensile stress of 100 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a stress profile including a CS region and a CT region, wherein the CT region is approximated by the equation Stress(x)=MaxT$-(((CT_n-(n+1))/0.5^n)\cdot|(x/t)-0.5|^n)$, wherein MaxT is a maximum tension value and is a positive value in units of MPa, wherein $CT_n$ is the tension value at n, $CT_n$ is less than or equal to MaxT, and is a positive value in units of MPa, wherein x is position along the thickness (t) in micrometers, wherein n is in the range from 1.5 to 5, and wherein the article exhibits a threshold failure impact force greater than 500 Newtons when the article is bent to impart a tensile stress of 100 MPa.

In one or more specific embodiments, the glass article exhibits a threshold failure impact force greater than 525, 550, 575, 600, 625, 650, 675, 700, 725, 750, 775, 800, 825 or 800 Newtons when the article is bent to impart a tensile stress of 100 MPa. According to one or more embodiments, the glass-based article having the aforementioned threshold failure impact force properties has a thickness in the range of 0.1 to 3 mm, more particularly, 0.2 to 2 mm, 0.2 to 1.9 mm, 0.2 to 1.8 mm, 0.2 to 1.7 mm, 0.2 to 1.6 mm, 0.2 to 1.5 mm, 0.2 to 1.4 mm, 0.2 to 1.3 mm, 0.2 to 1.2 mm, 0.2 to 1.1 mm, 0.3 to 1 mm, 0.3 to 0.9 mm, 0.3 to 0.8 mm, 0.3 to 0.7 mm, 0.3 to 0.6 mm, 0.3 to 0.5 mm and 0.3 to 0.4 mm. In specific embodiments, the glass-based article having the aforementioned threshold failure impact force properties has a thickness of 0.4 mm, 0.5, mm, 0.6, mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 2 mm, 2.1 mm, 2.2 mm, 2.3 mm, 2.4 mm, 2.5 mm, 2.6 mm, 2.7 mm, 2.8 mm, 2.9 mm or 3 mm. In any of the above-described embodiments, the glass-based article having the aforementioned threshold failure impact force properties and thicknesses has a surface compressive stress of greater than about 200 MPa.

One or more embodiments of glass compositions described herein can be used to make glass-based articles as described herein, including Examples 1-64 above and Examples 1-6 below, as well as the ranges of compositions described herein. In one embodiment a glass-based article comprises a stress profile including a CS region and a CT region, wherein the CT region is approximated by the equation Stress(x)=MaxT$-(((CT_n-(n+1))/0.5^n)\cdot|(x/t)-0.5n)$, wherein MaxT is a maximum tension value and is a positive value in units of MPa, wherein $CT_n$ is the tension value at n, $CT_n$ is less than or equal to MaxT, and is a positive value in units of MPa, wherein x is position along the thickness (t) in micrometers, wherein n is in the range from 1.5 to 5, and wherein the article exhibits a retained strength of 125 MPa or more after being impacted by an impact force of 800 N when the article is bent to impart a tensile stress of 100 MPa. In one or more embodiments, the glass based article exhibits a retained strength of 135, 145, 150, 160, 170, 180, 190 or 200 or more MPa after being impacted by an impact force of 800 N when the article is bent to impart a tensile stress of 100 MPa.

In the embodiments described immediately above which include the material property that article exhibits a threshold failure impact force greater than a certain force value when the article is bent to impart a tensile stress of 100 MPa or certain a retained strength of a certain value (or more) after being impacted by an impact force of 800 N when the article is bent to impart a tensile stress of 100 MPa, these properties can be tested as follows. According to one or more embodiments, "threshold failure impact force" refers to the minimum impact force that is sufficient to causes an observable fracture on the surface of the article, as described above with respect to FIG. 8. In one or more embodiments, the article tested for "threshold failure impact force" is a sheet having a thickness of 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm or 2 mm.

Retained strength is measured by using a four point bend test (as described herein) or an AROR test as described herein. The phrase "when the article is bent to impart a tensile stress of 100 MPa" refers to an externally applied tensile stress to a glass based article that is the result of bending. Thus, when a glass-based article is bent, forming an apex that is a contact surface according to the testing described herein, apex, which is at the outer surface of the glass-based article when it is bent, has an externally applied tensile stress as a result of the bending.

Additional aspects of the disclosure relate to apparatus and methods for measuring threshold failure impact force. Reliability testing of devices is integral to understanding how they will perform during their application lifetime. Device drop testing is commonly employed to understand handheld electronic device (e.g. smartphone, tablets, laptops, etc.) reliability after incurring drop events (e.g. dropping a phone in a parking lot), as these events could compromise the device functionality. One concern with devices is the reliability of the cover glass used in these devices. Damage or fracture to the cover glass of a handheld, electronic device can result in a non-useable device and/or safety issues for the user. Understanding the limitation of the cover material and how it relates to the device design is integral to improving cover glass performance.

Typically, real devices are drop tested to understand their reliability. However, this can become very expensive and is only available when the device design has become finalized and devices have been fabricated. To handle these drawbacks, surrogate test vehicles (reusable, mock-up of devices that resemble device dimensions and weight) are used to simulate device for cover glass performance testing. These surrogate vehicles help in understanding the capability of the glass to meet customer requirements and help in providing design feedback that aids in cover glass survivability (e.g. bevel design). However, the building of the surrogate vehicles and to performing the (drop) test is time consuming and quite expensive. Thus, it would be desirable to provide a less time consuming and inexpensive test on the concept of damage introduction and bending, as seen in most field failure mode.

An aspect of the disclosure pertains to an apparatus for testing surface of a glass-based article, for example, a cover glass for mobile electronic devices such that it simulates a failure mode that has been observed to occur in the field, which is predominantly a combination of stress (bending) and damage introduction. This known failure mode is re-created using a component-level based surface impact test. Extensive testing has been conducted using this apparatus and it has been learned that certain glass compositions and ion exchange stress profiles can improve cover glass survivability, through this test.

In one or more embodiments, the apparatus comprises a simple pendulum-based dynamic impact test having a surface ranging from flat to curved, where the glass-based article test specimen is mounted to a bob of a pendulum, which is then used to cause the test specimen to contact an impact surface, which can be a smooth or roughened surface. In one or more embodiments, to perform the test, the sample is loaded on the holder and then pulled backwards from the pendulum equilibrium position and released to make a dynamic impact on the impact surface. The test mimics a drop event, such that the glass/specimen is the moving part and the surface is the stationary part. Available curved surfaces are a simulative of stress numbers (bending stress) obtained from field failures. According to one or more embodiments of the apparatus, the glass-based article is the moving part, which travels to strike the impact surface, which is the stationary part, replicative of a device (moving part) dropped from a given height onto a surface (stationary part).

Failure mode is known to vary with the speed of damage introduction and bending rate. Unlike other quasi-statistic load application based component-level test, such as ring-on-ring (ROR), indentation fracture threshold (IFT) and abraded ring-on-ring (ARoR—which involves damage introduction followed by slow bending through quasi-static load application) used to characterize cover glass performance, this test is dynamic in nature. Furthermore, with the increasing demand for thin cover material in mobile device applications becoming very popular, the need to have a component level based test to evaluate different thin cover materials becomes important. This test can be used in the prediction of the potential drop performance response of this thin glass, as it demonstrated credibility in the evaluation of glass materials, of different compositions and IOX treatments, as low as 0.3 mm thickness. According to one or more embodiments, the test method simplicity enables quicker estimation of glass impact energy and associated impact force, which compares well to those generated from system level drop test.

Figure 32:
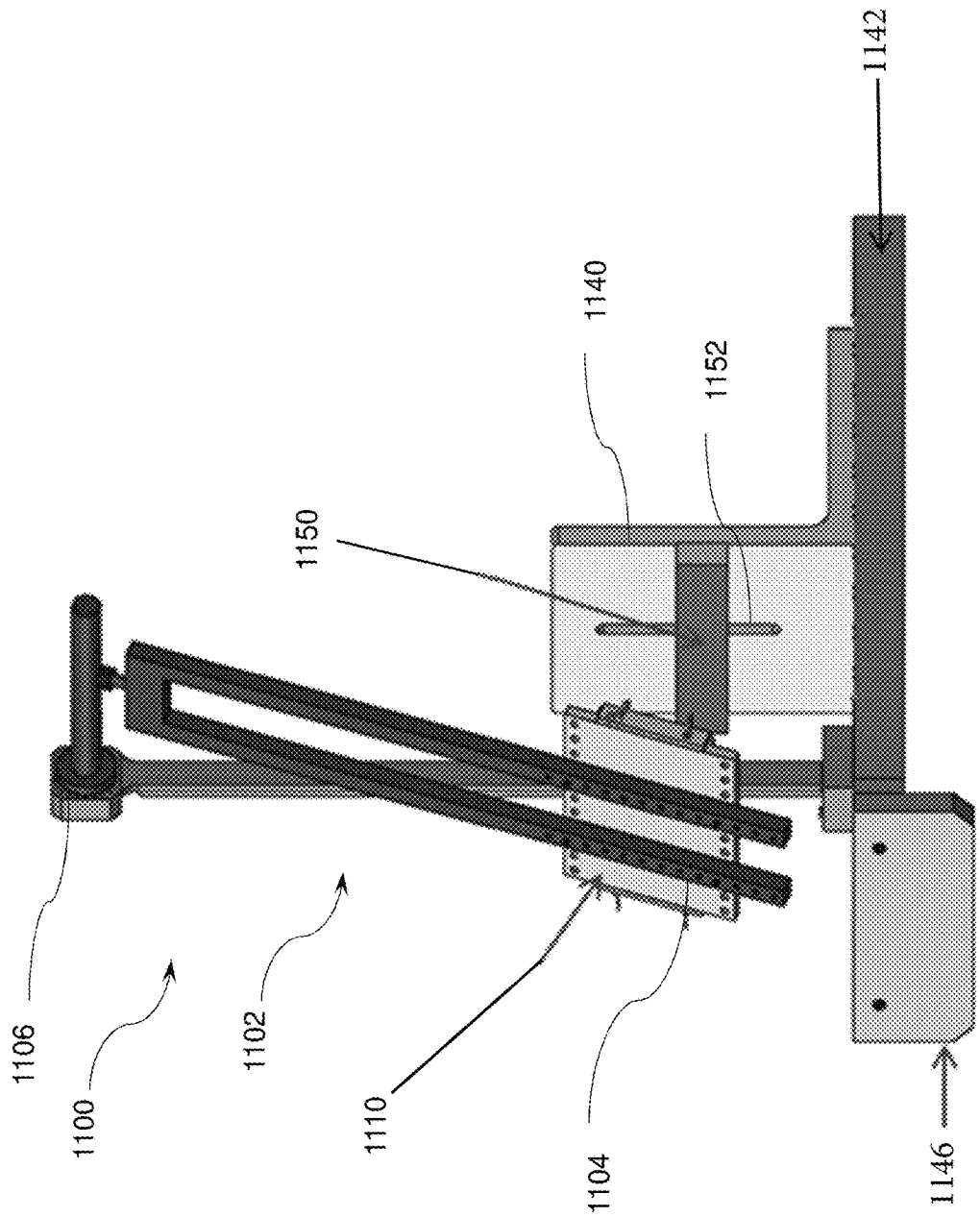
FIG. 32 is a front perspective view of the testing apparatus shown in FIG. 29.
Figure 33:
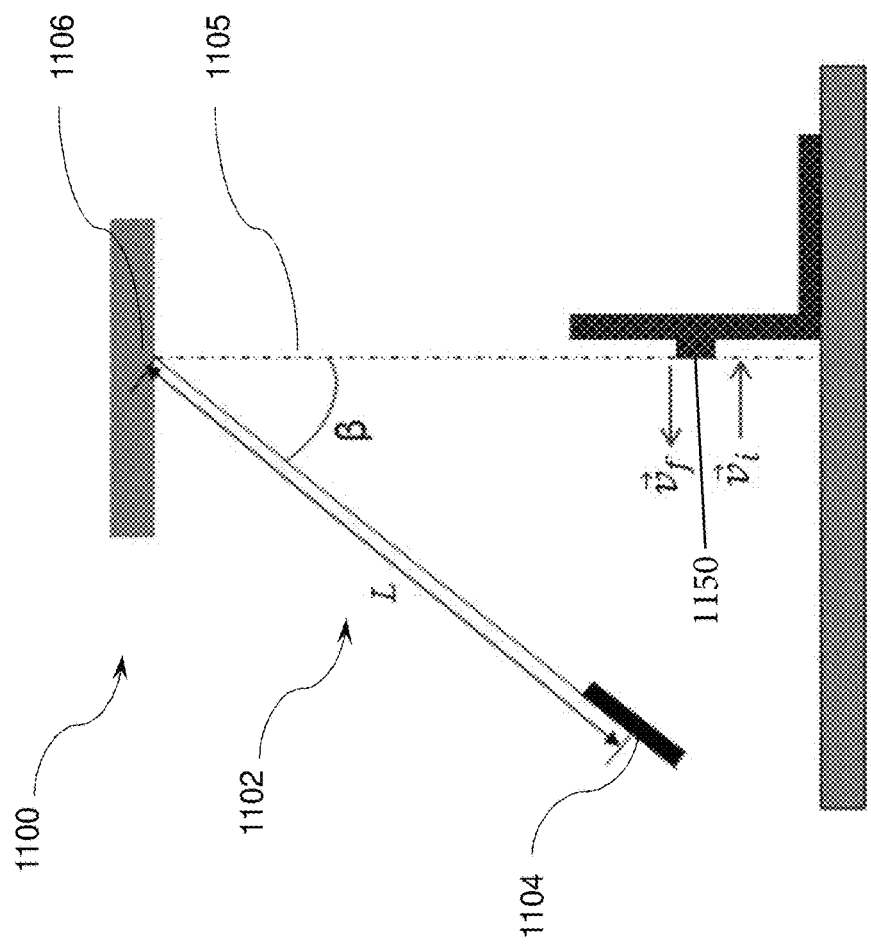
FIG. 33 is side view of a testing apparatus for glass-based articles.

Referring now to FIGS. 29-33, an embodiment of an apparatus 1100 for impact testing a brittle substrate is shown as comprising a pendulum 1102 including a bob 1104 attached to a pivot 1106. A bob on a pendulum is a weight suspended from the pivot and connected to a pivot by an arm. Thus, the bob 1104 shown in the Figures is connected to the pivot 1106 by arm 1108, which may be in the form of a string, or a rod or a plurality of rods, such as two rods as shown. As best shown in FIG. 33, the bob 1104 has an equilibrium position 1105 shown as dotted line such that the angle $\beta$ is zero. In other words, the arm 1108 is not in a raised position.

The bob 1104 can simply be the brittle substrate that is affixed to the lower end of the arm 1108. In one or more embodiments, the bob 1104 includes a base 1110 for receiving a brittle substrate. As shown in better detail in FIG. 34, the base 1110 for receiving a brittle substrate 1112 having at least two ends 1114, 1116, an inner surface 1113 and an outer surface 1115. The base 1110 has a first end 1120 and a second end 1122, and a curved surface 1124 defining a radius of curvature between the first end 1120 and the second end 1122. The base 1110 can be any suitable material to provide a platform to secure a substrate for the impact test, which will be described further below. Suitable materials for the base 1110 can include wood, metal, ceramic, or combinations thereof. The curved surface 1124 has an apex 1125.

Figure 34:
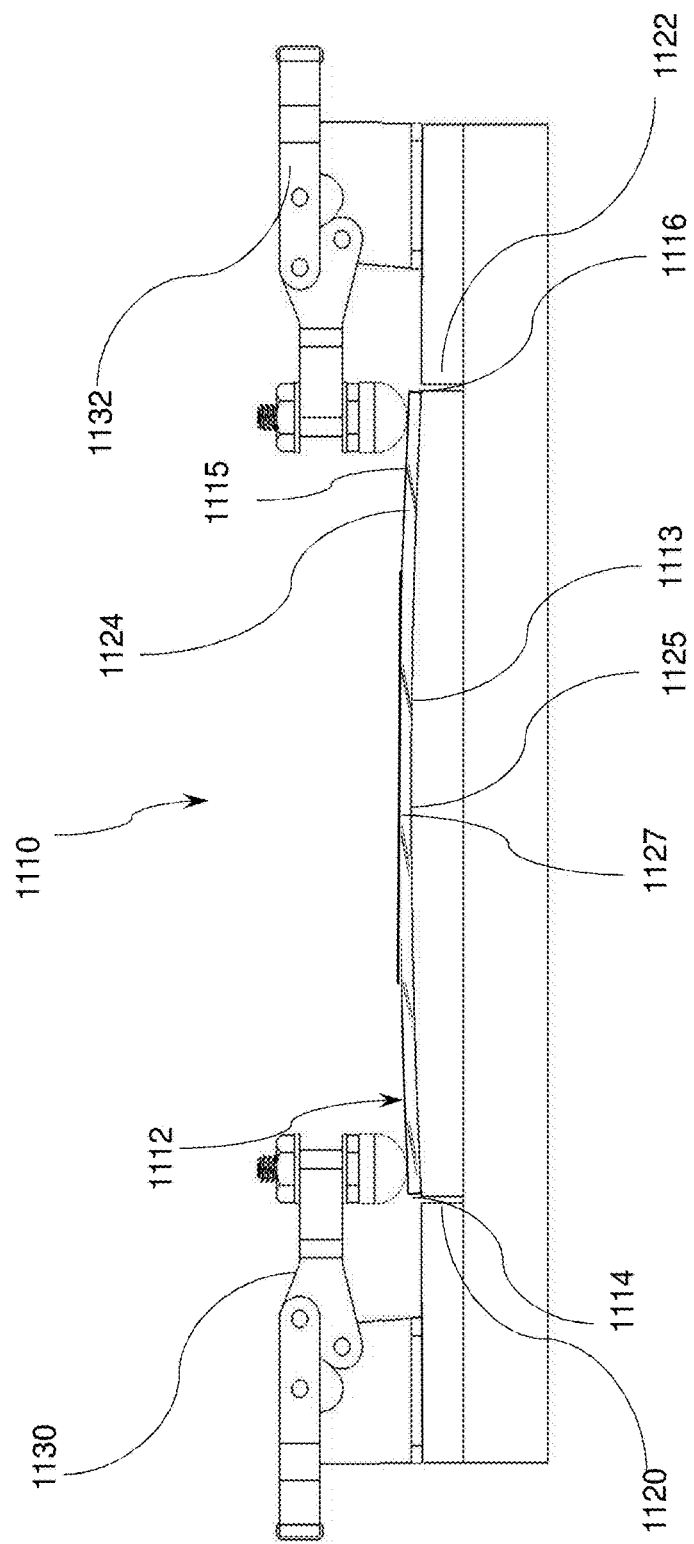
FIG. 34 is a side view of a portion of the testing apparatus shown in FIG. 29.

The apparatus 1100 according to one or more embodiments further includes a first fixture 1130 and a second fixture 1132 to hold the at least two ends 1114, 1116 of the brittle substrate 1112 and to apply a force to bend the brittle substrate 1112 about the curved surface 1124 and to conform the brittle substrate to the radius of curvature. By bending the brittle substrate 1112, the brittle substrate has an apex 1127 conforming to the apex 1125 of the curved surface 1124. In one or more specific embodiments, the curved surface 1124 and the curvature of the brittle substrate 1112 can be a fixed radius or a compound radius. The first fixture 1130 and the second fixture 1132 each are a clamp, and in specific embodiments toggle clamps as shown in FIG. 34. However, other types of fixtures such as bar clamps, C-clamps, or other suitable fixtures to hold the ends of the brittle substrate can be used.

The apparatus 1100 according to one or more embodiments further includes a roughened surface, which can be an abrasive sheet having an abrasive surface to be placed in contact with the outer surface 1115 of the substrate 1112. The abrasive sheet is attached to impact surface 1150 (of impacting object 1140 described below) by double sided tape, with the abrasive surface of the abrasive sheet facing toward the curved surface 1124 on which the substrate 1112 is mounted. In other specific embodiments, the abrasive sheet comprises sandpaper, which may have a grit size in the range of 30 grit to 400 grit, or 100 grit to 300 grit, for example 180 grit. One suitable sandpaper is Indasa Rhynowet® Plus Line P180 grit sandpaper. The sandpaper according to one or more embodiments is cut in 25 mm square pieces, and the sandpaper is flattened if the pieces are bent during the cutting process.

The apparatus 1100 further includes an impacting object 1140 positioned such that when the bob 1104 is released from a position at an angle β greater than zero from the equilibrium position 1105, the curved surface 1124 of the bob 1104 (or a substrate 1112 mounted on the curved surface 1124) contacts the impact surface 1150 (or the abrasive side of an abrasive sheet disposed on the impact surface 1150) of the impacting object 1140. In the embodiment shown, the impacting object 1140 is a L-shaped bracket affixed to platform 1142, and the impacting object 1140 is affixed to the platform 1142 by screw 1144. The impacting object 1140 could also be affixed by any other suitable mechanism such as a bolt, rivet, clamp, etc. The platform 1142 includes a stopper 1146, which permits the apparatus 1100 to be held at the end of work bench 1148. In the embodiment shown, the impacting object 1140 is fixed and does not move when the bob 1104 contacts the impacting object 1140 at impact surface 1150. The impact surface 1150 may be a separate element that is movable in the x-y plane as best seen in FIG. 32 within slot 1152. Alternatively, the impact surface 1150 need not move relative to the impacting object 1140. In one or more embodiments, the bob 1104 and base 1110 are sized and shaped such that when a brittle substrate is affixed to the base 1110 and when the bob 1104 is released from a position at an angle β greater than zero from the equilibrium position 1105, the brittle substrate 1112 is subjected to a bending radius and an impact force that simulate a bending radius of a chemically strengthened cover glass of a mobile phone or tablet device when the mobile phone or tablet device is dropped on a ground surface by a user of the mobile phone or tablet device.

In one or more embodiments the radius of curvature of the curved surface 1124 on the base 1110 is selected to provide a bending tensile force of 100 MPa when a substrate is bent around the curved surface 1124 such that the tensile force is an externally applied tensile force that results from the stress of bending the substrate. Thus, when the substrate is bent, the tensile force is at the apex 1125 of the brittle substrate. According to one or more embodiments, the radius of curvature is in the range of 0.25 m and 1.5 m, for example, in the range of 0.5 m and 1 m.

In one or more embodiments, the first fixture 1130 and second fixture 1132 are spaced apart at a distance of a cover glass length for a mobile phone or a tablet. In specific embodiments, the first fixture 1130 and second fixture 1132 are spaced apart at a distance in the range of 50 mm and 500 mm.

Another aspect of the disclosure pertains to a method of impact testing a brittle sheet, the method comprising: bending the brittle sheet having a contact surface to provide a bent sheet having a radius of curvature and an apex on the contact surface; and impacting the bent sheet at the apex with an impacting object using a pendulum. In an embodiment, the bent sheet is attached to a pendulum bob. In an embodiment, the bent sheet attached to a pendulum bob is positioned such that the impacting object contacts the apex of the contact surface. In one or more embodiments, the brittle sheet is glass and the radius of curvature is in a range that simulates a bending radius of a chemically or thermally strengthened cover glass of a mobile phone or tablet device when the mobile phone or tablet device is dropped on a ground surface by a user of the mobile phone or tablet device, wherein the drop event is such that an edge of the device contacts the ground first (as opposed to a face first drop wherein the device generally hits the ground in an orientation such that the contact surface is generally parallel to the ground).

In one or more embodiments, an abrasive sheet is placed on the impact surface 1150 in a position so as to contact the apex of the brittle sheet upon a swinging movement of the arm 1108. In one or more embodiments, the brittle sheet is secured to the impacting object with double sided tape.

Another embodiment pertains to a method of impact testing a brittle sheet, the method comprising: attaching a brittle sheet to a pendulum bob to expose a contact surface on the brittle sheet; and moving the pendulum bob with the brittle sheet attached to the pendulum bob to cause the contact surface to contact an impact object. In an embodiment, the method includes bending the brittle sheet to provide a bent sheet having a radius of curvature and an apex on the contact surface. In an embodiment, the bent sheet attached to a pendulum bob is positioned such that the impact object contacts the apex of the contact surface. In one or more embodiments, the brittle sheet is glass and the radius of curvature is in a range that simulates a bending radius of a chemically or thermally strengthened cover glass of a mobile phone or tablet device when the mobile phone or tablet device is dropped on a ground surface by a user of the mobile phone or tablet device, wherein the drop event is such that an edge of the device contacts the ground first (as opposed to a face first drop wherein the device generally hits the ground in an orientation such that the contact surface is generally parallel to the ground). In some embodiments, the brittle sheet is secured to a curved surface prior to impacting the apex with the impacting object.

Figure 29:
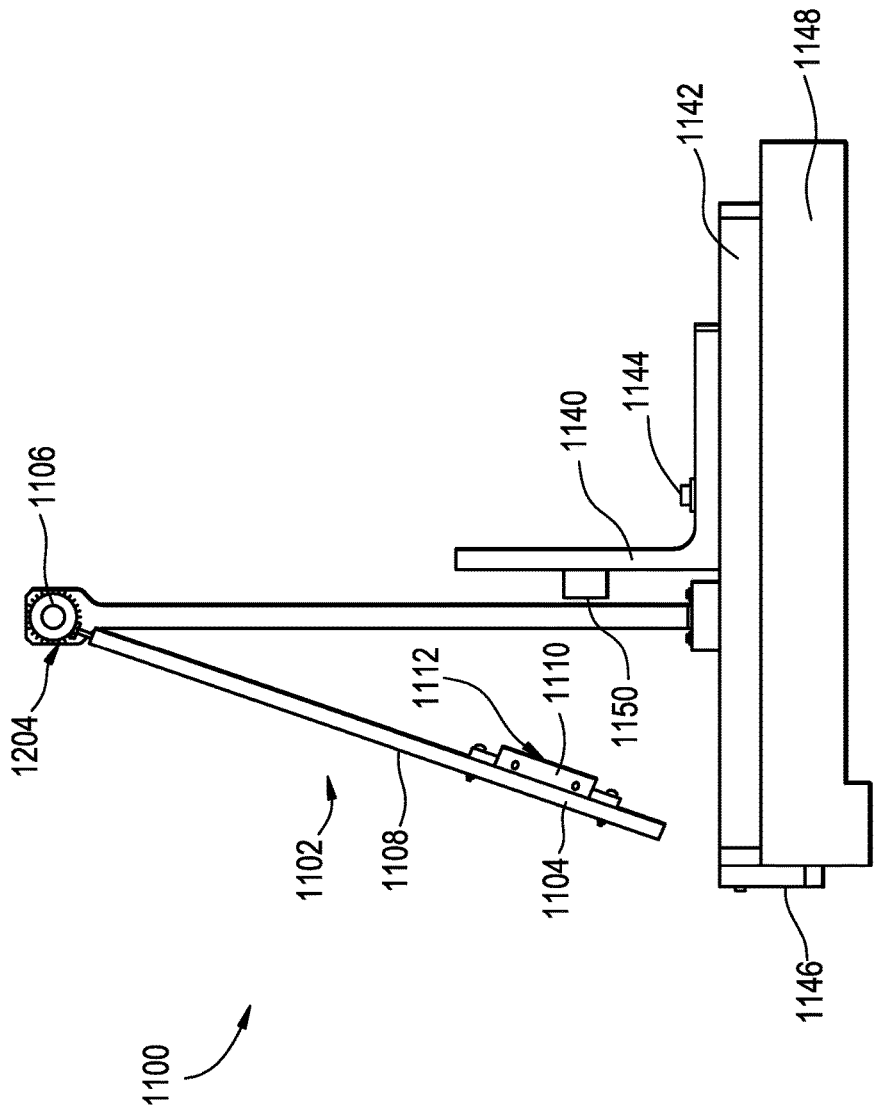
FIG. 29 is a side view of a testing apparatus for glass-based articles.
Figure 30:
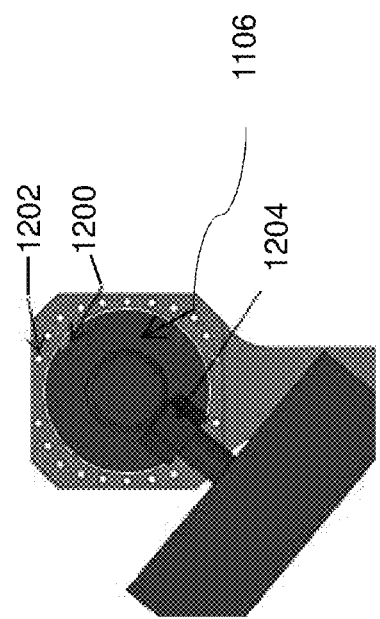
FIG. 30 is a side view of a portion of the testing apparatus shown in FIG. 29.
Figure 31:
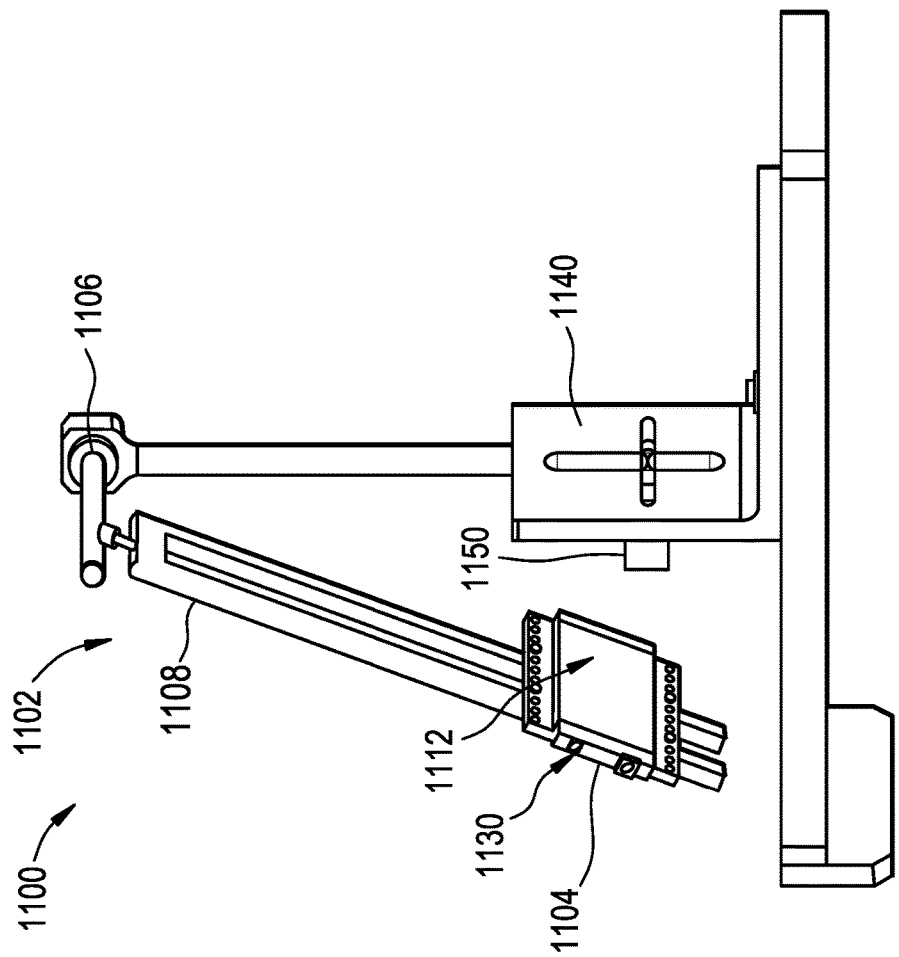
FIG. 31 is a rear perspective view of the testing apparatus shown in FIG. 29.

Referring now to FIGS. 29 and 30, specific, non-limiting details of operation of the apparatus include a pointer notch 1200 on the pivot 1106, which can point to various test positions 1202, i.e., positions at which the arm 1108 is positioned at angle β relative to equilibrium position 1105, and positions from which motion of the pendulum is initiated. The pointer notch 1200 enables alignment with a variety of test positions 1202, which may be any suitable number of test positions, for example 1, 2, 3, 4, 5, 6, 7, 8, 9, 10, and so on incrementally up to 50 or more. The apparatus 1100 may further include a lock, which may be in the form of nut 1204 to lock the arm 1108 in the desired rotational orientation about its central longitudinal axis so as to square the base 1110 with the impact surface 1150 of the impacting object 1140.

The apparatus 1100 simulates an actual phone drop event according to one or more embodiments. Incident impact energy, $\Sigma$ and average impact force, $\vec{F}_{avg}$ are provided by the equations $$E = mgL\{1 - \cos\beta\}$$

$$|\vec{F}_{avg}| = \frac{|m\vec{v}_f - m\vec{v}_i|}{\Delta t}$$

Where, m=mass of the pendulum 1102 (including swing arm 1108, bob 1104, and base 1110), L=length of arm, g=acceleration of free fall, of is the initial impact velocity (i.e., the velocity at the point when the glass first contacts the impact surface 1150 of the impacting object 1140), and vi is the final impact velocity (i.e., the velocity at which the glass leaves the impact surface 1150 of the impacting object 1140, or in other words at the point when the glass first separates from the impact surface 1150 of the impacting object 1140), and Δt=contact interaction time (i.e., the time during which the glass is in contact with the impact surface 1150 of the impacting object 1140). The contact interaction time is measured by high-speed video camera by observing the number of frames during which the glass is in contact with the impact surface 1150, and multiplying by the number of frames taken per unit time by the high-speed video camera. The average force equation is useful for samples that have not been broken already, i.e., the samples loaded into the apparatus 1100 prior to the test are ones that have not already been broken. When the mass and length of the swing arm are known, setting the angle β to a selected position, an impact force can be calculated and used to simulate impacts on a device when dropped from a specific height. For example, the average force experienced by a substrate cover glass on a 130 g mobile phone device when dropped from 1 meter height has been calculated to be 800 N. Using the mass, arm length and angle β, this force can be replicated using the apparatus 1100 shown in FIGS. 29-34.

Figure 35:
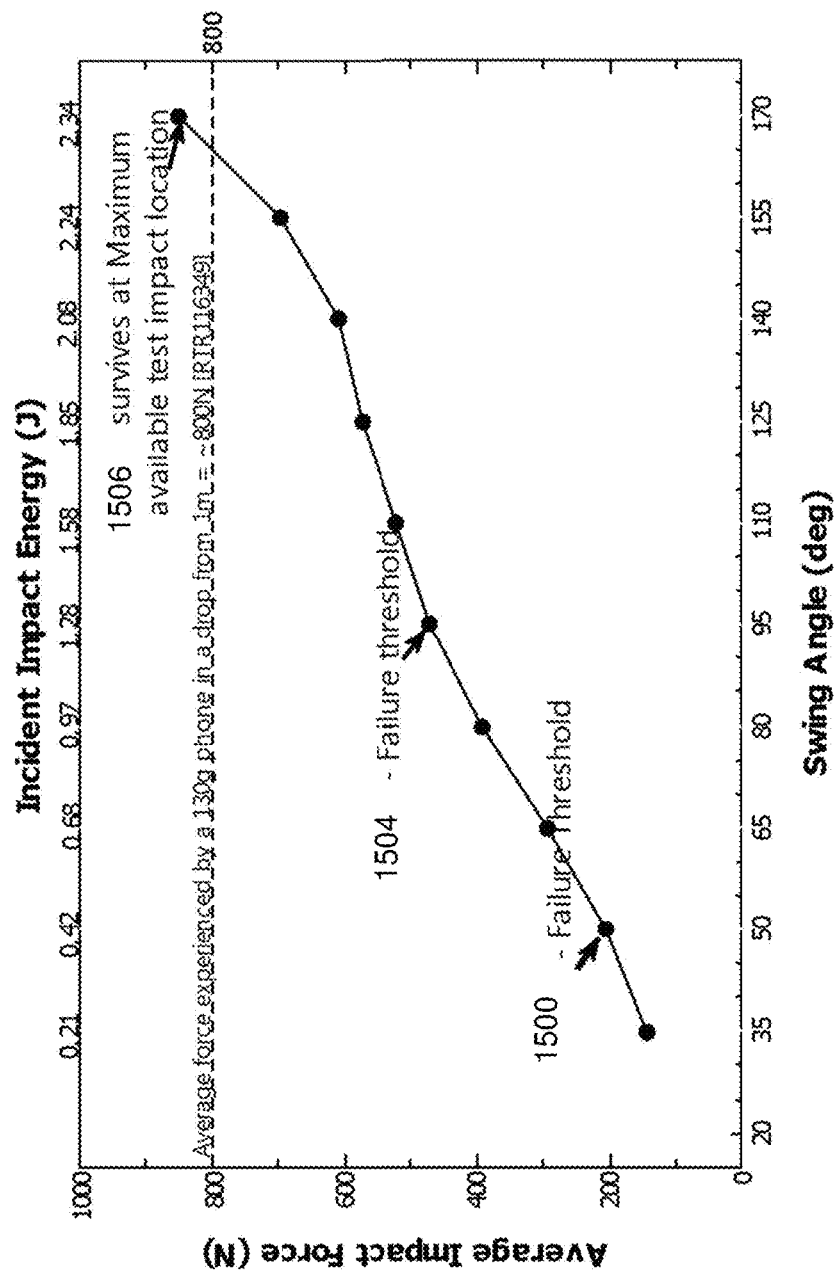
FIG. 35 is a graph of average impact force versus swing angle data obtained on the testing apparatus shown in FIG. 29 for various glass samples.
Figure 36:
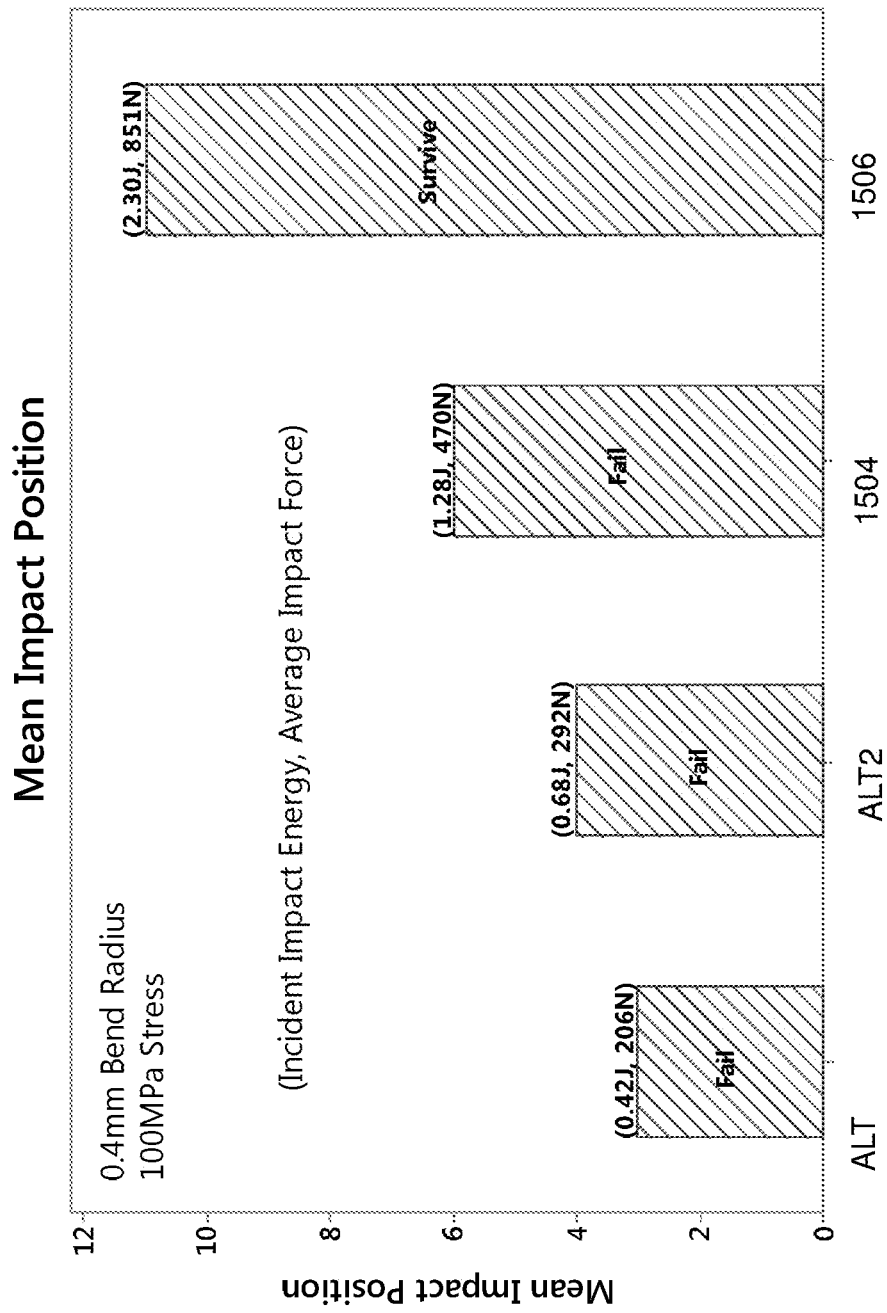
FIG. 36 is a bar graph of mean impact position data obtained on the testing apparatus shown in FIG. 29 for various glass samples.

Referring to FIG. 35, the point 1500 on the graph represents the failure threshold force for an alternative aluminosilicate glass substrate having a thickness of 0.5 mm that was tested on the apparatus shown in FIGS. 29-33. FIG. 35 shows the swing angle as correlated to the average impact force. The alternative aluminosilicate glass had a failure threshold force of about 200 Newtons. Point 1504 is for a 0.5 mm thick glass substrate having a nominal composition of 57.5 mol % $SiO_2$, 16.5 mol % $Al_2O_3$, 16.5 mol % $Na_2O$, 2.8 mol % MgO, 6.5 mol % $P_2O_5$, and 0.05 mol % $SnO_2$. The glass substrate from this test (at point 1504) had a failure threshold of less than 500 Newtons. Data for glass substrates manufactured according to the glass articles claimed herein and made according to Examples 1-64 above and Examples 1-6 below is shown as point 1506 and having an impact force exceeding 800 N. These values are plotted on FIG. 36, along with another chemically strengthened glass, labeled as ALT2. As indicated in FIG. 36, all glass substrates were tested with the pendulum apparatus 1100 described with respect to FIGS. 29-34, with the bend radius at 0.4 mm to impart an externally applied tensile stress by bending on the apex of the glass substrate of 100 MPa.

Figure 37:
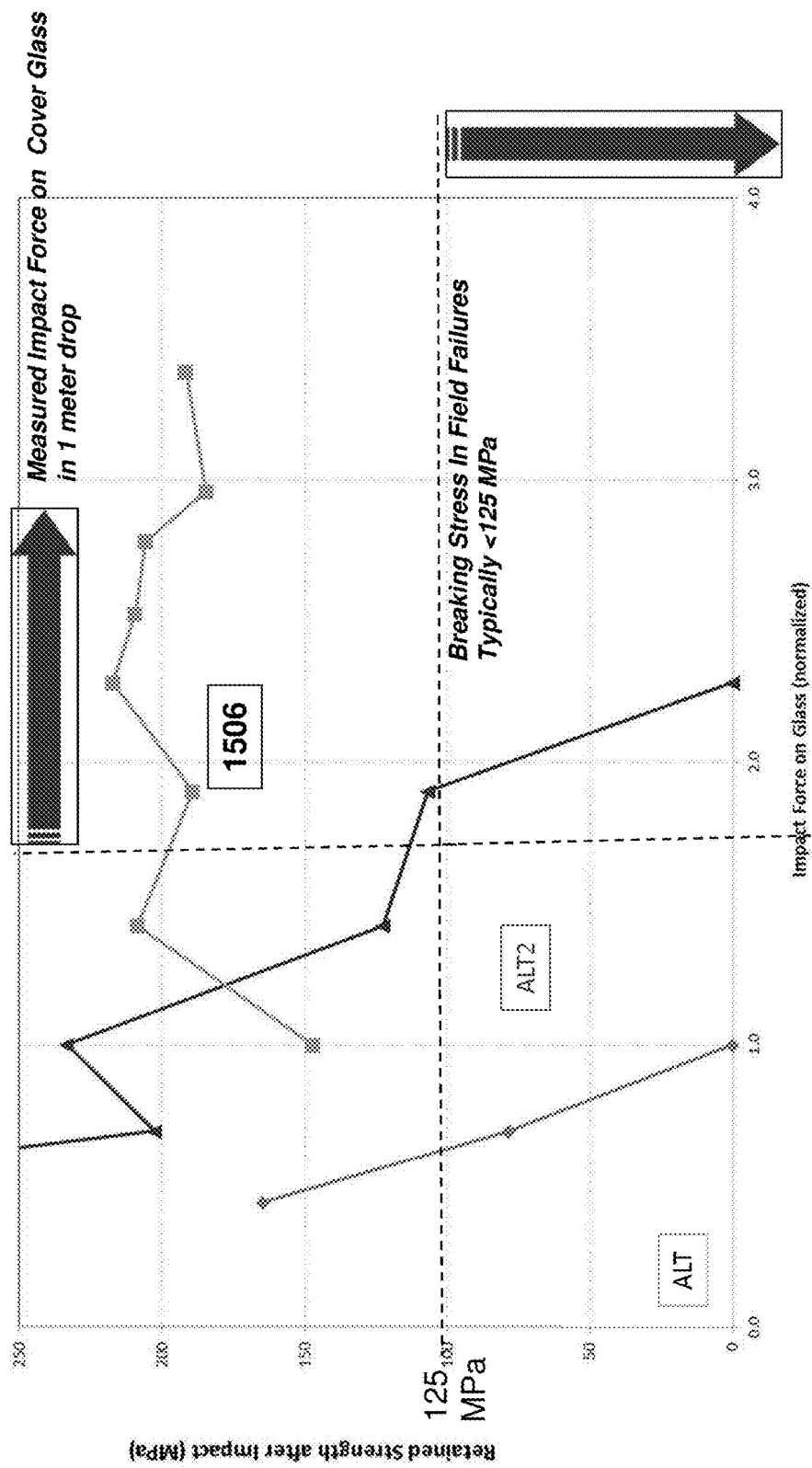
FIG. 37 is a graph showing retained strength values for various samples

After the pendulum apparatus test was conducted on various samples, the samples were tested for strength, which is referred to on FIG. 37 as "Retained Strength", which refers to the strength of the substrate after being impacted by an impact force as specified when the article is bent to impart a tensile stress of 100 MPa. The retained strength values were measured using the four point bend test as described herein. In FIG. 37, the vertical dotted line represents an impact force of 800 N, and the impact forces to test samples were normalized on the x-axis. The ALT (alternative aluminosilicate glass substrates-diamond data points) had the worst retained strength values and could not be tested at the impact force of 800 N, as all parts failed at much lower impact forces. The ALT2 (triangle data points) glass substrates impacted with an impact force of 800 N did not have a retained strength greater than 125 N. However, glass substrates manufactured according to the glass articles claimed herein and made according to Examples 1-64 above and Examples 1-6 below is shown as 1506 (square data points) all had retained strength values exceeding 125 MPa, namely greater than 150 MPa, and some greater than 200 MPa.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

Example 1

Figure 10:
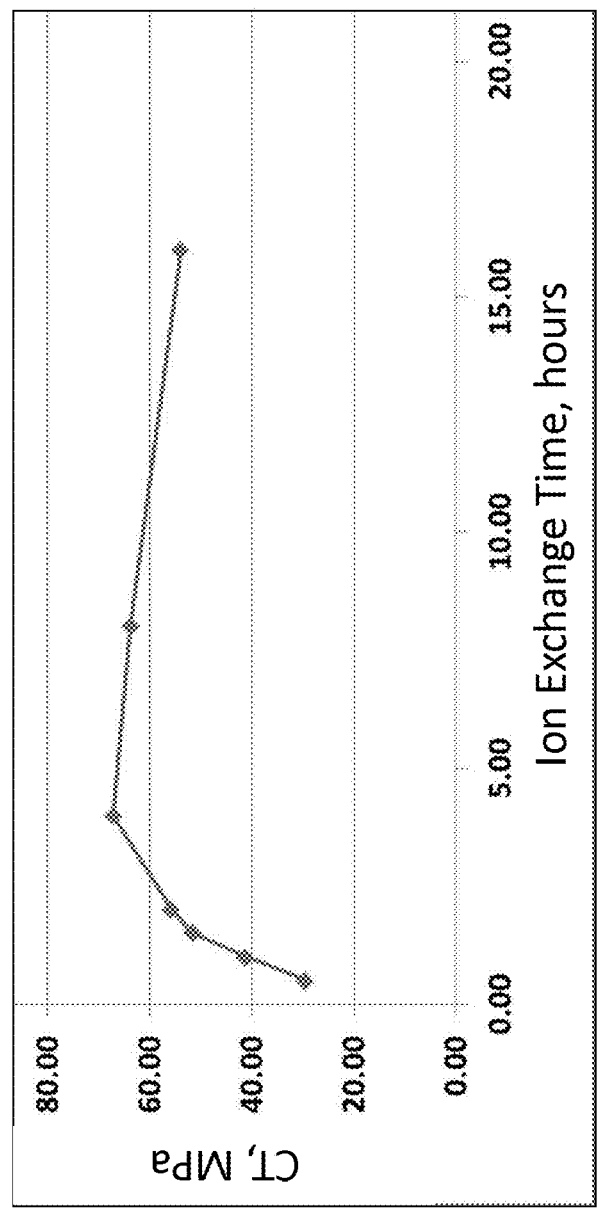
FIG. 10 is a graph showing the maximum CT values for Examples 1A-1G as a function of ion exchange time.

Examples 1A-1G included glass substrates having a nominal composition of about 63.46 mol % $SiO_2$, 15.71 mol % $Al_2O_3$, 6.37 mol % $Li_2O$, 10.69 mol % $Na_2O$, 0.06 mol % MgO, 1.15 mol % ZnO, 2.45 mol % $P_2O_5$, and 0.04 mol % $SnO_2$. The glass substrates had a thickness of 0.8 mm. The glass substrates of Examples 1A-1G were ion exchanged in a molten salt bath including 100% $NaNO_3$ and having a temperature of about 390° C., according to the conditions in Table 2. The resulting glass-based articles exhibited maximum CT values, which are plotted as a function of ion exchange time in FIG. 10.

TABLE 2

Ion exchange conditions for Examples 1A-1G.

| Example | Time immersed in bath (hours) | Maximum CT |
|---------|-------------------------------|------------|
| 1A | 0.5 | 30 |
| 1B | 1 | 42 |
| 1C | 1.5 | 52 |
| 1D | 2 | 56 |
| 1E | 3.75 | 67 |
| 1F | 8 | 63 |
| 1G | 16 | 55 |

Figure 11:
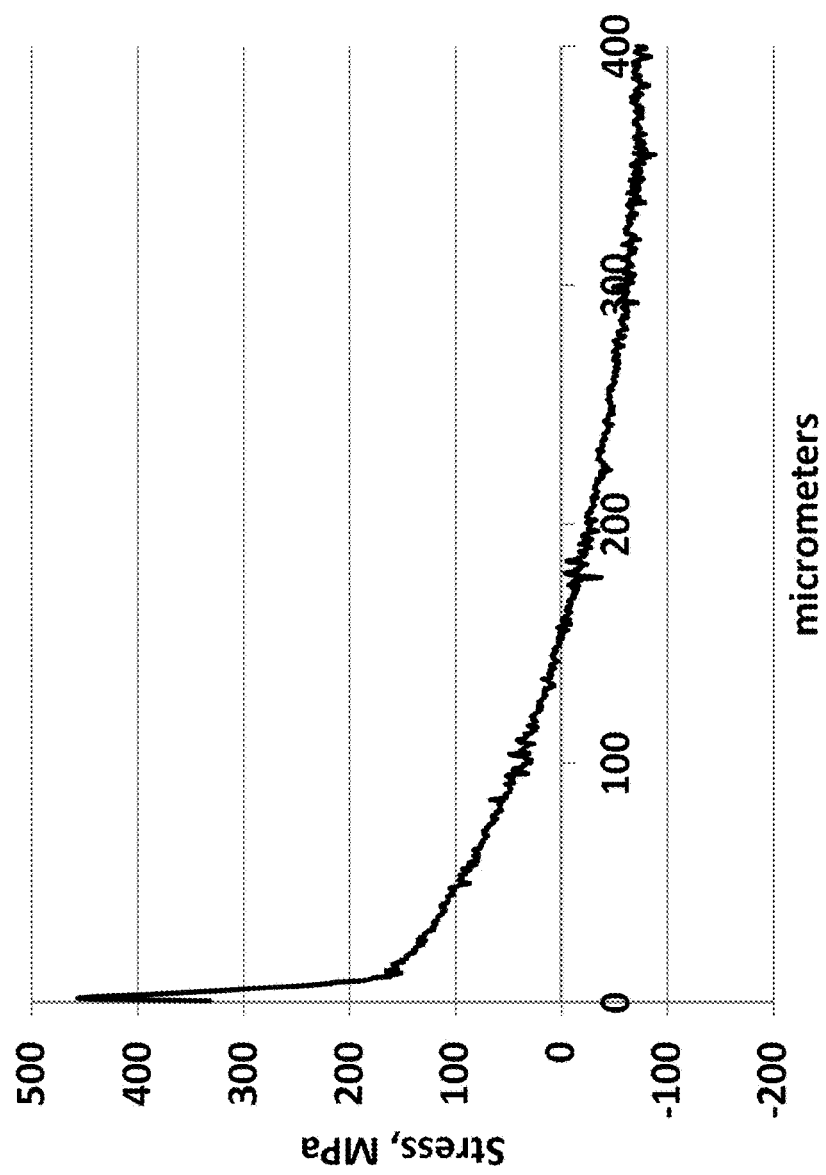
FIG. 11 is a graph showing the measured stress of Example 1E as a function of depth extending from the surface of the glass-based article of Example 1E into the glass-based article.

The stress profile for Example 1E was measured using the RNF method, as described herein. FIG. 11 shows the measured stress as a function of depth extending from the surface of the glass-based article of Example 1E into the glass-based article. The stress at specific depths is shown in Table 3, including at the "knee" which is the depth at which the slope of the stress changes drastically. In FIG. 11, positive numbers are used for compressive stress, and negative numbers indicate tensile stress. This same convention (compressive stress is indicated as positive values on the y axis, and tensile stress is indicated by negative values on the y axis) is used for FIGS. 1-3 also. However, in the remainder of the figures, compressive stress is indicated as negative values on the y axis and tensile stress is indicated as positive values on the y axis.

TABLE 3

Stress at specific depths of Example 1E.

| Depth (micrometers) | Stress (MPa) |
|---------------------|--------------|
| 12 ("knee") | 161 |
| 50 | 95 |
| 100 | 36 |
| 150 | 0 |

Example 2

Example 2A included a glass substrate having the same composition as Example 1 and a thickness of 0.8 mm. The glass substrate was ion exchanged in a single molten salt bath including 51% KNO3 and 49% NaNO3, and having a temperature of about 380° C., for 3.75 hours. The resulting glass-based article exhibited the stress profile as described in Table 4.

TABLE 4

Stress profile of Example 2A.

| | |
|---|---|
| Surface Compressive Stress | 500 MPa |
| Potassium DOL for potassium | 12 micrometers |
| Stress at potassium DOL of potassium | 161 MPa |
| Maximum CT | 70 MPa |
| DOC | 150 micrometers |

Figure 12:
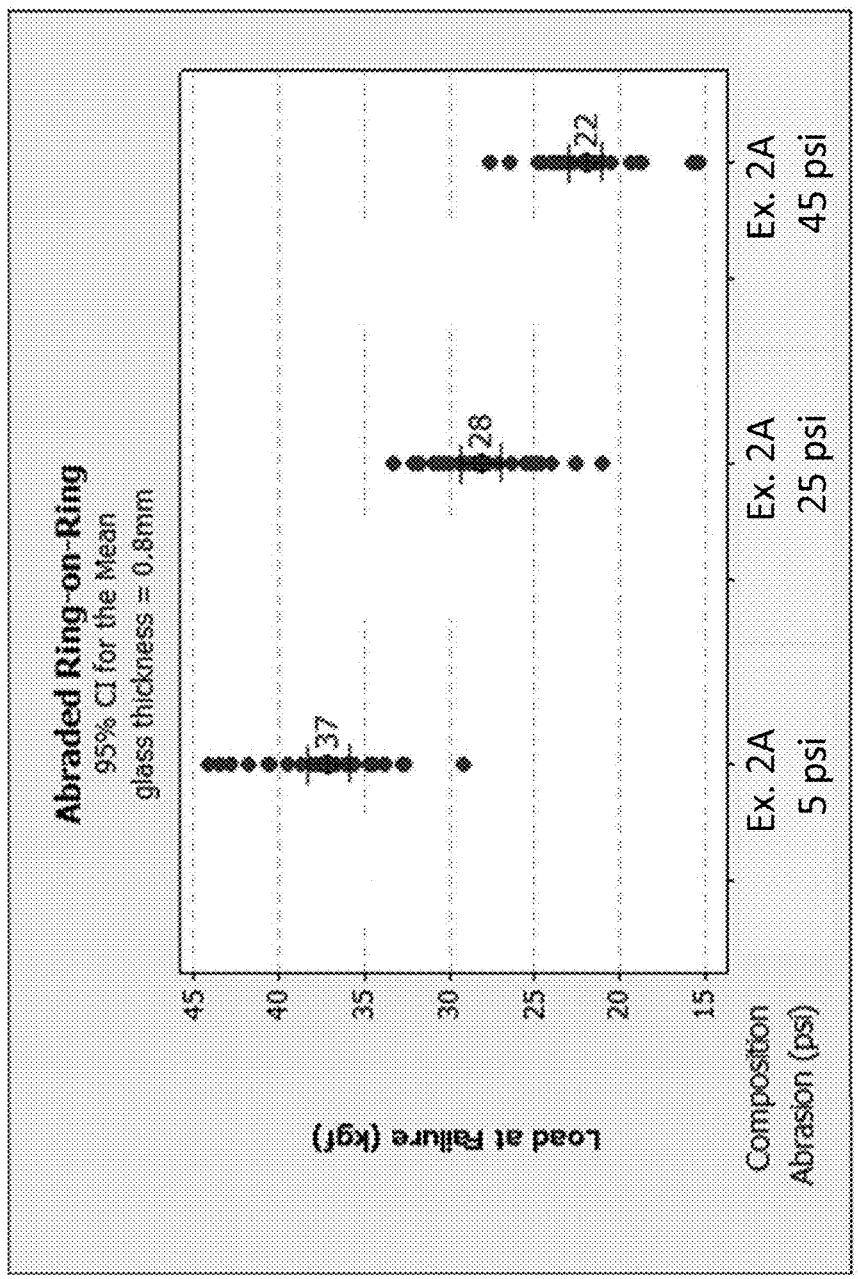
FIG. 12 is a graph showing the load to failure values for glass-based articles according to Example 2A after being abraded at different loads or pressures.
Figure 13:
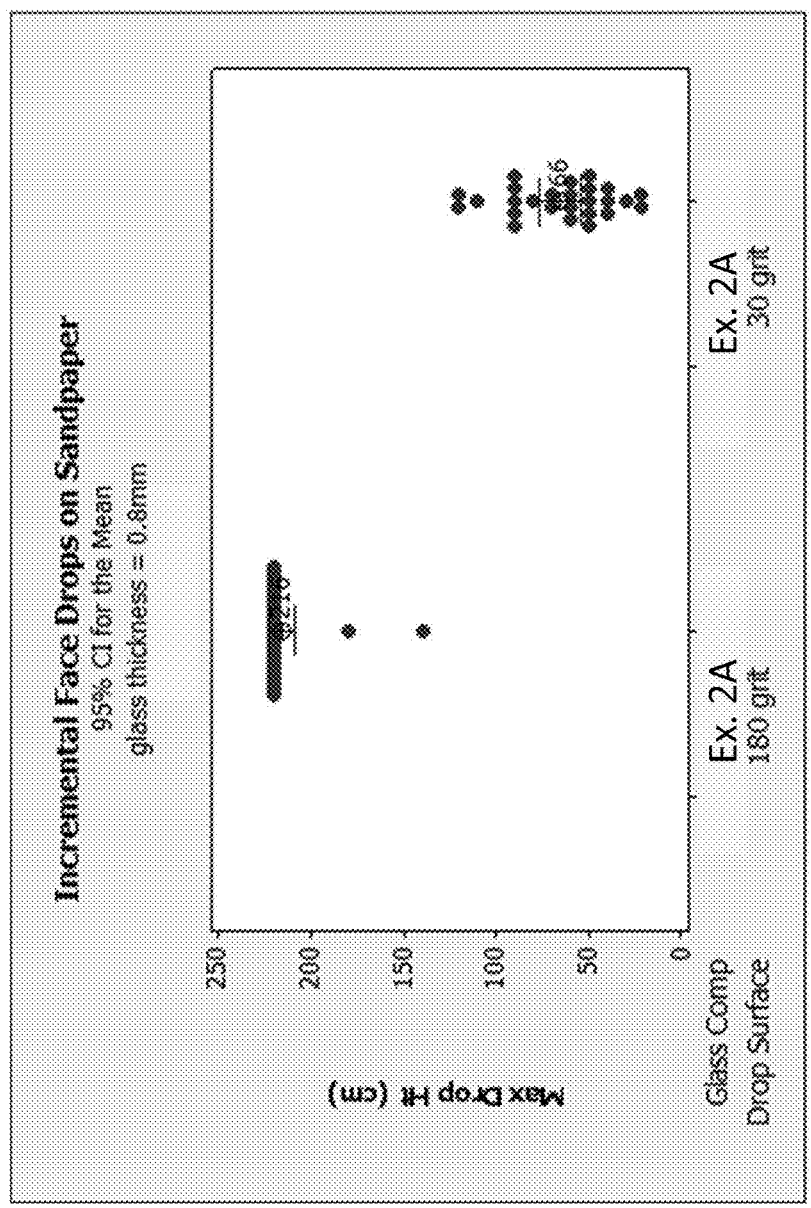
FIG. 13 is a graph showing the heights at which the glass-based articles according to Example 2A failed after being dropped onto 180 grit sandpaper and then onto 30 grit sandpaper.

Glass-based articles according to Example 2A were subjected to AROR testing as described herein. One set of glass-based articles was abraded using a load or pressure of 5 psi, a second set of glass-based articles was abraded using a load or pressure of 25 psi, and a third set of glass-based articles was abraded using a load or pressure of 45 psi. The AROR data is shown in FIG. 12. As shown in FIG. 12, all of the glass-based articles according to Example 2A exhibited an average load to failure of greater than about 20 kgf Glass-based articles according to Example 2A were retrofitted onto identical mobile phone devices. The phone devices were dropped from incremental heights starting at 20 centimeters onto 180 grit sandpaper. If a glass-based article survived the drop from one height (e.g., 20 cm), the mobile phone was dropped again from a greater height (e.g., 30 cm, 40 cm, 50 cm, etc.) up to a height of 225 cm. The surviving glass-based articles were then dropped onto 30 grit sandpaper (in the same phone devices). The height at which the glass-based article failed on both 180 grit sandpaper and 30 grit sandpaper is plotted in FIG. 13. As shown in FIG. 13, all but two glass-based articles of Example 2A survived being dropped onto 180 grit sandpaper up to heights of about 225 cm (providing an average survival drop height of about 216 cm). The average survival drop height onto 30 grit sandpaper was 66 cm, with some surviving over 100 cm drop heights.

The glass based articles according to Example 2A exhibited a dielectric constant of about 6.9 to about 7.05 over a frequency range from about 480 mHz to about 3000 mHz. The glass-based articles according to Example 2A exhibited a dielectric loss tangent in the range from about 0.012 to about 0.015 over a frequency range from about 480 mHz to about 3000 mHz.

The refractive index of the glass-based articles according to Example 2A is in the range from about 1.49 to about 1.518 over a range from about 380 nm to about 1550 nm, and from about 1.497 to about 1.518 over a wavelength range from about 380 nm to about 800 nm.

The glass-based articles according to Example 2A were subjected to various chemical treatments as shown in Table 5. The chemical durability of the glass-based articles was compared to Comparative Examples 2B, 2C and 2D. Comparative Example 2B was a glass substrate having a nominal composition of 64.3 mol % $SiO_2$, 7.02 mol % $B_2O_3$, 14 mol % $Al_2O_3$, 14 mol % $Na_2O$, 0.5 mol % $K_2O$, 0.03 mol % $Fe_2O_3$, and 0.1 mol % $SnO_2$. Comparative Example 2C was a glass substrate having a nominal composition of 64.75 mol % $SiO_2$, 5 mol % $B_2O_3$, 14 mol % $Al_2O_3$, 13.75 mol % $Na_2O$, 2.4 mol % MgO, and 0.08 mol % $SnO_2$. Comparative Example 2D included a glass substrate having a nominal composition of 57.5 mol % $SiO_2$, 16.5 mol % $Al_2O_3$, 16.71 mol % $Na_2O$, 2.8 mol % MgO, 0.05 mol % $SnO_2$ and 6.5 mol % $P_2O_5$.

TABLE 5

Chemical durability of Example 2A and Comparative Examples 2B, 2C, and 2D.

| | Weight loss (mg/cm2) | | | |
|---|---|---|---|---|
| Chemical Treatment | Comparative Example 2B | Comparative Example 2C | Comparative Example 2D | Example 2A |
| 5% w/w HCl, 95° C., 24 hours | 29.3 | 6.7 | 50 | 5.77 |
| 5% w/w NaOH, 95° C., 6 hours | 2.8 | 2.4 | 5.8 | 2.68 |
| 10% HF, room temperature, 20 minutes | 20.8 | 18.1 | 37.4 | 24.03 |
| 10% ammonium bifluoride (ABF), room temperature, 20 minutes | 2 | 2.7 | 3.2 | 0.98 |

Example 3

Example 3A included glass substrates having the same composition as Example 1 and a thickness of 0.8 mm. Comparative Example 3B included glass substrates having the same composition as Comparative Example 2D and a thickness of 0.8 mm. The glass substrates of Example 3A were chemically strengthened in a single step using a single bath, as described in Table 6. The glass substrates of Comparative Example 3B was ion exchanged in a two-step process as described in Table 6

TABLE 6

Ion exchange conditions for Example 3A and Comparative Example 3B.

| | | Example 3A | Comparative Example 3B |
|---|---|---|---|
| 1$^{st}$ Step | Molten salt bath composition | 49% NaNO3/ 51% KNO3 | 49% NaNO3/ 51% KNO3 |
| | Bath Temperature | 380° C. | 460° C. |
| | Immersion time | 3.75 hours | 14 hours |
| 2$^{nd}$ Step | Molten salt bath composition | — | 99.5% KNO3/ 0.5% NaNO3 |
| | Bath Temperature | — | 390° C. |
| | Immersion time | — | 0.25 hours |
| Properties of resulting glass article | Surface CS | 500 MPa | 825 MPa |
| | Potassium DOL | 12 micrometers | 10 micrometers |
| | Stress at potassium DOL | 160 MPa | 220 MPa |
| | DOC | 150 micrometers | 100 micrometers |

Figure 14:
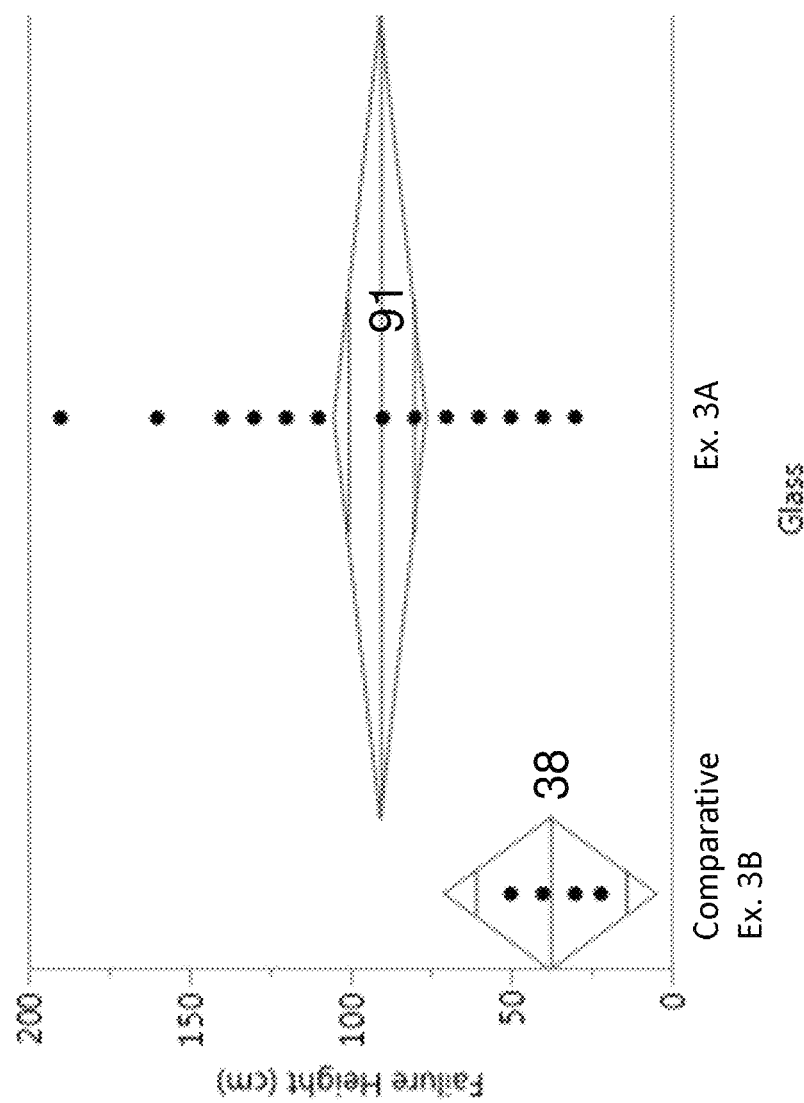
FIG. 14 is a graph showing the heights at which the glass-based articles according to Example 3A and Comparative Example 3B failed after being dropped onto 30 grit sandpaper.

The glass-based articles according to Example 3A and Comparative Example 3B were retrofitted onto identical mobile phone devices. The phone devices were dropped from incremental heights starting at 20 centimeters onto 30 grit sandpaper. The height at which the glass-based article failed on 30 grit sandpaper is plotted in FIG. 14. As shown in FIG. 14, the glass-based articles of Example 3A exhibited an average survival drop height that is more than two times (i.e., 91 cm) the average survival drop height of Comparative Example 3B (i.e., 38 cm).

Figure 15:
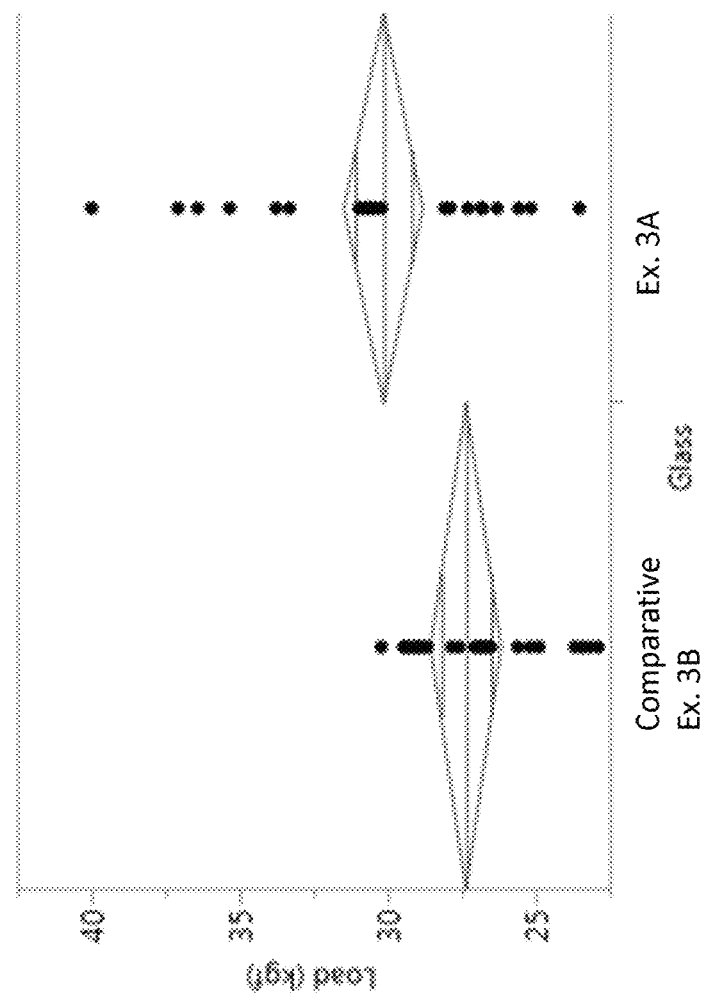
FIG. 15 is a graph comparing the average load to failure of glass-based articles according to Example 3A and Comparative Example 3B, after being abraded at a load or pressure of 25 psi.
Figure 16:
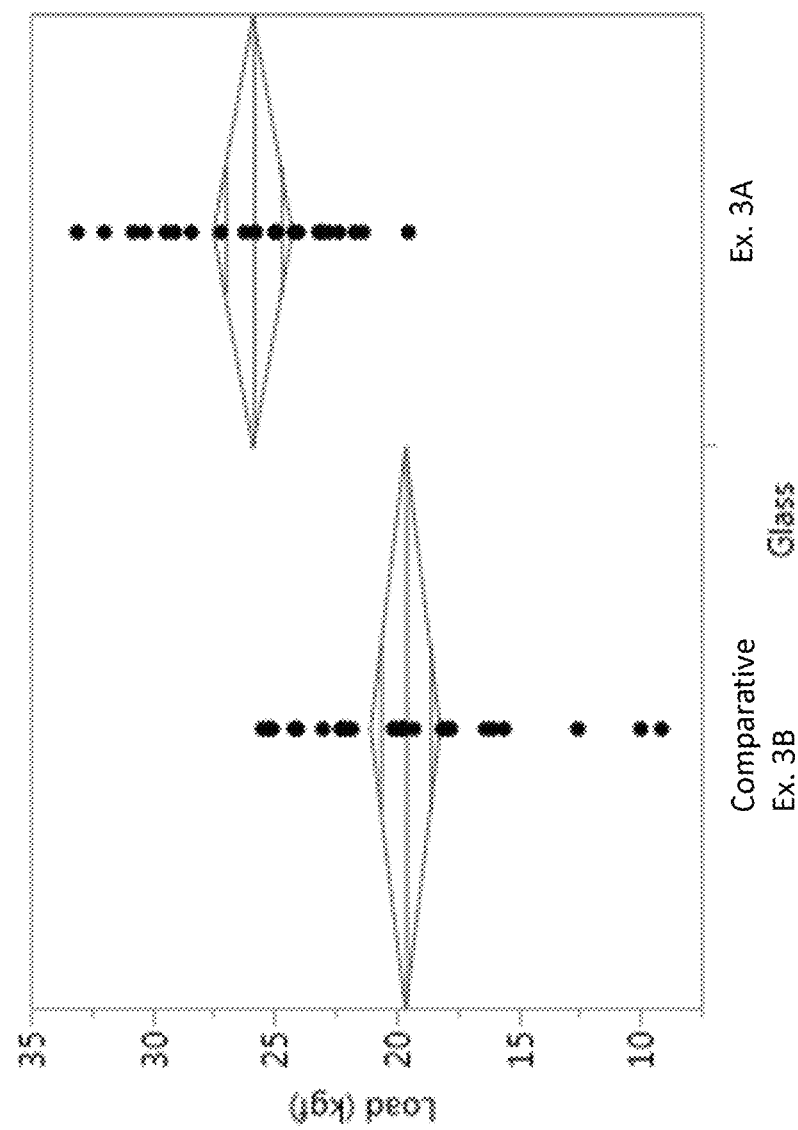
FIG. 16 is a graph comparing the average load to failure of glass-based articles according to Example 3A and Comparative Example 3B, after being abraded at a load or pressure of 45 psi.
Figure 17:
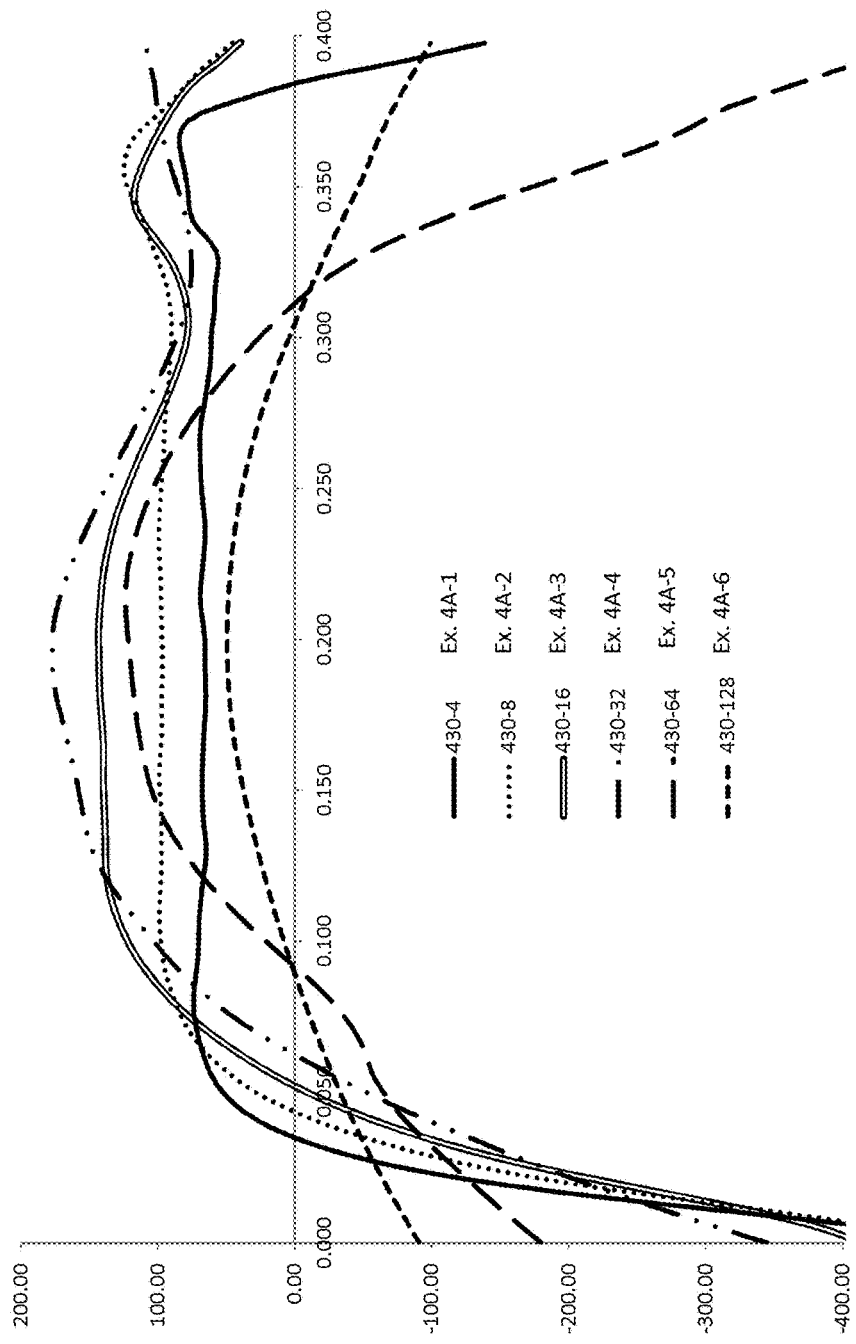
FIG. 17 is a graph showing the stress profiles of Examples 4A-1 through 4A-6 as a function of depth.
Figure 18:
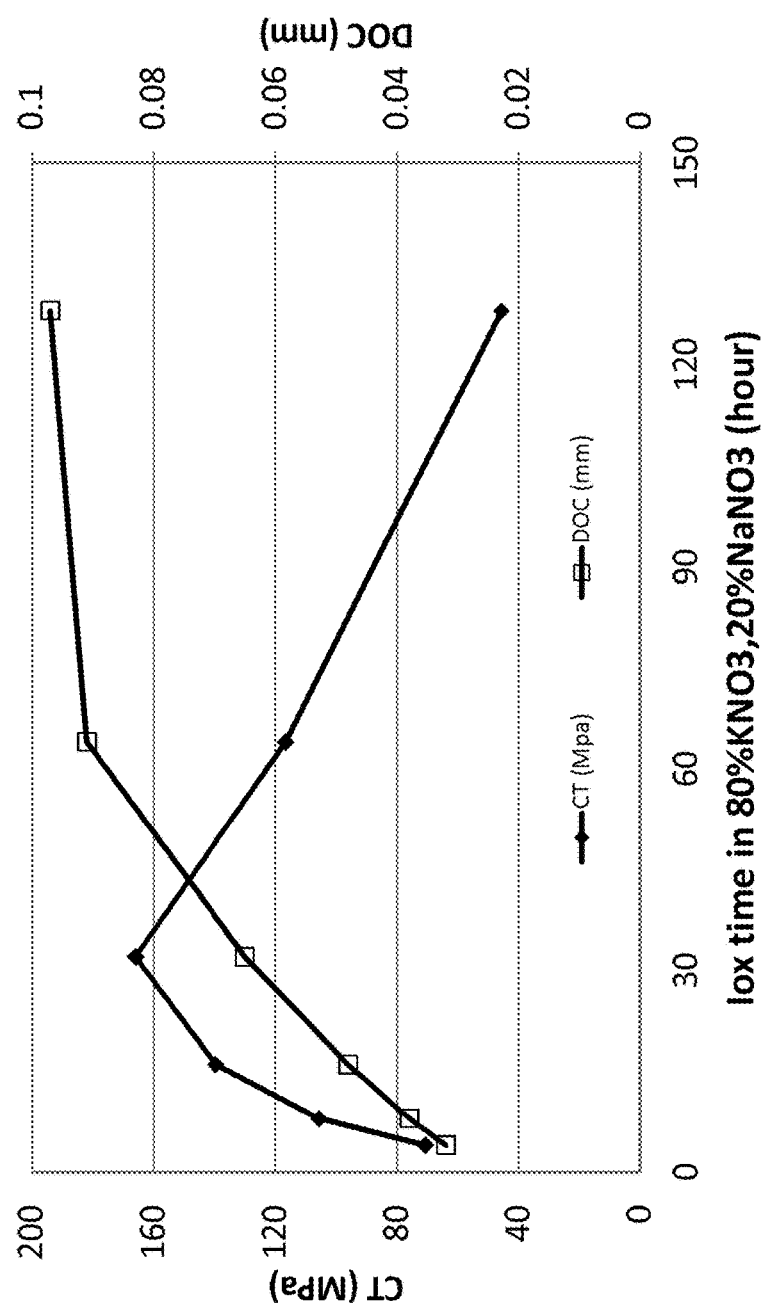
FIG. 18 is a graph showing the maximum CT and DOC values of Examples 4A-1 through 4A-6 as a function of ion exchange time.
Figure 19:
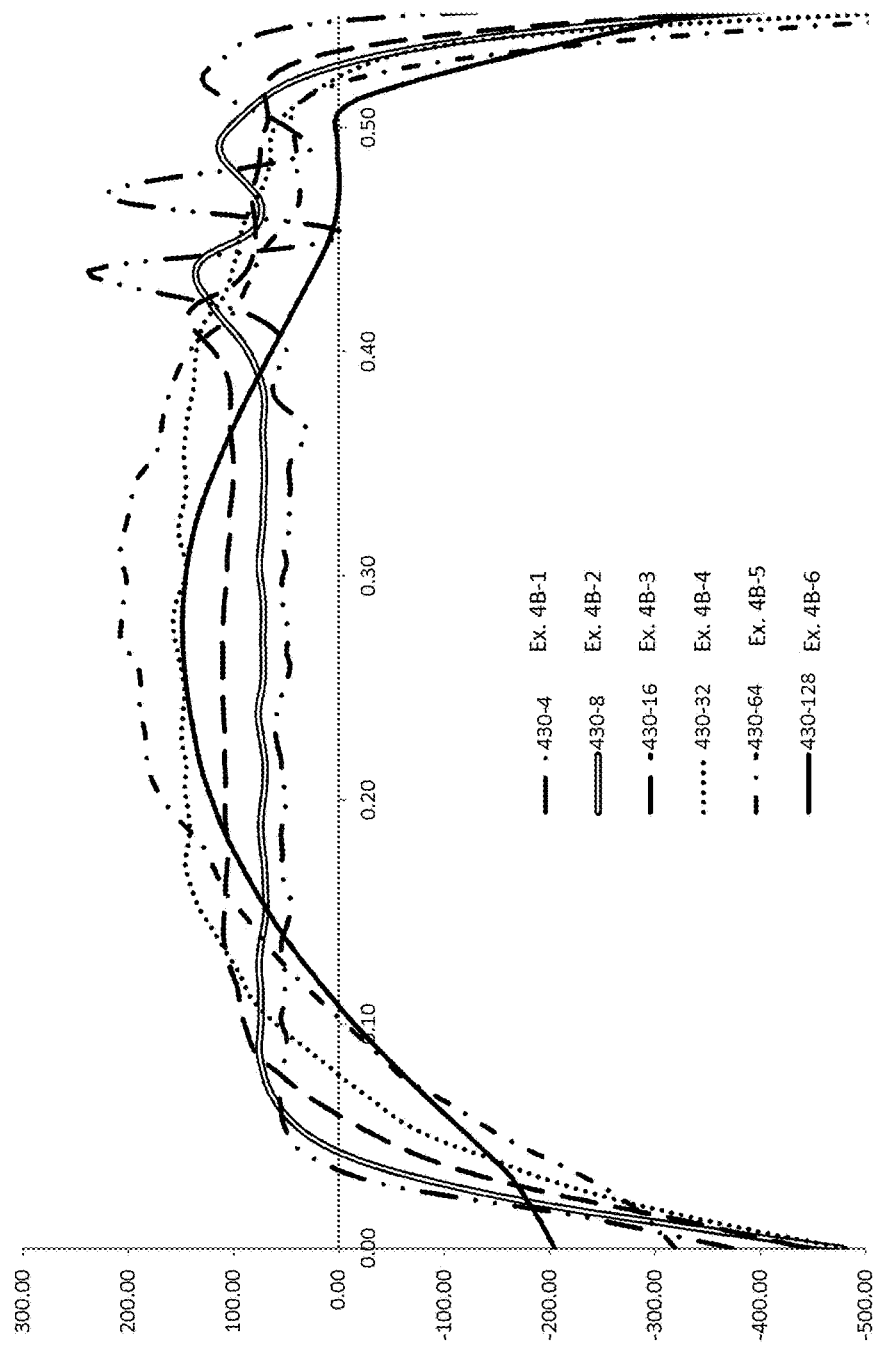
FIG. 19 is a graph showing the stress profiles of Examples 4B-1 through 4B-6 as a function of depth.
Figure 20:
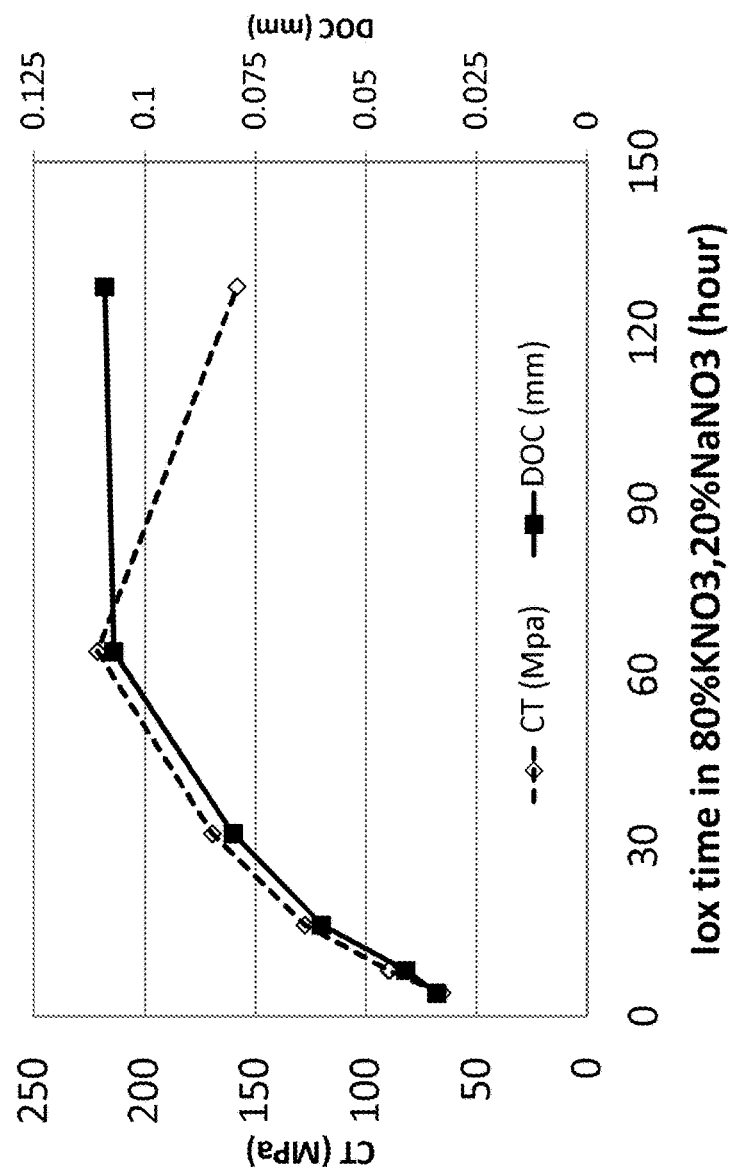
FIG. 20 is a graph showing the maximum CT and DOC values of Examples 4B-1 through 4B-6 as a function of ion exchange time.
Figure 21:
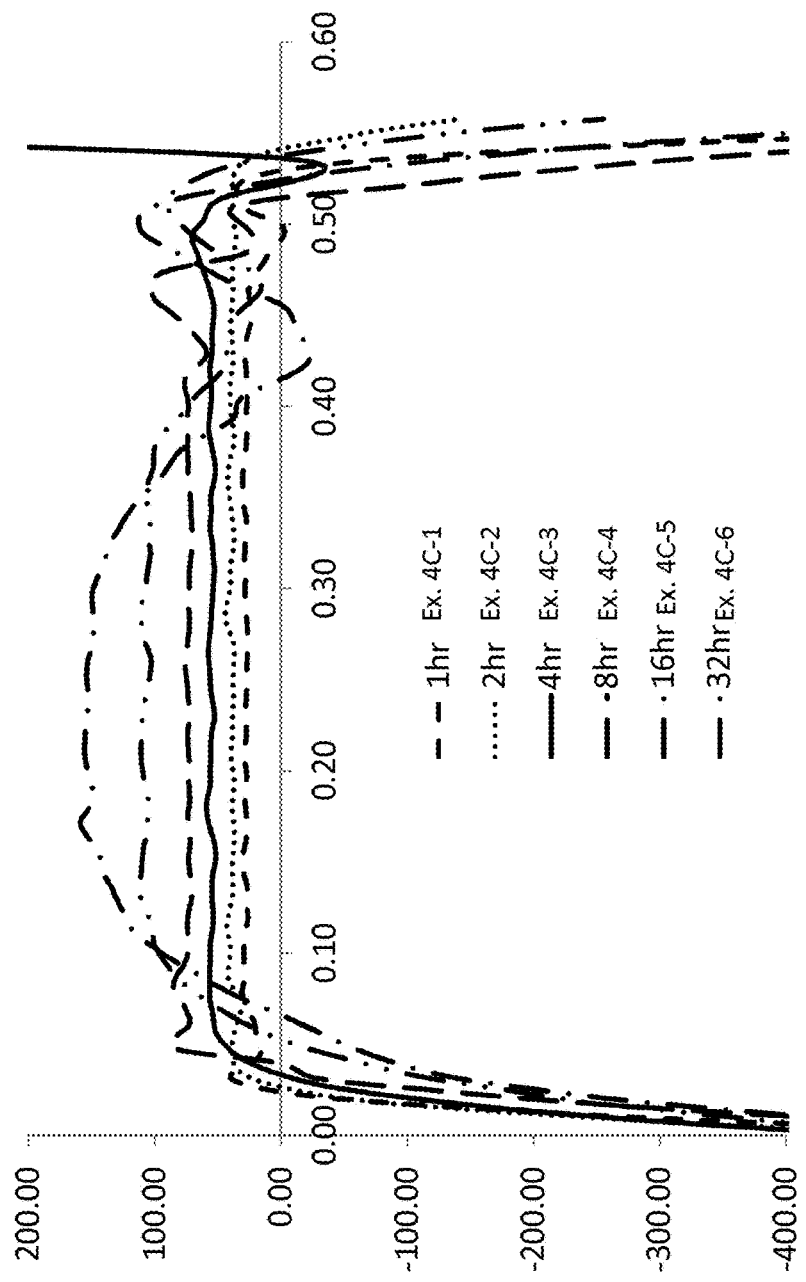
FIG. 21 is a graph showing the stress profiles of Examples 4C-1 through 4C-6 as a function of depth.
Figure 22:
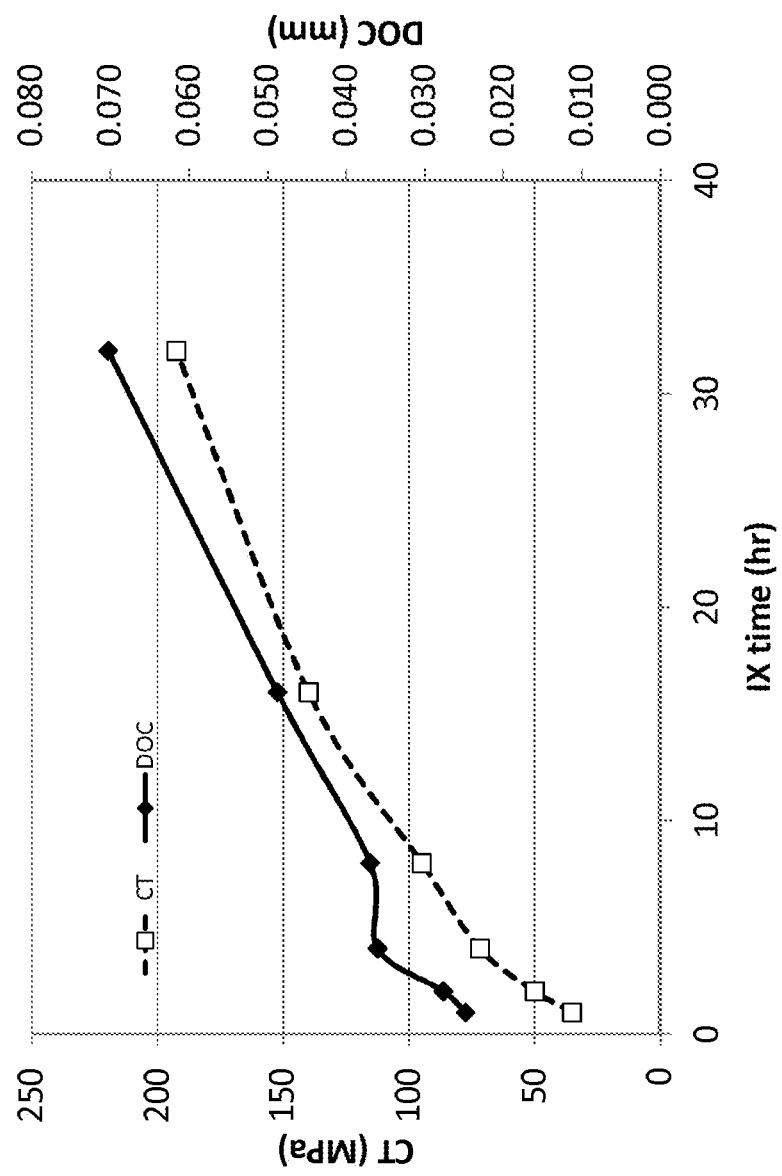
FIG. 22 is a graph showing the maximum CT and DOC values of Examples 4C-1 through 4C-6 as a function of ion exchange time.
Figure 23:
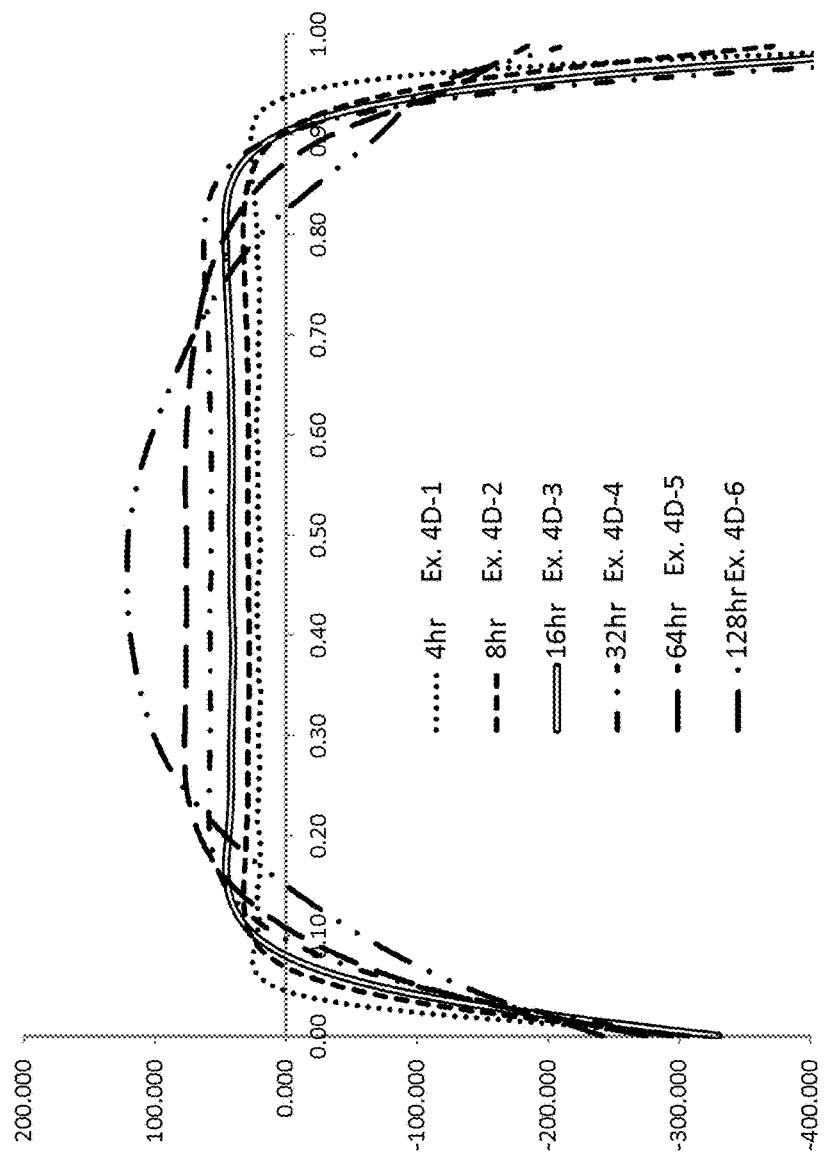
FIG. 23 is a graph showing the stress profiles of Examples 4D-1 through 4D-6 as a function of depth.
Figure 24:
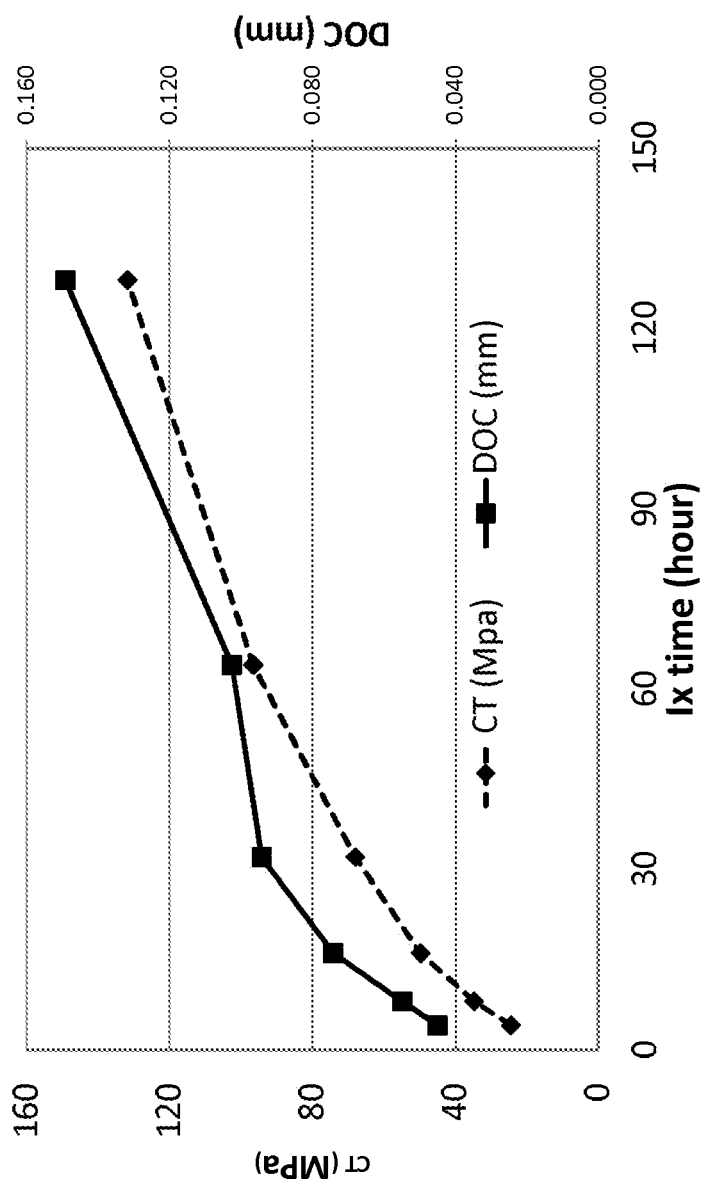
FIG. 24 is a graph showing the maximum CT and DOC values of Examples 4D-1 through 4D-6 as a function of ion exchange time.

Glass-based articles according to Example 3A and Comparative Example 3B were subjected to AROR testing, as described herein, using a load or pressure of 25 psi. The glass-based substrates of Example 3A exhibited an average load to failure of about 30 kgf, while the glass-based substrates of Comparative Example 3B exhibited an average load to failure of about 27 kgf, as shown in FIG. 15. When the abrasion load or pressure was increased to 45 psi, the difference in average load to failure for Example 3A and Comparative Example 3B increased. Specifically, under a 45 psi load or pressure, Example 3A exhibited an average load to failure of about 25.9 kgf, while Comparative Example 3B exhibited an average load to failure of about 19.6 kgf, as shown in FIG. 16.

Example 4

Glass substrates having a nominal composition of 57.5 mol % $SiO_2$, 16.5 mol % $Al_2O_3$, 16.7 mol % $Na_2O$, 2.5 mol % MgO, and 6.5 mol % $P_2O_5$, and having a thicknesses of about 0.4 mm, 0.55 mm, or 1 mm were subjected to chemical strengthening. The thicknesses and conditions of chemical strengthening are shown in Table 7.

TABLE 7

Thickness and chemical strengthening conditions for Examples 4A-4D.

| Ex. | Thickness | Bath Composition | Bath Temperature |
|---|---|---|---|
| 4A | 0.4 mm | 80% KNO3, 20% NaNO3 | 430° C. |
| 4B | 0.55 mm | 80% KNO$_3$, 20% NaNO$_3$ | 430° C. |
| 4C | 0.55 mm | 90% KNO$_3$, 10% NaNO$_3$ | 430° C. |
| 4D | 1.0 mm | 70% KNO$_3$, 30% NaNO$_3$ | 430° C. |

Example 4A was immersed in a molten salt bath, as indicted in Table 7, for 4 hours, 8 hours, 16 hours, 32 hours, 64 hours and 128 hours (Examples 4A-1 through 4A-6). Example 4B was immersed in a molten salt bath, as indicated in Table 7, for 4 hours, 8 hours, 16 hours, 32 hours, 64 hours and 128 hours (Examples 4B-1 through 4B-6). Example 4C was immersed in a molten salt bath, as indicated in Table 7, for 1 hour, 2 hours, 4 hours, 8 hours, 16 hours and 32 hours (Examples 4C-1 through 4C-6). Example 4D was immersed in a molten salt bath, as indicated in Table 7, for 4 hours, 8 hours, 16 hours, 32 hours, 64 hours and 128 hours (Examples 4D-1 through 4D-6). The stress profiles of Examples 4A-1 through 4A-6, 4B-1 through 4B-6, 6C-1 through 4C-6, and 4D-1 through 4D-6 are shown in FIGS. 17, 19, 21 and 23, respectively. In FIGS. 17, 19, 21 and 23, the depth or thickness of the glass articles is plotted on the x-axis and stress is plotted on the y-axis. The positive stress values are CT values and the negative stress values are the CS values.

The CT and DOC values as a function of time immersed in the molten salt bath for Examples 4A-1 through 4A-6, Examples 4B-1 through 4B-6, Examples 4C-1 through 4C-6 and 4D-1 through 4D-6, are shown in FIGS. 18, 20, 22, and 24, respectively.

Example 5

Glass substrates having a nominal composition as shown in Table 8 and having a thicknesses of about 0.8 mm each were subjected to chemical strengthening in a molten salt bath including a mixture of $NaNO_3$ and $NaSO_4$ and a temperature of 500° C. for 15 minutes (Comparative Example 8A) and for 16 hours (Example 8B).

TABLE 8

Composition of the glass substrate of Example 5, prior to chemical strengthening.

| Example = ▼<br>Oxide [mole %] | 5 |
|---|---|
| SiO$_2$ | 69.2 |
| Al2O$_3$ | 12.6 |
| B$_2$O$_3$ | 1.8 |
| Li$_2$O | 7.7 |
| Na$_2$O | 0.4 |
| MgO | 2.9 |
| ZnO | 1.7 |
| TiO$_2$ | 3.5 |
| SnO$_2$ | 0.1 |
| $\frac{[Li_2O + Na_2O + MgO + ZnO + K_2O]}{[Al_2O_3 + B_2O_3]}$ | $\frac{12.7}{14.4} = 0.88$ |
| $\frac{[TiO_2 + SnO_2]}{[SiO_2 + B_2O_3]}$ | $\frac{2.6}{71} = 0.051$ |

Figure 25:
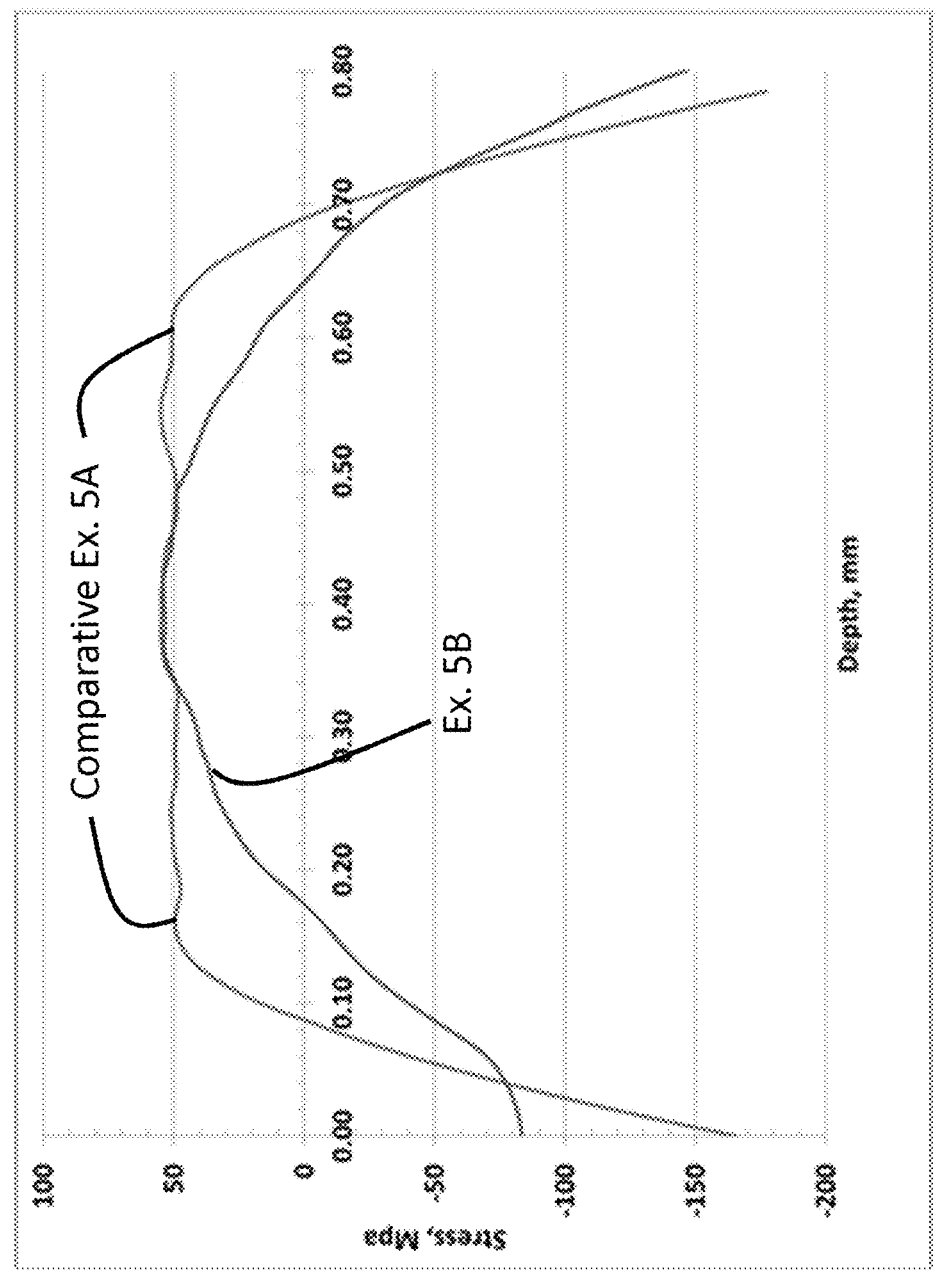
FIG. 25 is a graph showing the stress profiles of Comparative Example 5A and Example 5B as a function of depth.

The stress profile of the glass-based articles of Examples 5A and 5B are shown in FIG. 25. A shown in FIG. 25, Comparative Example 5A exhibited a known stress profile, whereas, Example 5B showed a stress profile according to one or more embodiments of this disclosure. The stored tensile energy of the glass-based articles of Examples 5A and 5B was calculated from the measured SCALP stress profile data and using equation (2) above. The calculated stored tensile energy is plotted as a function of measured CT (MPa), as shown in FIG. 26.

Figure 26:
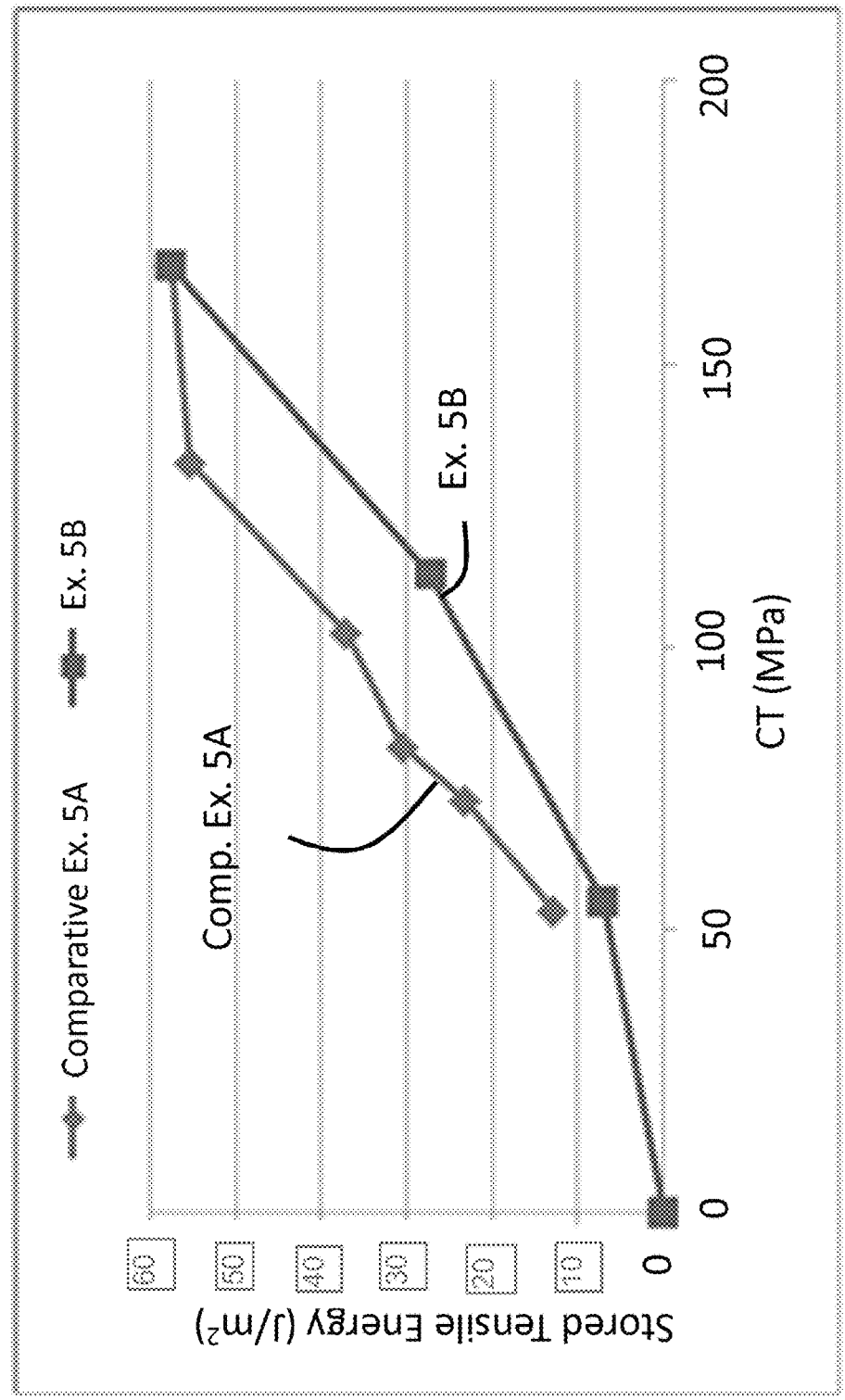
FIG. 26 is a graph showing the stored tensile energy of Comparative Example 5A and Example 5B as a function of maximum CT.

As shown in FIG. 26, Comparative 5A exhibited much greater stored tensile energy values for a given CT value than Example 5B (for the same CT value). In this figure, CT is the maximum CT in the sample. Specifically, at a CT of about 55 MPa, Comparative Example 5A exhibited a stored tensile energy of about 6.5 J/m$^2$, whereas Example 5B exhibited a stored tensile energy of about 3.5 J/m$^2$. Comparative Example 5A and Example 5B were fractured and Example 5B fractured into fewer pieces than Comparative Example 5A, which fractured into a significantly greater number of pieces. Accordingly, without being bound by theory, it is believed that controlling the stored tensile energy may provide a way to control or predict fragmentation patterns or the number of fragments that result from fracture. In these examples, the CT was varied by keeping a sample in the ion exchange bath for a longer period of time while using the same bath temperature and composition. In FIG. 26, the point 0,0 was not experimental, but is would one of ordinary skill in the art would expect to be the case, i.e., when there is 0 CT, there will be 0 stored tensile energy.

Glass substrates having a nominal composition as shown in Table 8 and having a thicknesses of about 1 mm each were subjected to chemical strengthening in a molten salt bath including $NaNO_3$ and a temperature of 430° C. for 4 hours (Comparative Example 5C) and for 61.5 hours (Example 5D). Comparative Example 5C exhibited a known stress profile, whereas, Example 5D showed a stress profile according to one or more embodiments of this disclosure. The stored tensile energy of Examples 5C and 5D was calculated using the same method used with Examples 5A-5B and plotted as a function of measured CT (MPa), as shown in FIG. 27.

Figure 27:
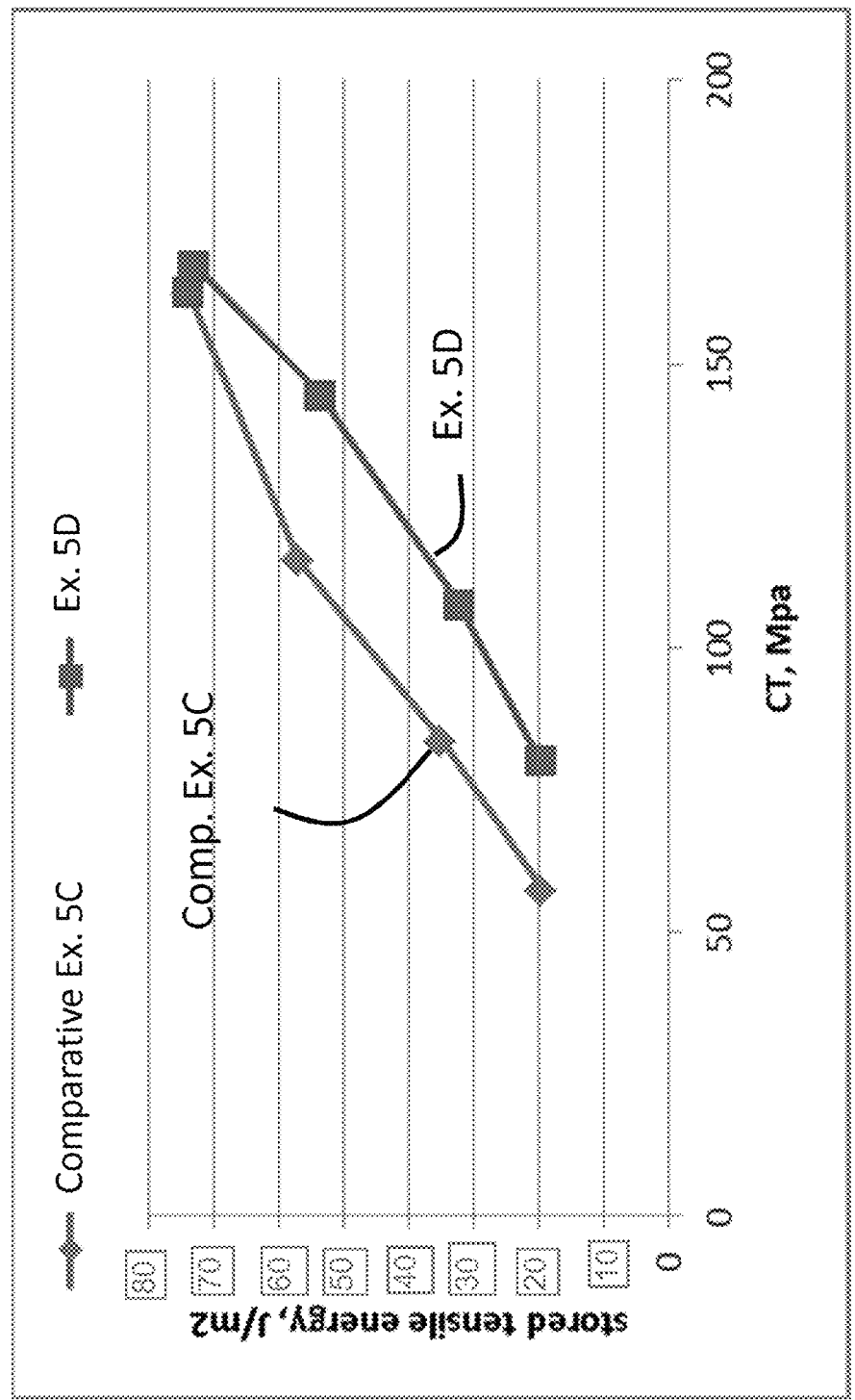
FIG. 27 is a graph showing stored tensile energy of Comparative Example 5C and Example 5D as a function of maximum CT.

As shown in FIG. 27, Comparative 5C exhibited much greater stored tensile energy values for a given CT (again, as with FIG. 27, these are maximum CT values, and again the values were varied by using the same ion exchange bath temperature and composition, but with longer periods of time) value than Example 5D (for the same CT value). Comparative Example 5C and Example 5D were fractured and Example 5D fractured into fewer pieces than Comparative Example 5C, which fractured into a significantly greater number of pieces.

Example 6

Table 9 lists exemplary compositions (Examples 6A-6J) of the glass substrates described herein. Table 10 lists selected physical properties determined for the examples listed in Table 9. The physical properties listed in Table 10 include: density; CTE; strain, anneal and softening points; liquidus temperature; liquidus viscosity; Young's modulus; refractive index, and stress optical coefficient.

TABLE 9

Examples of alkali aluminosilicate glass compositions.

| Composition (mol %) | Ex. 6A | Ex. 6B | Ex. 6C | Ex. 6D | Ex. 6E | Ex. 6F | Ex. 6G |
|---|---|---|---|---|---|---|---|
| $Al_2O_3$ | 16.67 | 16.73 | 16.70 | 16.73 | 16.17 | 16.13 | 15.73 |
| $B_2O_3$ | | | | | | | |
| $Cs_2O$ | | | | 0.46 | | | |
| $Li_2O$ | 7.46 | 7.41 | 7.30 | 7.42 | 7.45 | 7.54 | 7.45 |
| $Na_2O$ | 8.75 | 8.28 | 7.77 | 7.85 | 8.30 | 7.76 | 8.77 |
| $P_2O_5$ | 3.46 | 3.95 | 3.94 | 3.92 | 3.45 | 3.94 | 3.38 |
| $SiO_2$ | 63.62 | 63.58 | 64.24 | 63.56 | 63.61 | 63.61 | 63.71 |
| $SnO_2$ | 0.05 | 0.05 | 0.05 | 0.05 | 0.05 | 0.05 | |
| ZnO | | | | | 0.98 | 0.97 | 0.96 |
| $R_2O$ | 16.21 | 15.69 | 15.07 | 15.27 | 15.75 | 15.30 | 16.22 |
| $B_2O_3 + P_2O_5 + SiO_2 + Al_2O_3$ | 83.74 | 84.26 | 84.88 | 84.22 | 83.23 | 83.68 | 82.82 |

| Composition (mol %) | Ex. 6H | Ex. 6I | Ex. 6J |
|---|---|---|---|
| $Al_2O_3$ | 15.65 | 16.68 | 16.66 |
| $B_2O_3$ | | | |
| $Cs_2O$ | | | |
| $Li_2O$ | 7.47 | 9.99 | 12.38 |
| $Na_2O$ | 8.27 | 7.32 | 4.84 |
| $P_2O_5$ | 3.91 | 2.45 | 2.44 |
| $SiO_2$ | 63.67 | 63.50 | 63.63 |
| $SnO_2$ | 0.05 | 0.05 | 0.05 |
| ZnO | 0.98 | | |
| R2O | 15.74 | 17.31 | 17.22 |
| $B_2O_3 + P_2O_5 + SiO_2 + Al_2O_3$ | 83.23 | 82.64 | 82.73 |

TABLE 10

Selected physical properties of the glasses listed in Table 9.

| | Ex. 6A | Ex. 6B | Ex. 6C | Ex. 6D | Ex. 6E | Ex. 6F | Ex. 6G |
|---|---|---|---|---|---|---|---|
| Fulchers A | −3.933 | −3.681 | −3.994 | −4.132 | −4.049 | −3.657 | −4.147 |
| Fulchers B | 10000.7 | 9453.7 | 10199.7 | 10556.7 | 10414.5 | 9531.9 | 10785.5 |
| Fulchers To | 50.4 | 85.5 | 41.3 | 22.6 | −0.8 | 50.1 | −38.5 |
| 200 P Temperature (° C.) | 1655 | 1666 | 1662 | 1664 | 1639 | 1650 | 1634 |
| 35000 P Temperature (° C.) | 1230 | 1235 | 1236 | 1239 | 1211 | 1212 | 1202 |
| 200000 P Temperature (° C.) | 1133 | 1138 | 1139 | 1142 | 1113 | 1114 | 1103 |
| Density (g/cm³) | 2.396 | 2.389 | 2.389 | 2.413 | 2.413 | 2.406 | 2.415 |
| CTE 25-300° C. (ppm/° C.) | 73.9 | 71.7 | 72.5 | 72.8 | 71.5 | 69 | 74.7 |

TABLE 10-continued

Selected physical properties of the glasses listed in Table 9.

| Strain pt. (° C.) | 606 | 605 | 604 | 605 | 587 | 589 | 578 |
| Anneal pt. (° C.) | 661 | 662 | 661 | 661 | 642 | 644 | 631 |
| Softening pt. (° C.) | 926.4 | 931.7 | 930.3 | 935.1 | 908.6 | 912.3 | 898.4 |
| Liquidus temperature (° C.) | 1080 | 1095 | 1090 | 1095 | 1080 | 1100 | 1055 |

|  | Ex. 6A | Ex. 6B | Ex. 6C | Ex. 6D | Ex. 6E | Ex. 6F | Ex. 6G |
| --- | --- | --- | --- | --- | --- | --- | --- |
| Liquidus viscosity (P) | 602823 | 482764 | 539563 | 515222 | 386294 | 264159 | 520335 |
| Stress optical coefficient (nm/mm/MPa) | 30.04 | 30.43 | 30.43 | 30.4 | 30.51 | 3.083 | 30.34 |
| Refractive index at 589.3 nm | 1.5016 | 1.5003 | 1.5003 | 1.5010 | 1.5037 | 1.5021 | 1.5035 |
| Young's modulus (GPa) | 75.84 | 75.57 | 75.70 | 75.15 | 76.67 | 75.77 | 76.12 |

|  | Ex. 6H | Ex. 6I | Ex. 6J |
| --- | --- | --- | --- |
| Fulchers A | −3.649 | −3.231 | −2.918 |
| Fulchers B | 9623.9 | 8275.1 | 7331.7 |
| Fulchers To | 33.9 | 126.8 | 188.3 |
| 200 P Temperature (° C.) | 1651 | 1623 | 1593 |
| 35000 P Temperature (° C.) | 1209 | 1191 | 1171 |
| 200000 P Temperature (° C.) | 1109 | 1097 | 1080 |
| Density (g/cm$^3$) | 2.408 | 2.401 | 2.394 |
| CTE 25-300° C. (ppm/° C.) | 71.7 | 74.5 | 70.4 |
| Strain pt. (° C.) | 579 | 607 | 607 |
| Anneal pt. (° C.) | 633 | 656 | 656 |
| Softening pt. (° C.) | 898.7 | 900.7 | 900 |
| Liquidus temperature (° C.) | 1090 | 1180 | 1265 |
| Liquidus viscosity (P) | 290856 | 42277 | 7788 |
| Stress optical coefficient (nm/mm/MPa) | 3.028 | 2.937 | 2.926 |
| Refractive index at 589.3 nm | 1.5022 | 1.5071 | 1.5099 |
| Young's modulus (GPa) | 75.84 | 78.60 | 79.91 |

Examples 6A-6H were formed into glass articles (having a sheet form and specific thickness) and then chemically strengthened by immersing in a molten salt bath having a specific temperature, for a specified duration. Table 11 shows the thickness of each glass article, the chemical strengthening conditions, and the measured maximum CT and DOC values of the resulting strengthened glass article.

TABLE 11

Chemical strengthening conditions and resulting attributes of the glass articles.

| | Ex. 6A | Ex. 6B | Ex. 6C | Ex. 6D |
|---|---|---|---|---|
| Immersion in a molten salt bath of 100% NaNO$_3$ having a temperature of 390° C. for 4 hours | | | | |
| Thickness (mm) | 1.07 | 1.11 | 1.11 | 1.05 |
| Maximum CT (MPa) | 81 | 76 | 72 | 74 |
| DOC as a fraction of thickness | 0.19 | 0.19 | 0.19 | 0.17 |
| Immersion in a molten salt bath of 100% NaNO$_3$ having a temperature of 390° C. for 6 hours | | | | |
| Thickness (mm) | 1.08 | 1.1 | 1.12 | 1.04 |
| Maximum CT (MPa) | 89 | 80 | 87 | 86 |
| DOC as a fraction of thickness | 0.18 | 0.2 | 0.19 | 0.19 |
| Immersion in a molten salt bath of 100% NaNO$_3$ having a temperature of 390° C. for 8 hours | | | | |
| Thickness (mm) | 1.07 | 1.1 | 1.11 | 1.03 |
| Maximum CT (MPa) | 88 | 83 | 84 | 87 |
| DOC as a fraction of thickness | 0.19 | 0.2 | 0.2 | 0.17 |
| | Ex. 6E | Ex. 6F | Ex. 6G | Ex. 6H |
| Immersion in a molten salt bath of 100% NaNO$_3$ having a temperature of 390° C. for 4 hours | | | | |
| Thickness (mm) | 1.05 | 1.02 | 1.09 | 1.09 |
| Maximum CT (MPa) | 81 | 82 | 77 | 73 |
| DOC as a fraction of thickness | 0.17 | 0.16 | 0.17 | 0.18 |
| Immersion in a molten salt bath of 100% NaNO$_3$ having a temperature of 390° C. for 6 hours | | | | |
| Thickness (mm) | 1.08 | 1.03 | 1.07 | 1.1 |
| Maximum CT (MPa) | 81 | 82 | 85 | 85 |
| DOC as a fraction of thickness | 0.2 | 0.2 | 0.19 | 0.2 |
| Immersion in a molten salt bath of 100% NaNO$_3$ having a temperature of 390° C. for 8 hours | | | | |
| Thickness (mm) | 1.06 | 1.04 | 1.09 | 1.1 |
| Maximum CT (MPa) | 84 | 87 | 84 | 83 |
| DOC as a fraction of thickness | 0.18 | 0.18 | 0.2 | 0.19 |

It will be apparent to those skilled in the art that various modifications and variations can be made without departing from the spirit or scope of the invention. For example, the various features can be combined according to the following exemplary embodiments.

Embodiment 1

A glass-based article comprising:
a first surface and a second surface opposing the first surface defining a thickness (t) (mm);
a concentration of a metal oxide that is both non-zero and varies along a thickness range from about 0·t to about 0.3·t; and
a central tension (CT) region comprising a maximum CT (MPa) of less than about $71.5/\sqrt{(t)}$,
wherein, when the glass-based article is fractured, the glass-based article fractures into 2 or less fragments/inch$^2$, when tested on a sample size of 5 cm by 5 cm (2 inch by 2 inch) square.

Embodiment 2

The glass-based article of embodiment 1, wherein the concentration of the metal oxide is non-zero and varies along the entire thickness.

Embodiment 3

The glass-based article of any one of the preceding embodiments, comprising a surface compressive stress (CS) of about 300 MPa or greater.

Embodiment 4

The glass-based article of embodiment 3, wherein the surface CS is about 400 MPa or greater.

Embodiment 5

The glass-based article of any one of the preceding embodiments, wherein the CT region comprises the metal oxide concentration gradient.

Embodiment 6

A glass-based article of any one of the preceding embodiments, comprising:
a first metal oxide concentration and a second metal oxide concentration,
wherein the first metal oxide concentration varies in a range from about 15 mol % to about 0 mol % as thickness varies over a first range from about 0·t to about 0.5·t, and
wherein the second metal oxide concentration varies in a range from about 0 mol % to about 10 mol % as thickness varies over a second range from about 0 micrometers to about 25 micrometers from at least one of the first surface and the second surface.

Embodiment 7

The glass-based article of embodiment 6, comprising a third metal oxide.

Embodiment 8

A glass-based article comprising:
a first surface and a second surface opposing the first surface defining a thickness (t); and
a concentration of a metal oxide that is both non-zero and varies along a thickness range from about 0·t to about 0.3·t;
a surface compressive stress of about 200 MPa or greater; and
a CT region having a maximum CT less than about $71.5/\sqrt{(t)}$.

Embodiment 9

The glass-based article of embodiment 8, wherein the thickness range of the metal oxide concentration is from about 0·t to about 0.4·t.

Embodiment 10

The glass-based article of embodiment 8 or embodiment 9, wherein the thickness range of the metal oxide concentration is from about 0·t to about 0.45·t.

Embodiment 11

The glass-based article of any one of embodiments 1-10, wherein a monovalent ion of the metal oxide generates a stress along the thickness range.

Embodiment 12

The glass-based article of embodiment 11, wherein the monovalent ion of the metal oxide has a largest ionic diameter of all of the monovalent ions of the metal oxides in the glass-based article.

Embodiment 13

The glass-based article of any one of embodiments 1-12, wherein the concentration of the metal oxide decreases from the first surface to a value at a point between the first surface and the second surface and increases from the value to the second surface.

Embodiment 14

The glass-based article of any one of embodiments 1-13, wherein the glass-based article comprises a sodium or potassium ion diffusivity of about 450 $\mu m^2$/hour or greater at about 460° C. and a DOC greater than about 0.15·t, and wherein the surface CS is 1.5 times the maximum CT or greater.

Embodiment 15

The glass-based article of any one of embodiments 8-14, wherein the absolute value of surface CS is greater than the absolute value of maximum CT.

Embodiment 16

The glass-based article of any one of embodiments 8-15, wherein the surface CS is about 300 MPa or greater and a thickness of about 2 millimeters or less.

Embodiment 17

The glass-based article of any one of embodiments 8-16, wherein the CT region comprises the metal oxide that is both non-zero and varies along a thickness range from about 0·t to about 0.3·t.

Embodiment 18

The glass-based article of any one of embodiments 1-17, wherein the ratio of maximum CT to absolute value of surface CS is in the range from about 0.1 to about 0.2.

Embodiment 19

A glass-based article comprising:
a first surface and a second surface opposing the first surface defining a thickness (t) of about less than about 3 millimeters; and
a stress profile extending along the thickness,
wherein all points of the stress profile between a thickness range from about 0·t up to 0.3·t and from greater than about 0.7·t to t, comprise a tangent with a slope having an absolute value that is greater than about 0.1 MPa/micrometer,
wherein the stress profile comprises a maximum CS, a DOC and a maximum CT of less than about $71.5/\sqrt{(t)}$ (MPa), wherein the ratio of maximum CT to absolute value of maximum CS is in the range from about 0.01 to about 0.2 and wherein the DOC is about 0.1·t or greater, and
wherein, when the glass-based article is fractured, the glass-based article fractures into 2 or less fragments/inch$^2$, when tested on a sample size of 5 cm by 5 cm (2 inch by 2 inch) square.

Embodiment 20

The glass-based article of any one of embodiments 1-7 or embodiment 19, comprising a surface CS of about 200 MPa or greater and a chemical depth of layer of about 0.4·t or greater.

Embodiment 21

A glass-based article comprising:
a first surface and a second surface opposing the first surface defining a thickness (t) (mm);
a concentration of a metal oxide that is both non-zero and varies along a thickness range from about 0·t to about 0.3·t; and
a central tension (CT) region comprising a maximum CT (MPa) of less than about $71.5/\sqrt{(t)}$,
wherein the article exhibits at least one of:
(i) a threshold failure impact force greater than 500 Newtons when the article is bent to impart a tensile stress of 100 MPa; and (ii) a retained strength of 125 or more MPa after being impacted by an impact force of 800 N when the article is bent to impart a tensile stress of 100 MPa.

Embodiment 22

The glass-based article of embodiment 21, wherein the glass-based article has a surface compressive stress of greater than about 200 MPa.

Embodiment 23

A glass-based article comprising:
a first surface and a second surface opposing the first surface defining a thickness (t) of about less than about 3 millimeters; and
a stress profile extending along the thickness,
wherein all points of the stress profile between a thickness range from about 0·t up to 0.3·t and from greater than about 0.7·t to t, comprise a tangent with a slope having an absolute value that is greater than about 0.1 MPa/micrometer,
wherein the stress profile comprises a maximum CS, a DOC and a maximum CT of less than about 71.5/√(t) (MPa), wherein the ratio of maximum CT to absolute value of maximum CS is in the range from about 0.01 to about 0.2 and wherein the DOC is about 0.1·t or greater, and
wherein the article exhibits at least one of:
(i) a threshold failure impact force greater than 500 Newtons when the article is bent to impart a tensile stress of 100 MPa; and
(ii) a retained strength of 125 or more MPa after being impacted by an impact force of 800 N when the article is bent to impart a tensile stress of 100 MPa.

Embodiment 24

A glass-based article comprising:
a first surface and a second surface opposing the first surface defining a thickness (t) (mm); and
a metal oxide that forms a concentration gradient,
wherein the concentration of the metal oxide decreases from the first surface to a value at a point between the first surface and the second surface and increases from the value to the second surface,
wherein the concentration of the metal oxide at the point is non-zero, and
wherein the glass-based article comprises a stored tensile energy of about greater than 0 J/m² to less than 25 J/m² and a Young's modulus of less than about 80 GPa.

Embodiment 25

The glass-based article of any one of embodiments 1-18, or 24, wherein the concentration of the metal oxide is about 0.05 mol % or greater throughout the thickness.

Embodiment 26

The glass-based article of any one of embodiments 1-18, 24, or 25, wherein the concentration of the metal oxide at the first surface is about 1.5 or more times greater than the concentration of the metal oxides at a depth equal to about 0.5·t.

Embodiment 27

The glass-based article of any one of embodiments 1-18, 20, or 24-26, wherein the total concentration of the metal oxide is in the range from about 1 mol % to about 15 mol %.

Embodiment 28

The glass-based article of any one of embodiments 1-18, 20, or 24-27, wherein the metal oxide comprises any one or more of $Li_2O$, $Na_2O$, $K_2O$, $Rb_2O$, and $Cs_2O$.

Embodiment 29

The glass-based article of any one of embodiments 1-18, 20, or 24-28, comprising a CS layer extending from the first surface to a DOC, wherein the DOC is about 0.1·t or greater.

Embodiment 30

The glass-based article of any one of embodiments 19, 20, or 24-29, wherein the CT region comprises a maximum CT and the ratio of maximum CT to absolute value of surface CS is in the range from about 0.01 to about 0.2.

Embodiment 31

A glass-based article comprising:
a first surface and a second surface opposing the first surface defining a thickness (t) of about less than about 3 millimeter; and
a stress profile extending along the thickness,
wherein the stress profile at all points between a thickness range from about 0t up to 0.3t and from greater than about 0.7·t to t, comprise a local gradient having an absolute value that is greater than about 0.1 MPa/micrometer,
wherein the stress profile comprises a maximum CS, a DOC and a maximum CT, wherein the ratio of maximum CT to absolute value of maximum CS is in the range from about 0.01 to about 0.2 and wherein the DOC is about 0.1·t or greater, and
wherein the glass-based article comprises a stored tensile energy of about greater than 0 J/m² to less than 25 J/m² and a Young's modulus of less than about 80 GPa.

Embodiment 32

The glass-based article of embodiment 31, comprising a non-zero concentration of a metal oxide that continuously varies along the entire thickness.

Embodiment 33

The glass-based article of embodiment 31 or embodiment 32, comprising a non-zero concentration of a metal oxide that continuously varies along a thickness segment of about 10 micrometers.

Embodiment 34

The glass-based article of any one of embodiments 19, 20, 25, or 31-33, wherein the maximum CS comprises about 300 MPa or greater.

Embodiment 35

The glass-based article of any one of embodiments 8-18, or 31-34, comprising a chemical depth of layer of about 0.4·t or greater.

Embodiment 36

The glass-based article of any one of embodiments 19, 20, 24-29, 31-35, comprising a CT region, wherein the CT region comprises the metal oxide concentration gradient.

Embodiment 37

The glass-based article of any one of embodiments 24-36, wherein the maximum CT is less than about $71.5/\sqrt{(t)}$ (MPa).

Embodiment 38

A glass-based article comprising:
a stress profile including a CS region and a CT region, wherein the CT region is approximated by the equation $Stress(x)=MaxT-(((CT_n \cdot (n+1))/0.5'') \cdot |(x/t)-0.5|^n)$
wherein MaxT is a maximum tension value and is a positive value in units of MPa,
wherein $CT_n$ is the tension value at n, $CT_n$ is less than or equal to MaxT, and is a positive value in units of MPa,
wherein x is position along the thickness (t) in micrometers, and x=0 at a surface of the glass-based article, and
wherein n is in the range from 1.5 to 5.

Embodiment 39

The glass-based article of embodiment 38, wherein n is in the range from 1.5 to 2.

Embodiment 40

The glass-based article of embodiment 38 or 39, wherein the CT region comprises a maximum CT value in the range from about 50 MPa to about 250 MPa and the maximum CT value is at a depth in the range from about 0.4t to about 0.6t.

Embodiment 41

The glass-based article of any one of embodiments 38-40, wherein, for a thickness in the range from about 0tto about 0.1t, the stress profile comprises a slope whose magnitude in absolute value is in the range from about 20 MPa/micron to about 200 MPa/micron.

Embodiment 42

The glass-based article of embodiment any one of embodiments 38-41, wherein the stress profile is approximated by a combination of a plurality of error functions as measured from 0.5t to the surface.

Embodiment 43

A glass-based article comprising:
a stress profile including a CS region and a CT region, wherein the CT region is approximated by the equation $Stress(x)=MaxT-(((CT_n \cdot (n+1))/0.5'') \cdot |(x/t)-0.5|n)$
wherein MaxT is a maximum tension value and is a positive value in units of MPa,
wherein $CT_n$ is the tension value at n, $CT_n$ is less than or equal to MaxT, and is a positive value in units of MPa,
wherein x is position along the thickness (t) in micrometers, and x=0 at a surface of the glass-based article,
wherein n is in the range from 1.5 to 5, and
wherein the article exhibits at least one of:
(i) a threshold failure impact force greater than 500 Newtons when the article is bent to impart a tensile stress of 100 MPa; and
(ii) a retained strength of 125 or more MPa after being impacted by an impact force of 800 N when the article is bent to impart a tensile stress of 100 MPa.

Embodiment 44

A glass-based article comprising:
a first surface and a second surface opposing the first surface defining a thickness (t) (mm); and
a metal oxide that forms a concentration gradient,
wherein the concentration of the metal oxide decreases from the first surface to a value at a point between the first surface and the second surface and increases from the value to the second surface,
wherein the concentration of the metal oxide at the point is non-zero, and
wherein the article exhibits at least one of:
(i) a threshold failure impact force greater than 500 Newtons when the article is bent to impart a tensile stress of 100 MPa; and
(ii) a retained strength of 125 or more MPa after being impacted by an impact force of 800 N when the article is bent to impart a tensile stress of 100 MPa.

Embodiment 45

The glass-based article of any one of embodiments 21-23, 43, or 44, wherein the article exhibits a threshold failure impact force greater than 600 Newtons.

Embodiment 46

The glass-based article of any one of embodiments 21-23, 44 or 44, wherein the article exhibits a threshold failure impact force greater than 700 Newtons.

Embodiment 47

The glass-based article of any one of embodiments 21-23, 43, or 44, wherein the article exhibits a threshold failure impact force greater than 800 Newtons.

Embodiment 48

The glass-based article of any one of embodiments 21-23, 43 or 44, wherein the article exhibits a retained strength of 150 or more MPa.

Embodiment 49

The glass-based article of any one of embodiments 21-23, 43 or 44, wherein the article exhibits a retained strength of 200 or more MPa.

Embodiment 50

The glass-based article of any one of the preceding embodiments, wherein t comprises about 3 millimeters or less.

Embodiment 51

The glass-based article of any one of the preceding embodiments, the glass-based article is amorphous.

Embodiment 52

The glass-based article of any one of the preceding embodiments, the glass-based article is crystalline.

Embodiment 53

The glass-based article of any one of the preceding embodiments, further exhibiting a transmittance of about 88% or greater over a wavelength in the range from about 380 nm to about 780 nm.

Embodiment 54

The glass-based article of any one of the preceding embodiments, further exhibiting CIELAB color space coordinates, under a CIE illuminant F02, of L* values of about 88 and greater, a* values in the range from about −3 to about +3, and b* values in the range from about −6 to about +6.

Embodiment 55

The glass-based article of any one of the preceding embodiments, wherein the glass-based article comprises a fracture toughness ($K_{1C}$) of about 0.65 MPa·$m^{1/2}$ or greater.

Embodiment 56

The glass-based article of any one of the preceding embodiments, comprising a Young's modulus of less than 80 GPa.

Embodiment 57

The glass-based article of any one of the preceding embodiments, wherein t comprises about 1 millimeters or less.

Embodiment 58

The glass-based article of any one of the preceding embodiments, comprising a liquidus viscosity of about 100 kP or greater.

Embodiment 59

The glass-based article of any one of the preceding embodiments, comprising any one or more of:
a composition comprising a combined amount of $Al_2O_3$ and $Na_2O$ of greater than about 17 mol %,
a composition comprising greater than about 4 mol % $Na_2O$,
a composition substantially free of $B_2O_3$, ZnO, or both $B_2O_3$ and ZnO, and
a composition comprising a non-zero amount of $P_2O_5$.

Embodiment 60

A device comprising:
a housing having front, back, and side surfaces;
electrical components that are at least partially inside the housing;
a display at or adjacent to the front surface of the housing; and
a cover substrate disposed over the display, wherein the cover substrate comprises the glass-based article of any one of the preceding embodiments.

What is claimed is:

1. A glass-based article comprising:
a first surface and a second surface opposing the first surface defining a thickness (t) (mm);
a concentration of a metal oxide that is both non-zero and varies along a thickness range from about 0•t to about 0.3•t;
a surface compressive stress of about 200 MPa or greater; and
a central tension (CT) region comprising a maximum CT (MPa) of less than about $71.5/\sqrt{(t)}$.

2. The glass-based article of claim 1, wherein the concentration of the metal oxide is non-zero and varies along the entire thickness.

3. The glass-based article of claim 1, comprising:
a first metal oxide concentration and a second metal oxide concentration,
wherein the first metal oxide concentration varies in a range from about 15 mol % to about 0 mol % as thickness varies over a first range from about 0•t to about 0.5•t, and
wherein the second metal oxide concentration varies in a range from about 0 mol % to about 10 mol % as thickness varies over a second range from about 0 micrometers to about 25 micrometers from at least one of the first surface and the second surface.

4. The glass-based article of claim 1, wherein the CT region further comprises the metal oxide that is both non-zero and varies along a thickness range from about 0•t to about 0.3•t.

5. The glass-based article of claim 1, wherein a monovalent ion of the metal oxide generates a stress along the thickness range, and wherein the monovalent ion of the metal oxide has a largest ionic diameter of all of the monovalent ions of the metal oxides in the glass-based article.

6. The glass-based article of claim 1, wherein the concentration of the metal oxide decreases from the first surface to a value at a point between the first surface and the second surface and increases from the value to the second surface.

7. The glass-based article of claim 1, wherein the glass-based article comprises a sodium or potassium ion diffusivity of about 450 μ$m^2$/hour or greater at about 460° C. and a DOC greater than about 0.15•t, and wherein the surface CS is 1.5 times the maximum CT or greater.

8. The glass-based article of claim 1, wherein the ratio of maximum CT to absolute value of surface CS is in the range from about 0.1 to about 0.2.

9. The glass-based article or claim 1, comprising:
   the thickness (t) is about 3 millimeters or less; and
   a stress profile extending along the thickness,
   wherein all points of the stress profile between a thickness range from about 0•t up to 0.3•t and from greater than about 0.7•t to 1, comprise a tangent with a slope having an absolute value that is greater than about 0.1 MPa/micrometer, and
   wherein the stress profile comprises a maximum CS, a DOC and the CT region, wherein the ratio of maximum CT to absolute value of maximum CS is in the range from about 0.01 to about 0.2 and wherein the DOC is about 0.1•t or greater.

10. The glass-based article of claim 4, wherein the article exhibits at least one of:
    (i) a threshold failure impact force greater than 500 Newtons when the article is bent to impart a tensile stress of 100 MPa; and
    (ii) a retained strength of 125 MPa or more after being impacted by an impact force of 800 N when the article is bent to impart a tensile stress of 100 MPa.

11. The glass-based article of claim 9, wherein the article exhibits at least one of:
    (i) a threshold failure impact force greater than 500 Newtons when the article is bent to impart a tensile stress of 100 MPa; and
    (ii) a retained strength of 125 or more MPa after being impacted by an impact force of 800 N when the article is bent to impart a tensile stress of 100 MPa.

12. The glass-based article of claim 1, further exhibiting a transmittance of about 88% or greater over a wavelength in the range from about 380 nm to about 780 nm.

13. The glass-based article of claim 1, further exhibiting CIELAB color space coordinates, under a CIE illuminant F02, of L* values of about 88 and greater, a* values in the range from about −3 to about +3, and b* values in the range from about −6 to about +6.

14. The glass-based article of claim 1, wherein the glass-based article comprises a fracture toughness ($K_{1C}$) of about 0.65 MPa·m$^{1/2}$ or greater.

15. The glass-based article of claim 1, comprising a Young's modulus of less than 80 GPa.

16. The glass-based article of claim 1, wherein t comprises about 1 millimeters or less.

17. The glass-based article of claim 1, comprising a liquidus viscosity of about 100 kP or greater.

18. The glass-based article of claim 1, comprising any one or more of:
    a composition comprising a combined amount of $Al_2O_3$ and $Na_2O$ of greater than about 17 mol %,
    a composition comprising greater than about 4 mol % $Na_2O$,
    a composition substantially free of $B_2O_3$, ZnO, or both $B_2O_3$ and ZnO, and
    a composition comprising a non-zero amount of $P_2O_5$.

19. The glass-based article of claim 1, wherein, when the glass-based article is fractured, the glass-based article fractures into 2 or less fragments/inch$^2$, when tested on a sample size of 2 inch by 2 inch square.

20. A device comprising:
    a housing having front, back, and side surfaces;
    electrical components that are at least partially inside the housing;
    a display at or adjacent to the front surface of the housing; and
    a cover substrate disposed over the display, wherein the cover substrate comprises the glass-based article of claim 1.

* * * * *

UNITED STATES PATENT AND TRADEMARK OFFICE
CERTIFICATE OF CORRECTION

PATENT NO. : 9,908,811 B2
APPLICATION NO. : 15/682735
DATED : March 6, 2018
INVENTOR(S) : Timothy Michael Gross et al.

Page 1 of 1

It is certified that error appears in the above-identified patent and that said Letters Patent is hereby corrected as shown below:

On the Title Page

Item (54), Title, Line 1, delete "FUSION FORMABLE" and insert -- FUSION-FORMABLE --, therefor.

On page 3, Column 2, item (56), other publications, Lines 17-18, delete "crystallizationsof" and insert -- crystallizations of --, therefor.

In the Specification

In Column 1, Line 1, delete "FUSION FORMABLE" and insert -- FUSION-FORMABLE --, therefor.

In the Claims

In Column 74, Line 67, Claim 7, delete "at" and insert -- than --, therefor.

In Column 75, Line 6, Claim 9, delete "or claim" and insert -- of claim --, therefor.

In Column 75, Line 11, the second range incorrectly reads: "about 0.7•t to 1". That range should be "about 0.7•$t$ to $t$,".

Signed and Sealed this
Eleventh Day of June, 2019

Andrei Iancu
*Director of the United States Patent and Trademark Office*